United States Patent
Kimura et al.

(10) Patent No.: US 8,248,537 B2
(45) Date of Patent: Aug. 21, 2012

(54) VIDEO-SIGNAL PROCESSING METHOD, PROGRAM OF VIDEO-SIGNAL PROCESSING METHOD, RECORDING MEDIUM HAVING RECORDED THEREON PROGRAM OF VIDEO-SIGNAL PROCESSING METHOD, AND VIDEO-SIGNAL PROCESSING APPARATUS

(75) Inventors: Seiji Kimura, Chiba (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1476 days.

(21) Appl. No.: 11/758,740

(22) Filed: Jun. 6, 2007

(65) Prior Publication Data

US 2008/0106647 A1 May 8, 2008

(30) Foreign Application Priority Data

Jun. 6, 2006 (JP) .................. 2006-156936

(51) Int. Cl.
*H04N 9/64* (2006.01)
(52) U.S. Cl. ....................................... 348/701
(58) Field of Classification Search .................. 348/701, 348/607
See application file for complete search history.

(56) References Cited

U.S. PATENT DOCUMENTS

| | | | |
|---|---|---|---|
| 2004/0114055 A1* | 6/2004 | Yu | 348/700 |
| 2005/0076081 A1* | 4/2005 | Rui et al. | 709/204 |
| 2005/0110907 A1* | 5/2005 | Jung | 348/701 |
| 2005/0243205 A1 | 11/2005 | Wredenhagen et al. | |
| 2006/0050783 A1 | 3/2006 | Le Dinh et al. | |
| 2007/0242288 A1* | 10/2007 | Fan | 358/1.9 |

FOREIGN PATENT DOCUMENTS

| | | | |
|---|---|---|---|
| EP | 1445961 | | 8/2004 |
| GB | 2347811 | | 9/2000 |
| GB | 2347811 A | * | 9/2000 |
| JP | 2-013069 | | 1/1990 |
| JP | 8-201464 | | 8/1996 |
| JP | 2001-136416 | | 5/2001 |
| JP | 2003-209716 | | 7/2003 |
| JP | 2003-331283 | | 11/2003 |
| JP | 2005-039830 | | 2/2005 |
| JP | 2007-011926 | | 1/2007 |

OTHER PUBLICATIONS

European Search Report dated Dec. 21, 2009 in European Patent Application No. 07252255.0.

* cited by examiner

*Primary Examiner* — Mehrdad Dastouri
*Assistant Examiner* — Mohammed Rahaman
(74) *Attorney, Agent, or Firm* — Finnegan, Henderson, Farabow, Garrett & Dunner, L.L.P.

(57) ABSTRACT

A video-signal processing method for measuring a noise level of an input video signal includes the steps of detecting an intra-field or intra-frame feature for each region that is set in the input video signal, the intra-field or intra-frame feature representing a noise level in the input video signal within a field or frame; checking the intra-field or intra-frame feature against a noise-free-region threshold, and excluding regions with which the infra-field or intra-frame feature is less than the noise-free-region threshold from subjects of noise-level measurement; and outputting a result of noise-level measurement by statistically processing the intra-field or intra-frame features of regions remaining without being excluded.

9 Claims, 52 Drawing Sheets

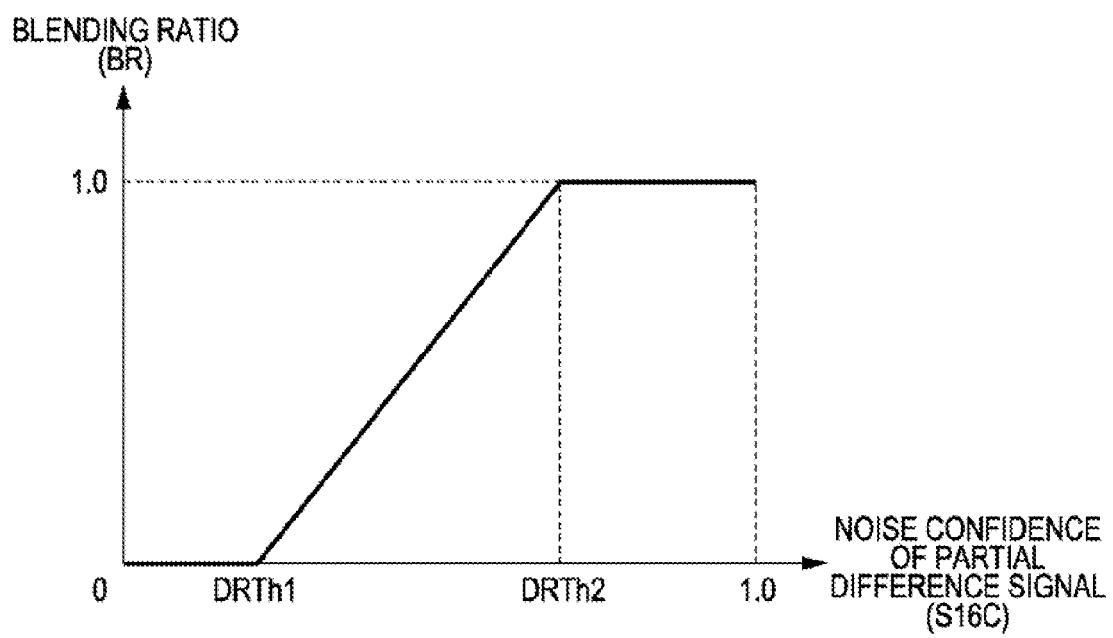

NOISE-FREE-PIXEL
MIXED REGION

NOISE-FREE-PIXEL
MIXED REGION

ADJACENT NOISE-FREE-PIXEL
MIXED REGION

VIDEO-SIGNAL PROCESSING METHOD, PROGRAM OF VIDEO-SIGNAL PROCESSING METHOD, RECORDING MEDIUM HAVING RECORDED THEREON PROGRAM OF VIDEO-SIGNAL PROCESSING METHOD, AND VIDEO-SIGNAL PROCESSING APPARATUS

CROSS REFERENCES TO RELATED APPLICATIONS

The present invention contains subject matter related to Japanese Patent Application JP 2006-156936 filed in the Japanese Patent Office on Jun. 6, 2006, and Japanese Patent Application JP 2007-108947 filed in the Japanese Patent Office on Apr. 18, 2007, the entire contents of which are incorporated herein by reference.

BACKGROUND OF THE INVENTION

1. Field of the Invention

The present invention relates to video-signal processing methods, programs of video-signal processing methods, recording media having recorded thereon programs of video-signal processing methods, and video-signal processing apparatuses. For example, the present invention can be applied to noise filters that reduce noise in video signals. According to the present invention, regions with extremely small noise levels are excluded from subjects of noise-level measurement. Thus, the accuracy of noise-level measurement car, be improved.

2. Description of the Related Art

In various video-signal processing apparatuses, noise is removed from video signals, for example, by an infinite impulse response (IIR) noise filter. Such a noise filter generates a correction signal by correcting the signal level of a noise signal component extracted from video signals, and subtracting the correction signal from the original video signals to reduce noise.

Thus, when the level of the correction signal is too large, blurring occurs at object boundaries, texture regions, or the like. Conversely, when the level of the correction signal is too small, noise is not suppressed sufficiently.

Thus, various video-signal processing apparatuses are configured so that the level of the correction signal can be changed by an operation by an operator. On the other hand, for example, Japanese Unexamined Patent Application Publication No. 2001-136416 proposes techniques for automatically setting the level of the correction signal on the basis of results of noise-level measurement.

However, existing methods are not practically sufficient to measure noise level accurately. Thus, it has been difficult to remove noise appropriately.

SUMMARY OF THE INVENTION

An improved accuracy of noise-level measurement is desired for video-signal processing methods, programs of video-signal processing methods, recording media having recorded thereon programs of video-signal processing methods, and video-signal processing apparatuses.

According to an embodiment of the present invention, there is provided a first video-signal processing method for measuring a noise level of an input video signal. The first video-signal processing method includes the steps of detecting an intra-field or intra-frame feature for each region that is set in the input video signal, the intra-field or intra-frame feature representing a noise level in the input video signal within a field or frame; checking the intra-field or intra-frame feature against a noise-free-region threshold, and excluding regions with which the intra-field or intra-frame feature is less than the noise-free-region threshold from subjects of noise-level measurement; and outputting a result of noise-level measurement by statistically processing the intra-field or intra-frame features of regions remaining without being excluded.

According to another embodiment of the present invention, there is provided a first program of a video-signal processing method for measuring a noise level of an input video signal. The first program includes the steps of detecting an intra-field or intra-frame feature for each region that is set in the input video signal, the intra-field or intra-frame feature representing a noise level in the input video signal within a field or frame; checking the intra-field or intra-frame feature against a noise-free-region threshold, and excluding regions with which the intra-field or intra-frame feature is less than the noise-free-region threshold from subjects of noise-level measurement; and outputting a result of noise-level measurement by statistically processing the intra-field or intra-frame features of regions remaining without being excluded.

According to another embodiment of the present invention, there is provided a first recording medium having recorded thereon a program of a video-signal processing method for measuring a noise level of an input video signal. The program includes the steps of detecting an intra-field or intra-frame feature for each region that is set in the input video signal, the intra-field or intra-frame feature representing a noise level in the input video signal within a field or frame; checking the intra-field or intra-frame feature against a noise-free-region threshold, and excluding regions with which the intra-field or intra-frame feature is less than the noise-free-region threshold from subjects of noise-level measurement; and outputting a result of noise-level measurement by statistically processing the intra-field or intra-frame features of regions remaining without being excluded.

According to another embodiment of the present invention, there is provided a first video-signal processing apparatus for measuring a noise level of an input video signal. The first video-signal processing apparatus includes an intra-field or intra-frame feature detector configured to detect an intra-field or intra-frame feature for each region that is set in the input video signal, the intra-field or intra-frame feature representing a noise level in the input video signal within a field or frame; a noise-free-region processor configured to check the intra-field or intra-frame feature detected by the intra-field or intra-frame feature detector against a noise-free-region threshold, and to exclude regions with which the intra-field or intra-frame feature is less than the noise-free-region threshold from subjects of noise-level measurement; and a noise-level measurement unit configured to output a result of noise-level measurement by statistically processing the intra-field or intra-frame features of regions remaining without being excluded by the noise-free-region processor.

According to another embodiment of the present invention, there is provided a second video-signal processing method for measuring a noise level of an input video signal. The second, video-signal processing method includes the steps of detecting an intra-field or intra-frame feature for each region that is set in the input video signal, the intra-field or intra-frame feature representing a noise level in the input video signal within a field or frame; detecting pixels having high correlation with neighboring pixels from the input video signal, and excluding regions including a large number of pixels having high correlation with neighboring pixels from subjects of noise-level measurement on the basis of results of the detection; and outputting a result of noise-level measurement by statistically processing the intra-field or infra-frame features of regions remaining without being excluded.

According to another embodiment of the present invention, there is provided a second program of a video-signal processing method for measuring a noise level of an input video signal. The second program includes the steps of defecting an intra-field or intra-frame feature for each region that is set in the input video signal, the intra-field or intra-frame feature representing a noise level in the input video signal within a field or frame; detecting pixels having high correlation with neighboring pixels from the input video signal, and excluding regions including a large number of pixels having high correlation with neighboring pixels from subjects of noise-level measurement on the basis of results of the detection; and outputting a result of noise-level measurement by statistically processing the intra-field or intra-frame features of regions remaining without being excluded.

According to another embodiment of the present invention, there is provided as second recording medium having recorded thereon a program of a video-signal processing method for measuring a noise level of an input video signal. The program includes the steps of detecting an intra-field or intra-frame feature for each region that is set in the input video signal, the intra-field or intra-frame feature representing a noise level in the input video signal within a field or frame; detecting pixels having high correlation with neighboring pixels from the input video signal, and excluding regions including a large number of pixels having high correlation with neighboring pixels from subjects of noise-level measurement on the basis of results of the detection; and outputting a result of noise-level measurement by statistically processing the intra-field or intra-frame features of regions remaining without being excluded.

According to another embodiment of the present invention, there is provided a second video-signal processing apparatus for measuring a noise level of an input video signal. The second, video-signal processing apparatus includes an intra-field or intra-frame feature detector configured to defect an intra-field or intra-frame feature for each region that is set in the input video signal, the intra-field or intra-frame feature representing a noise level in the input video signal within a field or frame; a noise-free-region processor configured to detect pixels having high correlation with neighboring pixels from the input video signal, and to exclude regions including a large number of pixels having high correlation with neighboring pixels from subjects of noise-level measurement, on the basis of results of the detection; and a noise-level measurement-unit configured to output a result of noise-level measurement by statistically processing the intra-field or intra-frame features of regions remaining without being excluded.

With the first video-signal processing method, program, recording medium, or video-signal processing apparatus, noise level can be measured with regions having extremely small noise levels excluded from subjects of noise level measurement. For example, it is possible to refrain from measuring noise level in regions of graphical user interfaces of a television receiver, an optical disc recorder, or the like, or regions of caption information or the like added during editing. Thus, the level of noise mixed into video content signals can be measured accurately, so that the accuracy of noise-level measurement can be improved.

With the second video-signal processing method, program, recording medium, or video-signal processing apparatus, by effectively using correlation with neighboring pixels, noise level can foe measured with regions having extremely small noise levels excluded from subjects of noise level measurement. For example, it is possible to refrain from measuring noise level in regions of graphical user interfaces of a television receiver, an optical disc recorder, or the like, or regions of caption information or the like added during editing. Thus, the level of noise mixed into video content signals can be measured accurately, so that the accuracy of noise-level measurement can be improved.

According to these embodiments of the present invention, the accuracy of noise-level measurement can be improved.

BRIEF DESCRIPTION OF THE DRAWINGS

FIG. 42 is a graph showing a characteristic curve for explaining an operation of the noise extractor shown in FIG. 41;

DESCRIPTION OF THE PREFERRED EMBODIMENTS

Now, embodiments of the present invention will be described with reference to the drawings.

First Embodiment

(1) Configuration of the Embodiment

Figure 2:
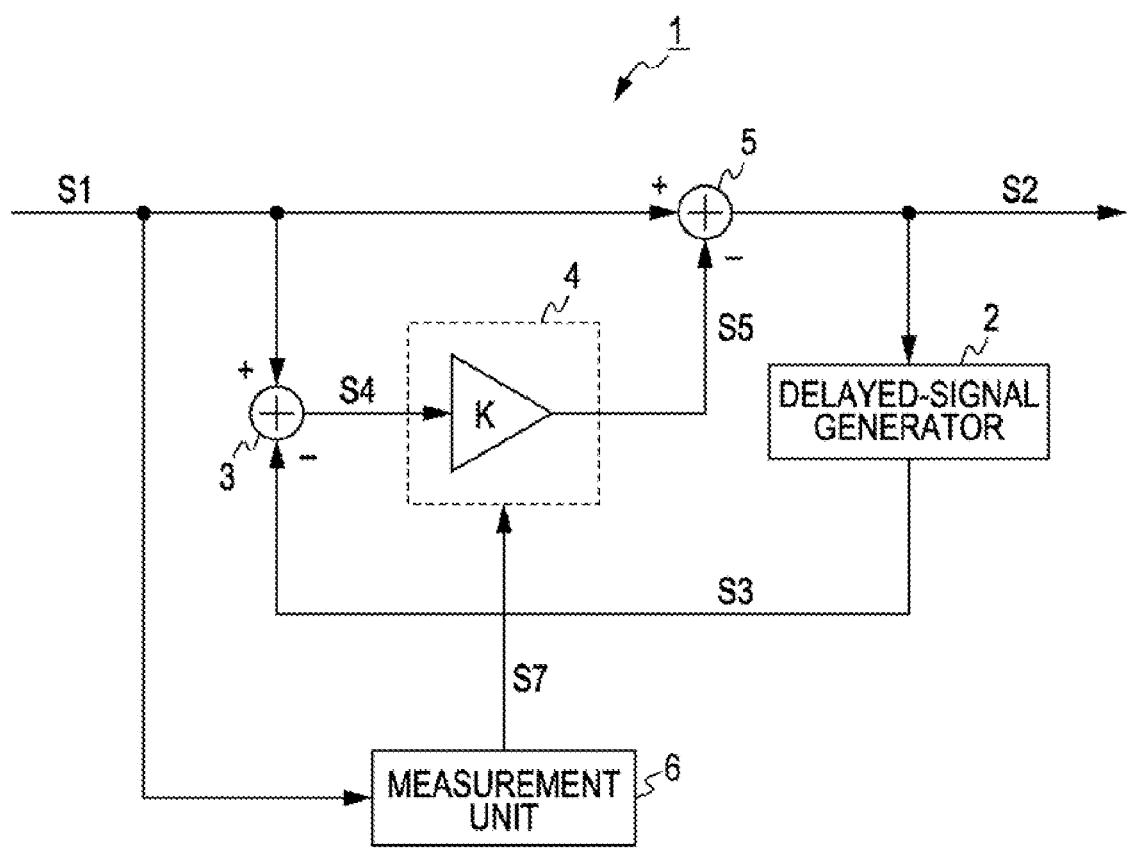
FIG. 2 is a block diagram showing the configuration of the noise filter according to the first embodiment.

FIG. 2 is a block diagram of a noise filter used, in a video-signal processing apparatus according to an embodiment of the present invention. Referring to FIG. 2, a noise filter 1 is an infinite-impulse-response (IIR) noise filter. By effectively using correlation between successive fields or frames, the noise filter 1 removes noise from an input video signal S1 to output an output video signal S2.

More specifically, a delayed-signal generator 2 delays the output, video signal S2 to output a delayed signal S3 for extracting a noise component. Alternatively, the delayed signal S3 may be generated by motion-compensation of the output, video signal S2. A subtracting circuit 3 subtracts the delayed video signal S3 from the input video signal S1 to generate a noise signal component S4. A signal-level correcting circuit 4 corrects the signal level of the noise signal component S4 to generate a correction signal S5. A subtracting circuit 5 subtracts the correction signal S5 from the input video signal S1 to generate the output-video signal S2.

A measurement unit 6 measures the signal level of a noise signal component in the input video signal S1 to output a measurement result S7. The signal-level correcting circuit 4 changes the signal level of the correction signal S5 according to the measurement result S7.

Figure 3:
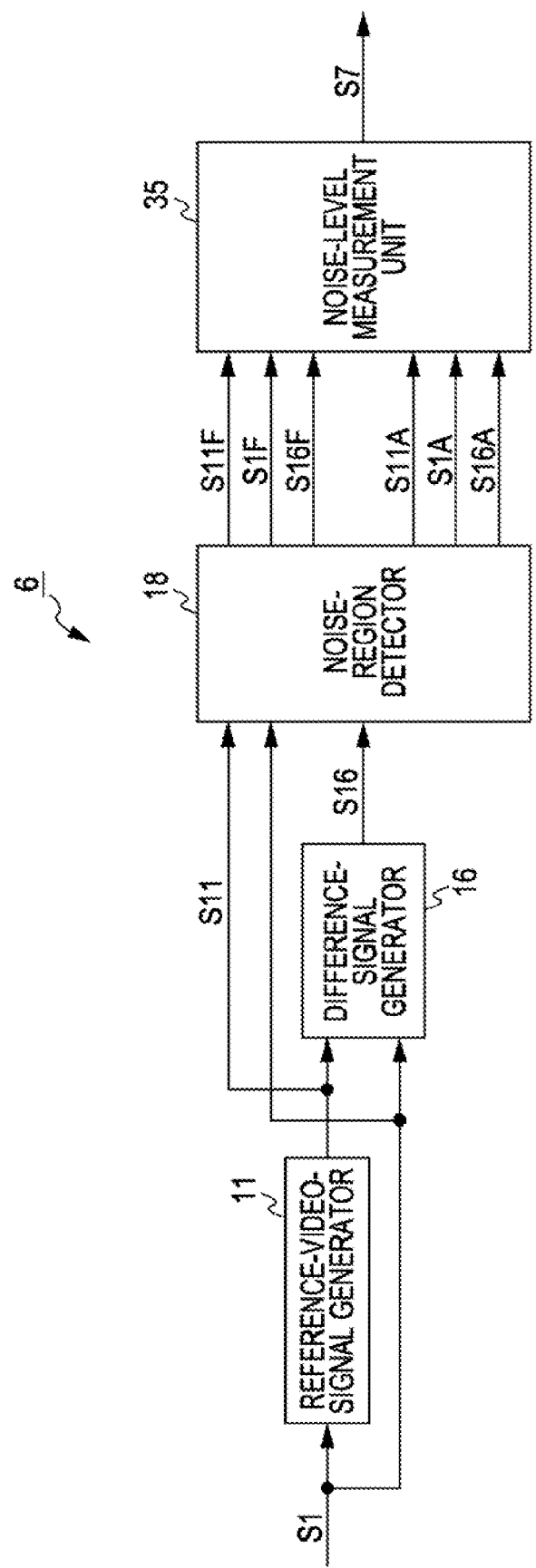
FIG. 3 is a block diagram showing the configuration of a measurement unit in the noise filter shown in FIG. 2.

FIG. 3 is a block diagram showing the measurement unit 6 in detail. In the measurement unit 6, a reference-video-signal generator 11 delays the input video signal S1 by a period corresponding to one field or one frame to output a reference video signal S11. More specifically, the reference-video-signal generator 11 motion-compensates the input video signal S1 to generate the reference video signal S11.

Figure 4:
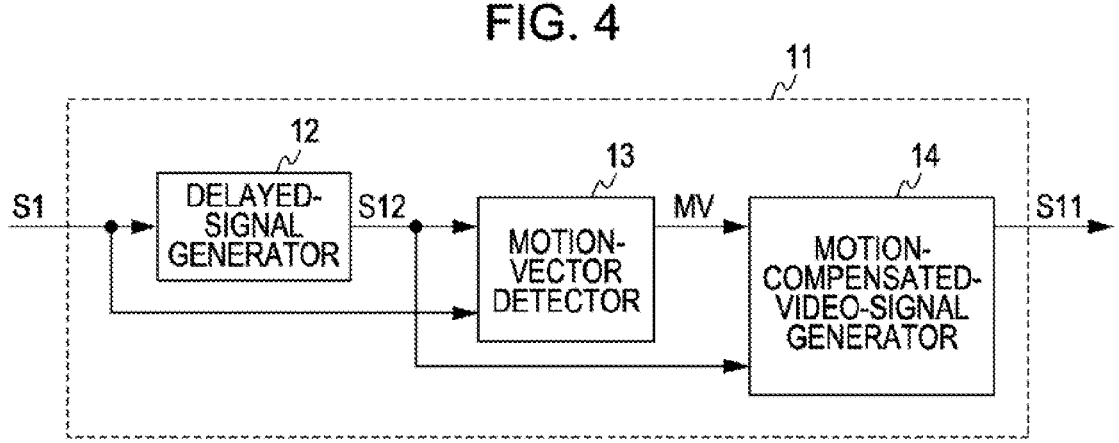
FIG. 4 is a block diagram showing the configuration of a reference-video-signal generator in the measurement unit shown in FIG. 3.

More specifically, referring to FIG. 4, in the reference-video-signal generator 11, a delayed-signal generator 12 delays the input video signal S1 by a period corresponding to one field or one frame to generate a delayed video signal S12. Then, a motion-vector detector 13 detects a motion vector MV from the input video signal S1 with reference to the delayed video signal S12. The motion vector MV can be detected by various motion-vector detecting methods, such as a block matching method or a gradient method. Furthermore, the precision of the motion vector MV may be integer pixel precision or decimal pixel precision.

Figure 5:
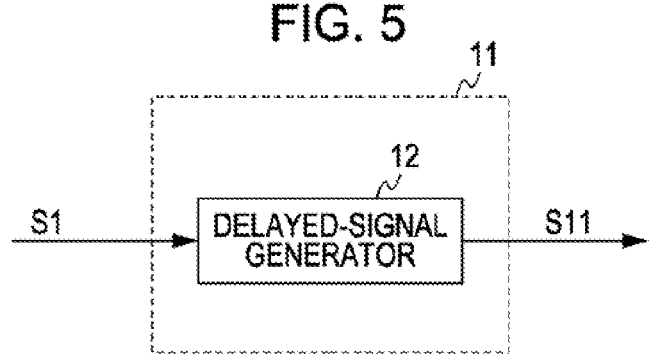
FIG. 5 is a block diagram showing another example configuration of the reference-video-signal generator shown in FIG. 4.

A motion-compensated-video-signal generator 14 motion-compensates the delayed video signal S12 using the motion vector MV to output the reference video signal S11. Alternatively, the reference video signal S11 may be generated by simply delaying the input video signal S1 by a period corresponding to one field or one frame by the delayed video signal S12 as shown in FIG. 5, when this suffices to achieve practically sufficient characteristics of the reference video signal S11.

Figure 6:
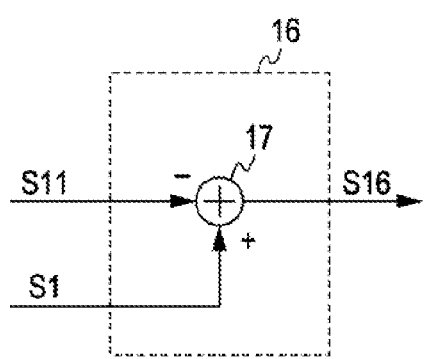
FIG. 6 is a block diagram showing the configuration of a difference-signal generator in the measurement unit shown in FIG. 3.

Referring to FIG. 6, a difference-signal generator 16 subtracts the reference video signal S11 from the input video signal S1 by a subtracting circuit 17 to output a difference signal S16 representing an inter-field difference or an inter-frame difference.

Referring back to FIG. 3, a noise-region detector 18 defines a plurality of regions in one field or frame represented by the input video signal S1. For each of the regions, the noise-region detector 18 generates and outputs a signal (hereinafter referred to as an activity) S1A representing a degree of variation among pixel values in the input video signal S1, which serves as a feature in a pixel region in one field or frame of video signal (hereinafter referred to as an intra-field or intra-frame feature). Furthermore, for each region corresponding to each region of the input video signal S1, the noise-region detector 18 generates and outputs an activity S11A in the reference video signal S11 and an activity S16A in the difference signal S16. Furthermore, the noise-region detector 18 checks the validity of use of each of these activities S1A, S11A, and S16A in noise level, measurement, and noise-region identification flags S1F, S11F, and S16F indicating whether these regions are suitable for noise level measurement.

Figure 1:
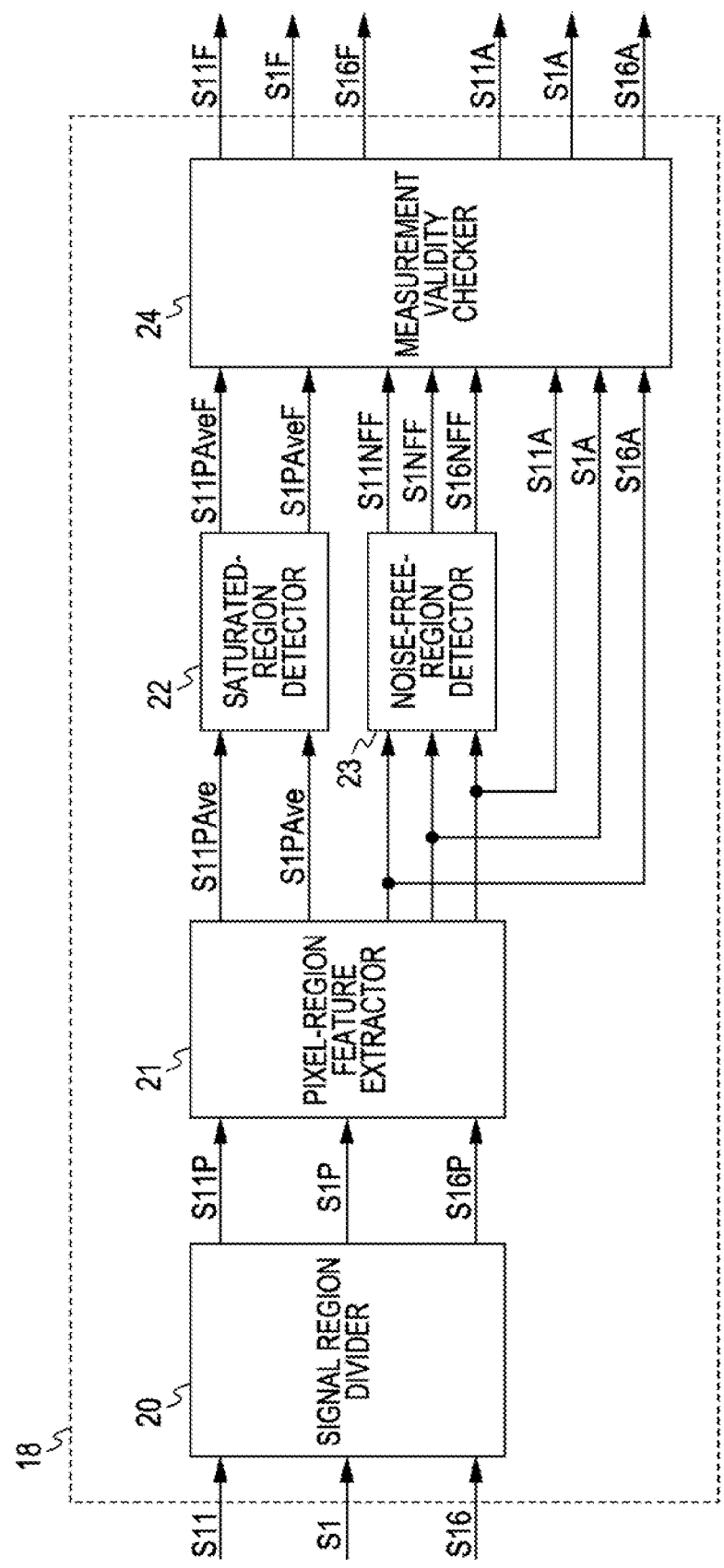
FIG. 1 is a block diagram of a noise-region detector in a noise filter according to a first embodiment of the present invention.
Figure 7:
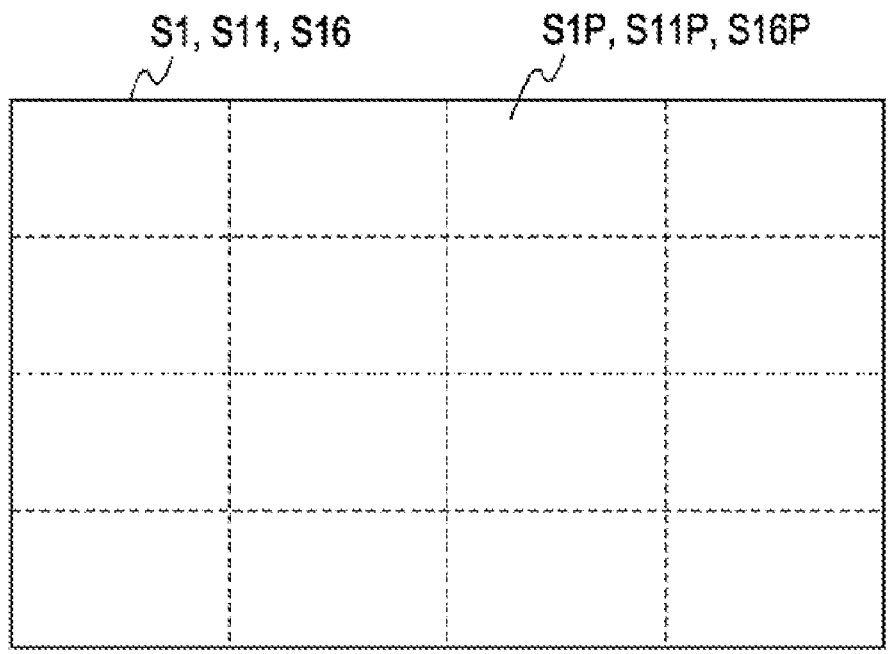
FIG. 7 is a plan view for explaining a noise-region defector in the measurement unit shown in FIG. 3.
Figure 8:
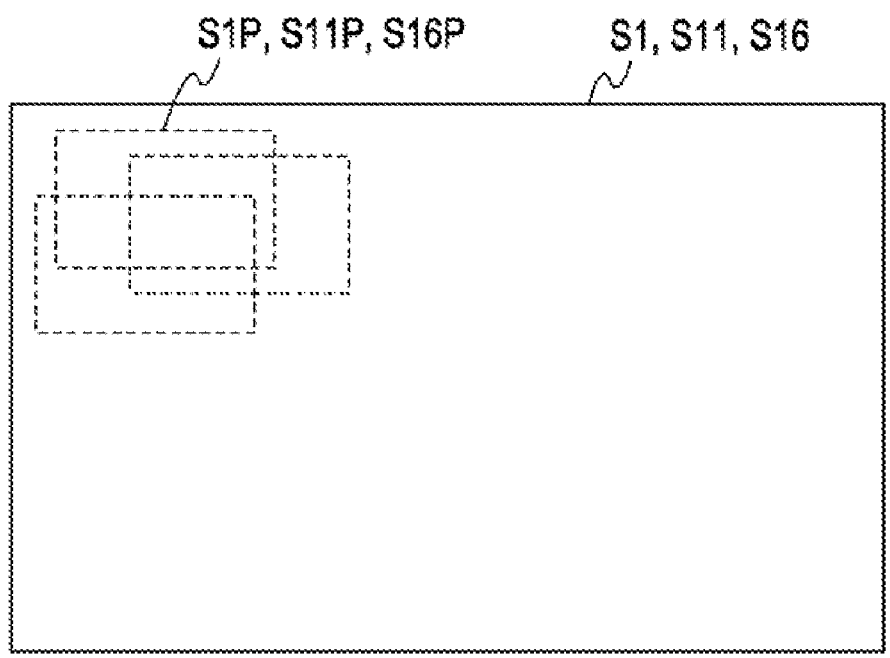
FIG. 8 is a plan view showing another example scheme as an alternative to FIG. 7.

FIG. 1 is a block diagram showing the noise-region detector 18 in detail. In the noise-region detector 18, a signal region divider 20 divides one field or one frame of the input video signal S1 horizontally and vertically into a plurality of regions, as shown in FIG. 7. The signal region divider 20 divides each of the input video signal S1, the reference video signal S11, and the difference signal S16 info regions, and outputs the input video signal S1, the reference video signal S11, and the difference signal S16 collectively for each region. The input video signal S1, the reference video signal S11, and the difference signal S16 divided into regions and output on a region-by-region basis will be referred to as a partial input video signal S1P, a partial reference video signal S11P, and a partial difference signal S16P. Furthermore, as shown in FIG. 8 in comparison with FIG. 7, regions may be defined so that, adjacent regions partially overlap each other.

A pixel-region feature extractor 21 receives the partial input video signal S1P, the partial reference video signal S11P, and the partial difference signal S16P, and processes these signals on a region-by-region basis, and detects an activity S1A, S11A, and S16A in the input video signal S1, the reference video signal. S11, and the difference signal S16, respectively, for each region. Each of the activities S1A, S11A, and S16A may be obtained by calculating a variance of signals in the relevant region, or by calculating a squared average of pixel values, an absolute average of pixel values, a standard deviation of pixel values, or the like.

Furthermore, for each region, the pixel-region feature extractor 21 calculates average values S1PAve and S11PAve of pixel values in the input video signal S1 and the reference video signal S11, respectively.

A saturated-region detector 22 checks the average values S1PAve and S11PAve of pixel values in the input video signal S1 and the reference video signal S11, calculated by the pixel-region feature extractor 21, against predetermined thresholds SminTh and SmaxTh, and outputs saturation flags S1PAveF and S11PAveF indicating the possibility of occurrence of clipping of pixel values of the input video signal S1 and the reference video signal S11 in each region due to the effect of a dynamic range. The clipping herein refers to white clipping and black clipping. The thresholds SminTh and SmaxTh are thresholds on the black-level side and the white-level side, respectively. Thus, when S1PAve<SminTh or S1PAve>SmaxTh is satisfied, the saturated-region detector 22 turns on the saturation flag S1PAveF for the input video signal S1. Similarly, when S11PAve<SminTh or S11PAve>SmaxTh is satisfied, the saturated-region detector 22 turns on the saturation flag S11PAveF for the reference video signal S11.

When the pixel values of video signals are clipped due to the effect of the dynamic range, noise superposed on the video signals is also clipped. Thus, in the region where clipping has occurred, it is not possible to measure noise level correctly. Thus, for each region, the saturated-region detector 22 checks the each of the average values S1PAve and S11PAve of pixel values in the input video signal S1 and the reference video signal S11 against the predetermined thresholds SminTh and SmaxTh to detect regions not suitable for noise level measurement, and outputs results of detection in the form of the saturation flags S1PAveF and S11PAveF.

A noise-free-region detector 23 receives input of the activities S1A, S11A, and S16A of the input video signal S1, the reference video signal S11, and the difference signal S16, detects noise-free regions in the input video signal S1, the reference video signal S11, and the difference signal S16, and outputs noise-free-region detection flags S1NFF, S11NFF, and S16NFF. The noise free regions refer to regions of graphical user interfaces of a television receiver, an optical disc recorder, or the like, regions displaying caption information or the like added during editing, or the like. It is estimated that noise is substantially absent on signals in the noise-free regions.

The noise-free-region detector 23 checks each of the values Iact of the activities S1A and S11A of the input video signal S1 and the reference-video-signal generator 11 in each region against a predetermined threshold INFTh. When Iact<INFTh is satisfied, the noise-free-region detector 23 turns on the noise-free-region detection flag S1NFF or S11NFF for the input video signal S1 or the reference video signal S11. Furthermore, the noise-free-region detector 23 checks the value Pact of the activity S16A of the difference signal S16 in each region against a predetermined threshold PNFTh. When Aact<PNFTh is satisfied, the noise-free-region detector 23 turns on the noise-free-region detection flag S16NFF for the difference signal S16.

A measurement-validity checker 24 processes the saturation flags S1PAvsF and S11PAveF and the noise-free-region detection flags S1NFF, S11NFF, and S16NFF to output the noise-region identification flags S1F, S11F, and S16F.

Figure 9:
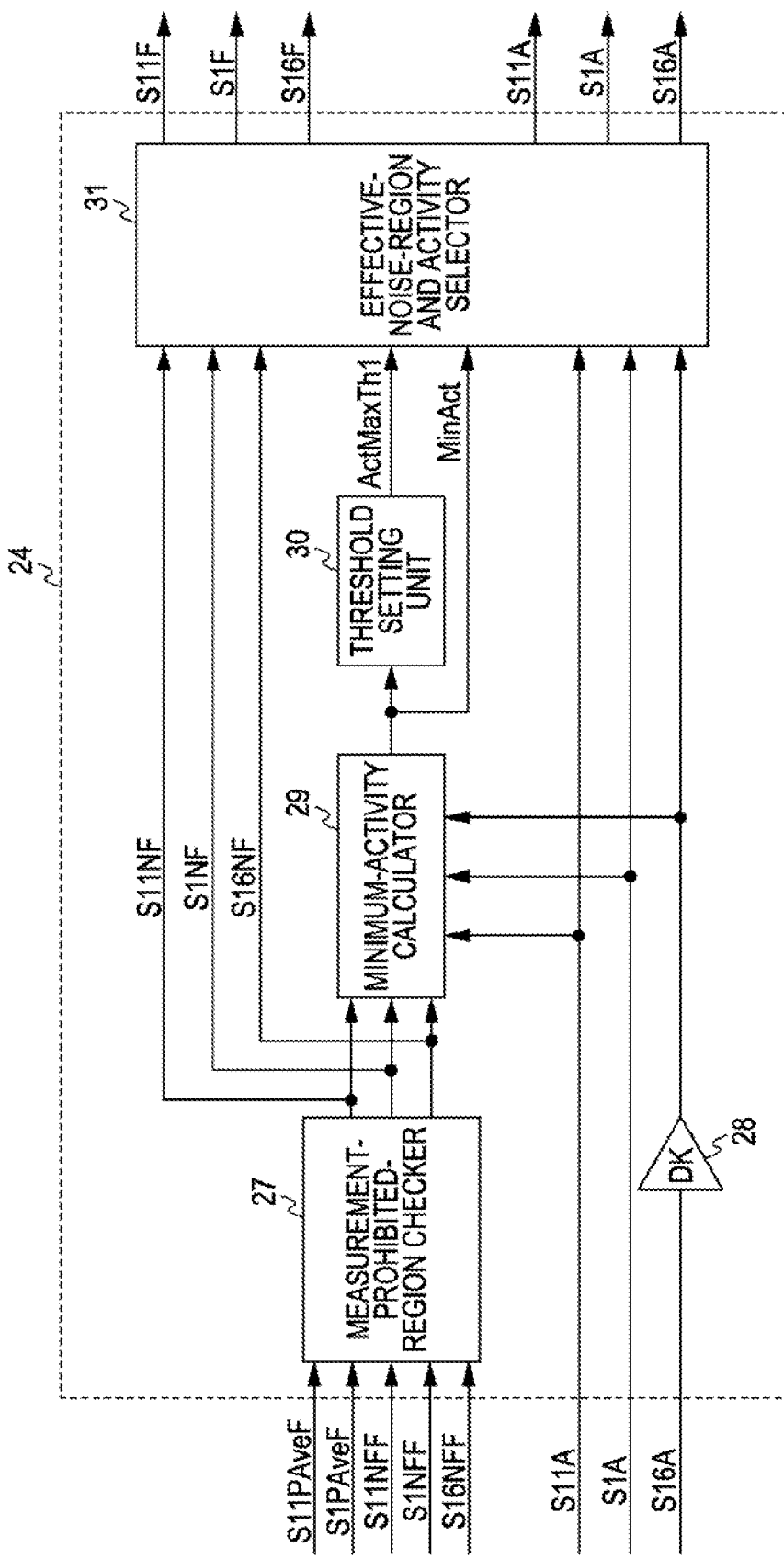
FIG. 9 is a block diagram showing the configuration of a measurement-validity checker in the noise-region detector shown in FIG. 1.

FIG. 9 is a block diagram showing the measurement-validity checker 24 in detail. In the measurement-validity checker 24, a measurement-prohibited-region checker 27 executes a logic operation on the saturation flags S1PAveF and S11PAveF and the noise-free-region detection flags S1NFF, S11NFF, By and S16NFF for each of the input video signal S1, the reference video signal S11, and the difference signal S16 to output measurement-prohibited-region checking flags S1NF, S11NF, and S16NF indicating whether the relevant regions are unsuitable for noise measurement.

More specifically, when any of the saturation flag S1PAveF and the noise-free-region identification flag S1NFF for the input video signal S1 is ON, the measurement-prohibited-region checker 27 turns on the measurement-prohibited-region checking flag S1NF for the input video signal S1 in the relevant region. Furthermore, when any of the saturation flag S11PAveF and the noise-free-region identification flag S11NFF for the reference video signal S11 is ON, the measurement-prohibited-region checker 27 turns on the measurement-prohibited-region checking flag S11NF for the reference video signal S11 in the relevant region. Furthermore, when the noise-free-region identification flag S16NFF for the difference signal S16 is ON, the measurement-prohibited-region checker 27 turns on the measurement-prohibited-region checking flag S16NF for the difference signal S16 in the relevant region.

An amplification circuit 28 corrects the value of the activity S16A of the difference signal S16 in accordance with the activity S1A of the input video signal S1 and the activity S11A of the reference video signal S11, and outputs the result.

For each region, a minimum-activity calculator 29 selects activity or activities for which the associated measurement-prohibited-region checking flag S1NF, S11NF, or S16NF is not turned on from the activity S1A of the input video signal S1, the activity S11A of the reference video signal S11, and the activity S16A of the difference signal S16 output from the amplification circuit 28. Furthermore, the minimum-activity calculator 29 selects an activity with a minimum value from the selected activities. Furthermore, the minimum-activity calculator 29 selects an activity with a minimum value in one field or one frame from the activities with minimum values in the individual regions. The minimum-activity calculator 29 outputs the selected activity with the minimum value in one field or one frame as a minimum activity MinAct. Instead of detecting the minimum, activity MinAct in one field or one frame, it is possible to record and maintain activities for which the associated measurement-prohibited-region checking flag S1NF, S11NF, or S16NF is not turned on among the activities S1A, S11A, and S16A in one field or one frame, and to output, an average of a predetermined number of activities with smaller values selected from the activities recorded and maintained.

A threshold setting unit 30 calculates a maximum threshold ActMaxTh1 for checking the activities S1A, S11A, and S16A on the basis of the minimum activity MinAct. Hone specifically, the threshold setting unit 30 multiplies the minimum activity MinAct by a constant Asd that is determined according to the area of the associated region, thereby calculating a first intermediate value EstSD (=MinAct×Asd) for calculating the upper threshold ActMaxTh1. Similarly, the threshold setting unit 30 multiplies the minimum activity MinAct with a constant Amean that is determined according to the area of the associated, region, thereby calculating a second intermediate value EstMean (=MinAct×Amean) for calculating the upper threshold ActMaxTh1. Furthermore, the threshold setting unit 30 multiplies the first intermediate value EstSD by a constant ActThFactor1 and adds the result to the second intermediate value EstMean, thereby calculating the upper threshold ActMaxTh1 (=EstMean+EstSD×ActThFactor1). The constant ActThFactor1 is a constant that is determined in view of noise distribution. Thus, the threshold setting unit 30 predicts the upper threshold ActMaxTh1 with reference to the minimum activity MinAct, with which it is determined whether the activities S1A, S11A, or S16A detected in each region is not attributable only to noise.

An effective-noise-region and activity selector 31 sets the noise-region identification flags S1F, S11F, and S16F on the basis of the upper threshold ActMaxTh1, the minimum activity MinAct, and the measurement-prohibited-region checking flags S1NF, S11NF, and S16NF. More specifically, when the measurement-prohibited-region checking flag S1NF, S11NF, or S16NF is ON, obviously, the associated activity S1A, S11A, or S16A is not suitable for noise level measurement. Thus, in this case, the effective-noise-region and activity selector 31 turns on the noise-region identification flag S1F, S11F, or S16F of the associated signal S1A, S11A, or S16A. Furthermore, even when the measurement-prohibited-region checking flag S1NF, S11NF, or S16NF is not turned on, if the value of the associated activity S1A, S11A, or S16A is less than the minimum activity MinAct or greater than the upper threshold ActMaxTh1, it is not so suitable to use the activity for noise level measurement. Thus, also in this case, the effective-noise-region and activity selector 31 turns off the associated noise-region identification flag S1F, S11F, or S16F.

Referring back to FIG. 3, a noise-level measurement unit 35 processes the noise-region identification flags S1F, S11F, and S16F and the activities S1A, S11A, and S16A to output a noise-level measurement result S7.

Figure 10:
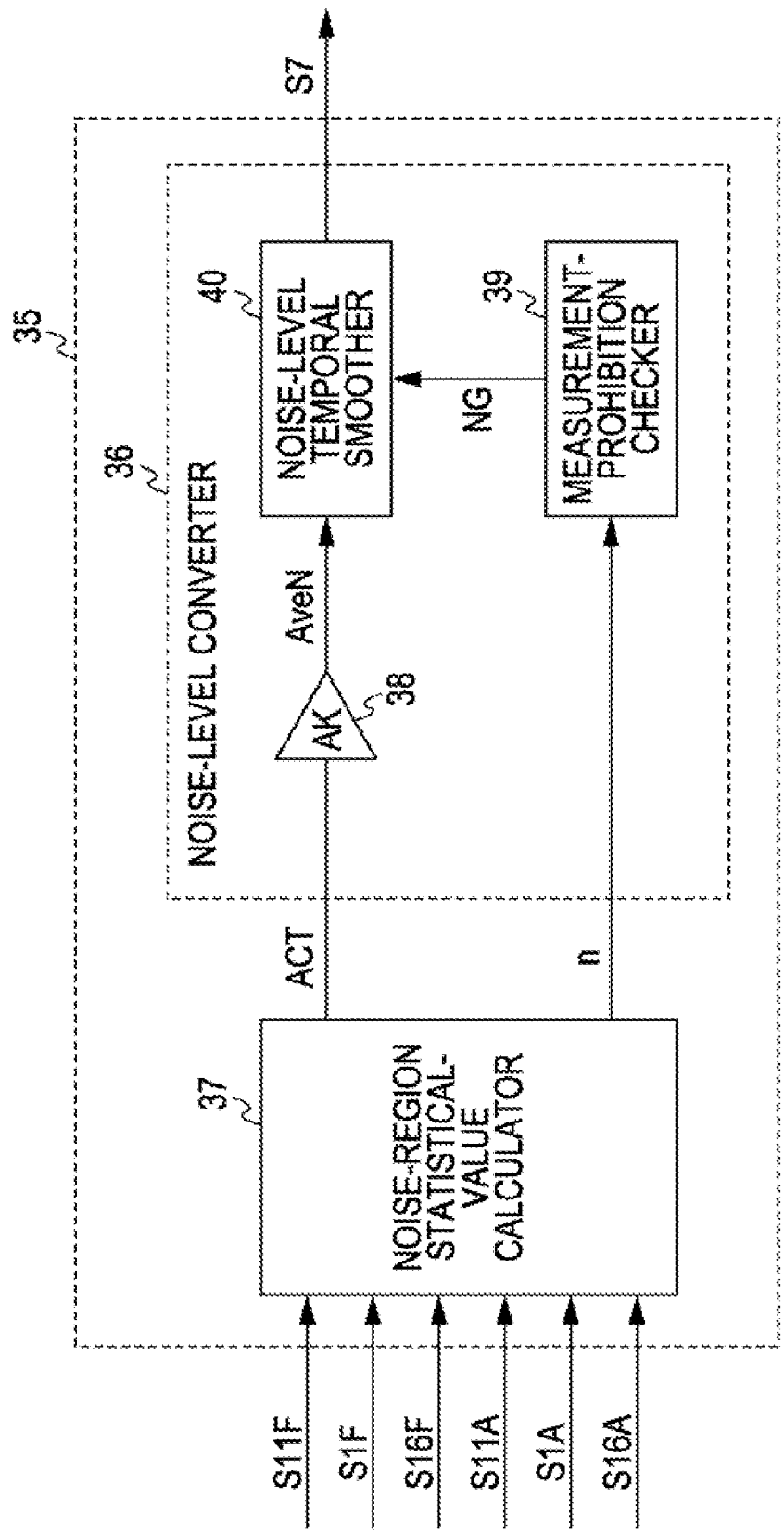
FIG. 10 is a block diagram showing the configuration of a signal region divider in the measurement unit, shown in FIG. 3.

More specifically, referring to FIG. 10, in the noise-level measurement unit 35, a noise-region statistical-value calculator 37 statistically processes the activities S1A, S11A, and S16A of regions suitable for noise-level measurement, i.e., regions for which the noise-region identification flag S1F, S11F, or S16F is turned on, and thereby outputs a representative activity ACT representing the activities S1A, S11A, and S16A. The statistical processing detects an activity that is dominant among the activities S1A, S11A, and S16A of the regions for which the noise-region identification flag S1F, S11F, or S16A is turned on. For example, an average, a median of distribution, or a mode of histogram is obtained through the statistical processing. The noise-region statistical-value calculator 37 calculates and outputs a representative activity ACT for each field or each frame. Alternatively, the noise-region statistical-value calculator 37 may calculate and output a representative activity ACT for each set of a plurality of fields or a plurality of frames.

Furthermore, the noise-region statistical-value calculator 37 counts the number of the activities S1A, S11A, and S16A for which the noise-region identification flag S1F, S11F, or S16F is turned on, and thereby calculates and outputs the number n of the activities S1A, S11A, and S16A used to calculate the representative activity ACT.

A noise-level converter 36 converts the representative activity ACT into a noise level and outputs the noise level. More specifically, in the noise-level converter 36, an amplification circuit 38 multiplies the value of the representative activity ACT calculated by the noise-region statistical-value calculator 37 by a gain AK, thereby correcting the value of the representative activity ACT to a signal level corresponding to an average noise level AveN. The gain AK is a constant that is set in accordance with the value of the upper threshold ActMaxTh1.

A measurement-prohibition checker 39 checks the number n of the activities S1A, S11A, and S16A used to calculate the representative activity ACT by the noise-region statistical-value calculator 37 against a predetermined threshold. When the number n is less than the threshold, the measurement-prohibition checker 39 outputs a checking signal HG indicating that noise level measurement is difficult.

Figure 11:
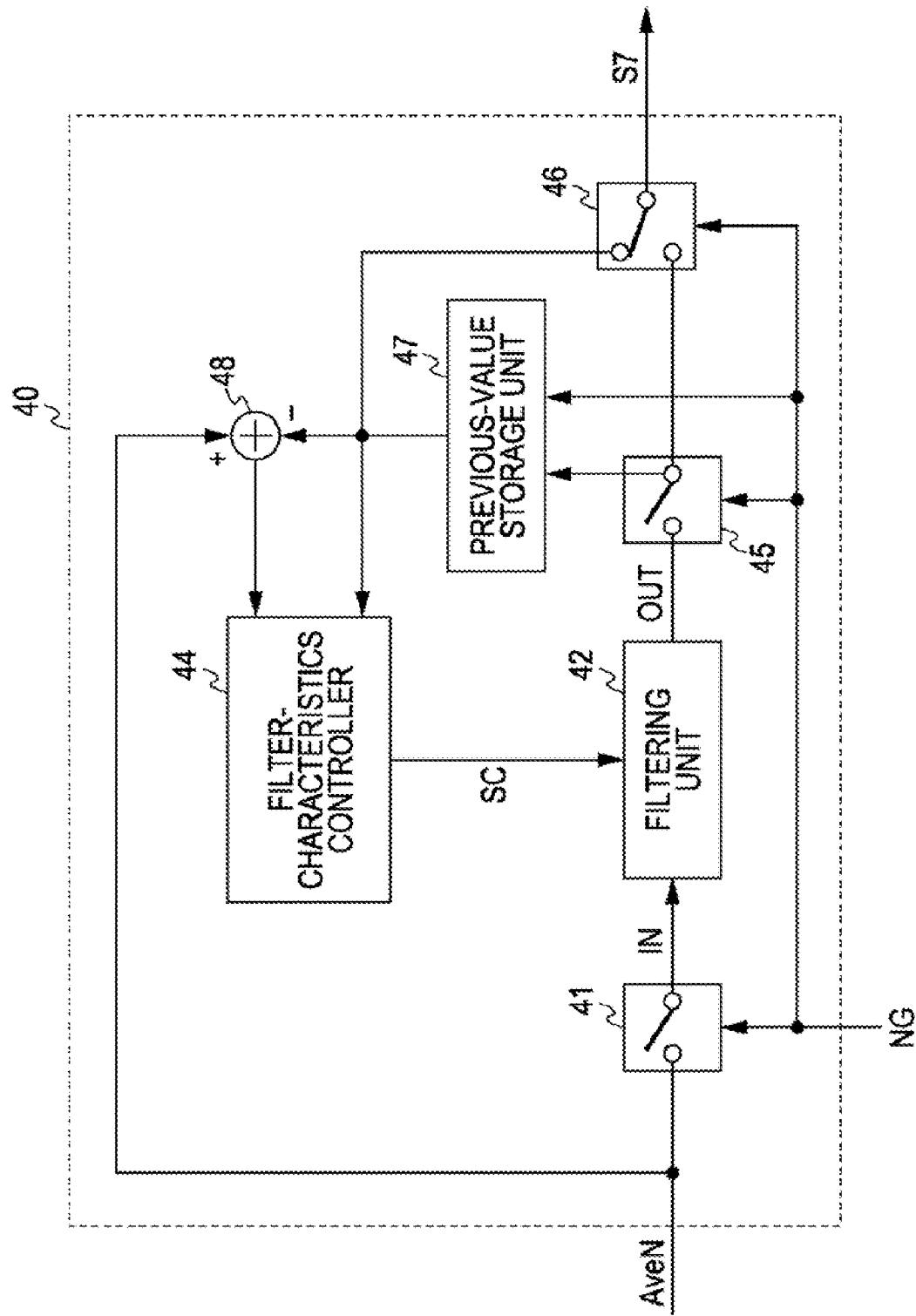
FIG. 11 is a block diagram showing the configuration of a noise-level temporal smoother in the signal region divider shown in FIG. 10.
Figure 12:
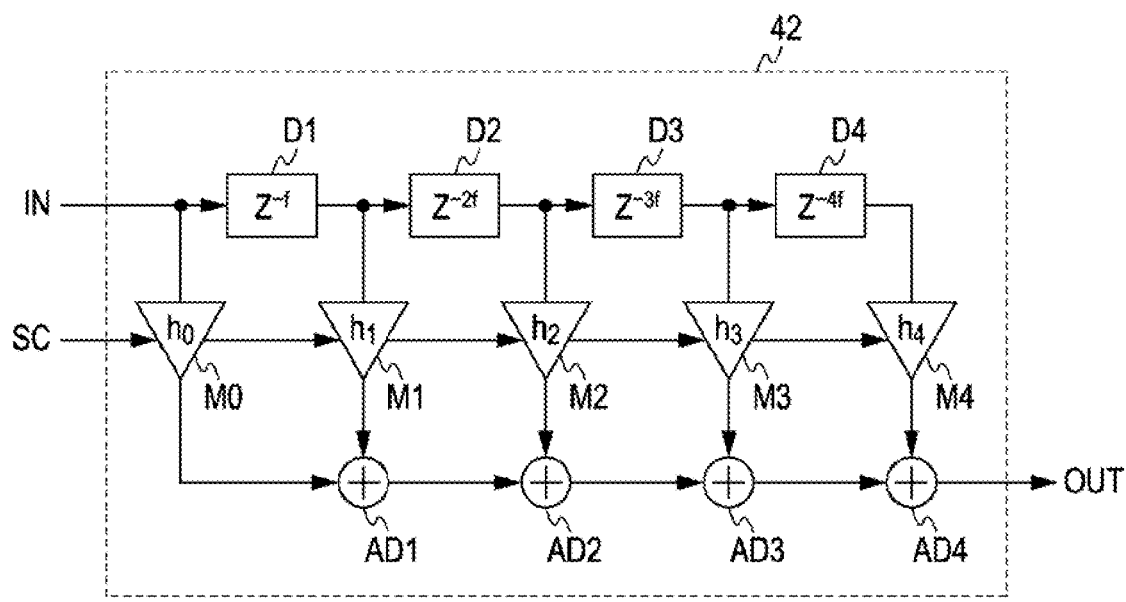
FIG. 12 is a block diagram showing the configuration of a filtering unit in the noise-level temporal smoother shown in FIG. 11.
Figure 13:
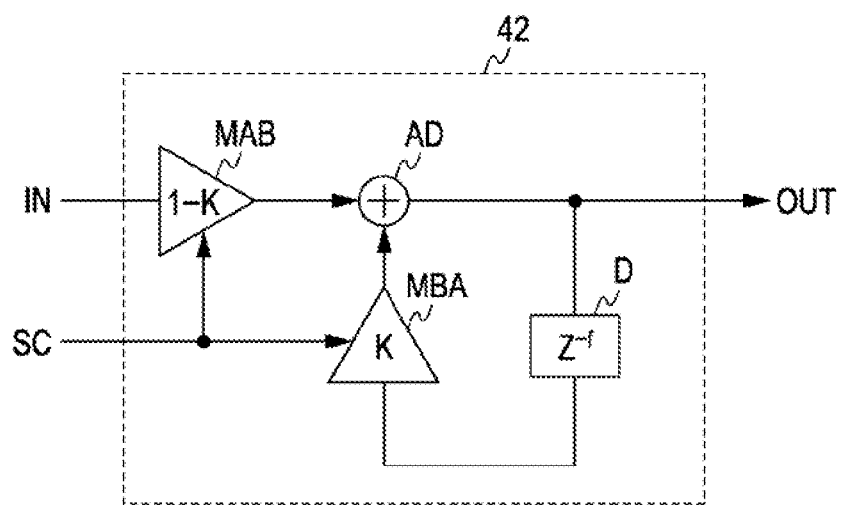
FIG. 13 is a block diagram showing another example configuration as an alternative to the configuration shown in FIG. 12.

A noise-level temporal smoother 40 smoothes the average noise levels AveN calculated by the noise-region statistical-value calculator 37 on the basis of the checking signal NG to output a noise-level measurement result S7. More specifically, referring to FIG. 11, in the noise-level temporal smoother 40, the average noise levels AveN are input to a filtering unit 42 via a switching circuit 41 that is turned on in response to falling of the checking signal NG. Referring to FIG. 12, the filtering unit 42 in implemented by a finite-impulse-response (FIR) low-pass filter circuit including a plurality of stages of delaying circuit D1 to D4 that sequentially delay an input signal IN, multiplying circuits M0 to M4 that weight the input signal IN and output signals of the delaying circuits D1 to D4 by filter coefficients h0 to h4, and adding circuits AD1 to AD4 that add together output signals of the multiplying circuits M0 to M4. The filtering unit 42 smoothes the average noise levels AveN sequentially input via the switching circuit 41, according to the filter coefficients h0 to h4 set by a filter-characteristics controller 44. Alternatively, the filtering unit 42 may be implemented by an infinite-impulse-response (IIR) low-pass filter including a delaying circuit D that delays an output signal OUT, amplifying circuits MBA and MAB that amplify an output signal of the delaying circuit D and an input signal IN, respectively, and an adding circuit AD that adds together the signals amplified by the amplifying circuits MBA and MAB.

The noise-level temporal smoother 40 outputs an output signal of the filtering unit 42 as a noise-level measurement result S7 via a switching circuit 45 that is turned on in response to failing of the checking signal NG and a switching circuit 46 that is switched according to the checking signal NG.

In the noise-level temporal smoother 40, a previous-value storage unit 47 sequentially latches and outputs signals output from the filtering unit 42, input via the switching circuit 45 in response to falling of the checking signal NG. Furthermore, the previous-value storage unit 47 stops the latching operation in response to rising of the checking signal NG, so that a signal output from the filtering unit 42 is held and output in response to rising of the checking signal NG. In response to rising of the checking signal NG, in the noise-level temporal smoother 40, the switching circuit 46 is switched from the side of the switching circuit 45 to the side of the previous-value storage unit 47, so that a noise-level measurement result S7 is output from the previous-value storage unit 47.

A subtracting circuit 48 calculates and outputs a difference between the noise-level measurement result S7 output from the previous-value storage unit 47 and the input average noise level AveN.

The filter-characteristics controller 44 receives input of the noise-level measurement result S7 output from the previous-value storage unit 47, and also receives input of the difference between the noise-level measurement result 37 and the average noise level AveN via the subtracting circuit 48. Then, the filter-characteristics controller 44 controls the characteristics of the filtering unit 42 according to the measurement result and the difference. More specifically, when the difference is large, since the large difference indicates an intense change in the noise-level measurement result S7, the filter-characteristics controller 44 enhances smoothing by the filtering unit 42. Also, when the average noise level. AveN is large, a considerable variation presumably exists in the noise-level measurement result S7, so that the filter-characteristics controller 44 enhances smoothing by the filtering unit 42. The setting of smoothing may be determined in accordance of the configuration of circuits at a subsequent stage where the noise-level measurement result S7 is used, and smoothing may be omitted.

(2) Operation of the Embodiment

In the configuration described above, the video signal S1 is sequentially input to the noise filter 1 (FIG. 2), and the subtracting circuit 5 subtracts the correction signal S5 from the input video signal S1 to suppress noise, whereby the output video signal S2 is output. Regarding the input video signal S1, the output video signal S2 is delayed by the delayed-signal generator 2 to generate the delayed video signal S3, and the delayed video signal S3 is subtracted from the input video signal S1 by the subtracting circuit 3 to generate the noise signal component 34. Furthermore, the signal level of the noise signal component S4 is corrected by the signal-level correcting circuit 4 to generate the correction signal S5.

Thus, when the signal level of the correction signal S5 is small relative to the noise level, noise in the input, video signal S1 is not sufficiently suppressed by the noise filter 1, so that image quality is not improved sufficiently. Conversely, when the signal level of the correction signal S5 is large relative to the noise level, high-frequency components of the video content is also suppressed, so that blurring occurs at object boundaries, texture regions, etc.

Thus, regarding the input video signal S1, the noise level is measured by the measurement unit 6, and the gain of the signal-level correcting circuit 4 is controlled according to the noise-level measurement result 37, so that the signal level of the correction signal S3 is adjusted appropriately. However, when the noise level is not measured correctly by the measurement unit 6, it is difficult to adjust the signal level of the correction signal S3 appropriately.

Thus, in the measurement unit 6, the input video signal S1 (FIG. 3) is input to the signal region divider 20 (FIG. 1) of the noise-region detector 18 and divided into signals of individual regions defined in one field or frame (FIGS. 7 and 8), and the pixel-region feature extractor 21 detects an activity S1A indicating a degree of variation among pixel values for each of the regions.

The activity S1A detected from the input video signal S1 increases as the noise level increases, so that the activity S1A indicates the noise level. However, in various video apparatuses, in some cases, various video components, such as video components for a graphical user interface or the like, are included in the input video signal S1. Furthermore, in some cases, caption information is added during editing. In these video components or information, noise is smaller than in other portions of the input video signal S1. That is, these portions are flat portions with small variation in pixel values. Thus, in is not possible to suppress noise sufficiently by adjusting the gain of the signal-level correcting circuit 4 on the basis of the noise level detected for these portions.

Thus, in the measurement unit 6, regarding the input-video signal S1, the noise-free-region detector 23 checks the value Iact of the activity S1A against the predetermined threshold INFTh to detect regions with extremely small noise levels, thereby detecting regions of caption information or the like. More specifically, regarding the input video signal S1, when the value Iact of the activity S1A is less than the predetermined threshold INFTh, it is determined that the relevant region is not suitable for noise level measurement, so that the noise-free-region detection flag S1NFF is turned on.

Furthermore, for example, when the input video signal S1 is obtained by playback by an optical disc recorder, it is predicted that noise components superposed at the time of input to the optical disc recorder could be partially suppressed due to the dynamic range of the recording and playback system of the optical, disc recorder. In this case, it is not possible to suppress noise sufficiently by adjusting the gain of the signal-level correcting circuit 4 on the basis of the noise level detected for such a suppressed portion.

Thus, regarding the input video signal S1, the pixel-region feature extractor 21 calculates an average value S1PAve of pixel values for each region. Furthermore, the saturated-region detector 22 checks the average value S1PAve against the predetermined thresholds SminTh and SmaxTh, and the saturation flag S1PAveF is turned on when the relevant region is a white-level-side region or a black-level-side region where noise could be suppressed.

Regarding the input video signal S1, the noise level is measured by the measurement-validity checker 24 and the noise-level measurement unit 35 selectively processing the activities S1A of regions for which the saturation flag S1PAveF and the noise-free-region detection flag S1NFF are turned off. Thus, the measurement unit 6 can measure the noise level with an improved accuracy.

However, the activity S1A obtained from the input video signal S1 includes high-frequency components of the video content as well as noise components. Thus, when the signal levels of the high-frequency components are large, a considerable error occurs in noise-level measurement.

Thus, the reference-video-signal generator 11 delays and motion-compensates the input video signal S1 to generate the reference video signal S11 (FIGS. 4 and 5), and the difference-signal generator 18 generates the difference signal S16 between the input video signal S1 and the reference video signal S11 (FIG. 6). Furthermore, the signed region divider 20 (FIG. 1) of the noise-region detector 18 divides the difference signal S16 into signals of individual regions defined in one field or frame (FIGS. 7 and 8) similarly to the case of the input video signal S1, and the pixel-region feature extractor 21 detects an activity S16A for each of the regions. Furthermore, the reference video signal S11 used to generate the difference signal S16 is also processed similarly to the input video signal S1 so that an activity S11A is detected for each of the regions.

Since the difference signal S16 represents the difference between successive fields or frames, when motion compensation is executed correctly, the activity S16A of the difference signal S16 is not affected by high-frequency components of the video content of the input video signal S1 and thus indicates the correct noise level. However, when motion compensation is executed incorrectly, an incorrect noise level is detected. Thus, in some cases, it is more suitable to use the activity S1A of the input video signal S1 in order to measure the noise level correctly.

Furthermore, temporary changes in image quality can also occur, for example, due to scene change, flash, or the like. In this case, the noise level can be measured more suitably by using the reference video signal S11.

Thus, in the measurement unit 6, the noise level of the input video signal S1 is measured using the activities S11A and S16A of the reference video signal S11 and the difference signal S16 in addition to the activity S1A of the input video signal S1. This serves to improve the accuracy of noise-level measurement.

Furthermore, regarding the reference video signal S11, similarly to the input video signal S1, noise could be suppressed partially due to the dynamic range of the recording and playback system or the like. Furthermore, the noise level could be detected incorrectly in regions of caption information or the like. Thus, similarly to the input video signal S1, the saturation flag S11PAveF and the noise-free-region detection flag S11NFF are set through processing by the saturated-region detector 22 and the noise-free-region detector 23. This also serves to improve the accuracy of noise-level measurement.

As for the difference signal S16, the noise-free-region detector 23 sets the noise-free-region detection flag S16NFF. This also serves to improve the accuracy of noise-level measurement. Regarding the difference signal S16, it is not possible to check an average value against a threshold and thereby detect a portion where noise is partially suppressed, so that a saturation flag is not set in the measurement unit 6. However, a saturation flag may be set using the saturation flag S1PAveF and/or the saturation flag S11PAveF set for the input video signal S1 and/or the reference video signal S11, from which the difference signal S16 is generated.

In the measurement unit 6, on the basis of the saturation flags S1PAveF and S11PAveF and the noise-free-region detection flags S1NFF, S11NFF, and S16NFF, the noise level of the input video signal S1 is measured by the measurement-validity checker 24 and the noise-level measurement unit 35 selectively processing the three types of activities S1A, S11A, and S16A. Thus, the measurement unit 6 can measure the noise level with an improved accuracy.

More specifically, for each of the input video signal S1 and the reference video signal S11, the measurement-prohibited-region checker 27 of the measurement-validity checker 24 (FIGS. 1 and 9) detects regions for which any of the saturation flag S1PAveF or S11PAveF and the noise-free-region detection flag S1NFF or S11NFF is turned on, and turns on the measurement-prohibited-region checking flags S1NF and S11NF indicating that the regions are not suitable for noise-level measurement. Furthermore, regarding the difference signal S16, the measurement-prohibited-region checker 27 detects regions for which the noise-free-region detection flag S16NFF is turned on, and turns on the measurement-prohibited-region checking flag S16NF for each of the regions.

Regarding the input video signal S1, the activities S1A, S11A, and S16A of regions for which the measurement-prohibited-region checking flag S1NF, S11NF, or S16NF is turned on are not used for noise-level measurement by the noise-level measurement unit 35. Thus, on the basis of the results of detection by the saturated-region detector 22 based on the average values of pixel values (the flags S1PAveF and S11PAveF) and the results of detection by the noise-free-region detector 23 based on the activities S1A, S11A, and S16A (the flags S1NFF, S11NFF, and S16NFF), regions that are not suitable for noise-level measurement are excluded. This serves to improve the accuracy of noise-level measurement.

However, even if regions that are not suitable for noise-level measurement are excluded on the basis of the results of defection based, on the average values of pixel values and the results of detection based on the activities S1A, S11A, and S16A as described, above, depending on the nature of the input video signal S1, regions that are not suitable for noise-level measurement could still exist. It is assumed that noise is superposed substantially uniformly over the entirety of one field or frame. Thus, when regions that are not suitable for noise-level measurement are excluded on the basis of the results of detection based on the average values of pixel values and the results of detection based on the activities S1A, S11A, and S16A, regions with activities that differ considerably from activities detected in other regions are likely to include high-frequency components other than noise.

Thus, regarding the input video signal S1, furthermore, the minimum-activity calculator 29 selects activities S1A, S11A, and S16A for which the associated measurement-prohibited-region checking flag S1NF, S11NF, or S16NF is not turned on, and detects a minimum activity MinAct having a minimum value in one field or frame. Furthermore, an upper threshold ActMaxTh1 is set with reference to the minimum activity MinAct.

Furthermore, in the effective-noise-region and activity selector 31, regarding the input video signal S1, the activities S1A, S11A, and S16A are checked on the basis of the minimum activity MinAct and the upper threshold ActMaxTh1 to detect regions with activities that considerably differ from activities of detected for other regions, thereby detecting regions that are not suitable for noise-level measurement. Regarding the input video signal S1, the regions that are not suitable for noise-level measurement, detected on the basis of the minimum activity MinAct and the upper threshold ActMaxTh1, are also excluded. This serves to further improve the accuracy of noise-level measurement.

The minimum activity MinAct and the upper threshold ActMaxTh1 may be determined for each of the reference video signal S11, the reference video signal S11, and the difference-signal generator 16 and used for checking of the associated activity S1A, S11A, or S16A. Alternatively, the minimum activity MinAct and the upper threshold ActMaxTh1 may be determined on the basis of the distribution of the activities S1A, S11A, and S16A. When the minimum activity MinAct and the upper threshold ActMaxTh1 is determined on the basis of the distribution of the activities S1A, S11A, and S16A, for example, the minimum activity MinAct and the upper threshold ActMaxTh1 is determined by estimating noise distribution and using a standard deviation of the noise distribution.

Regarding the input video signal S1, considering the regions that are determined as not suitable for noise-level measurement on the basis of the measurement-prohibited-region checking flags S1NF, S11NF, and S16NF, and also considering the regions that are determined as not suitable for noise-level measurement on the basis of the minimum activity MinAct and the upper threshold ActMaxTh1, the effective-noise-region and activity selector 31 turns on the noise-region identification flags S1F, S11F, and S16F indicating regions that are suitable for noise-level measurement of the signals S1, S11, and S16.

Regarding the input video signal S1 (FIG. 10), in the noise-region statistical-value calculator 37, on the basis of the noise-region identification flags S1F, S11F, and S16F, the activities S1A, S11A, and S16A of the regions suitable for noise-level measurement are selectively obtained, and the selected activities S1A, S11A, and S16A are statistically processed on a field-by-field or frame-by-frame basis, thereby detecting a representative activity ACT. Furthermore, the number n of the activities S1A, S11A, and S16A used to calculate the representative activity ACT is calculated.

Regarding the input video signal S1 (FIGS. 10 and 11), the representative activity ACT in converted into an average noise level AveN, and the average noise level AveN is smoothed by the noise-level temporal smoother 40, whereby a noise-level measurement result S7 is generated. In the case of a field or frame including too many regions that are not suitable for noise-level measurement on the basis of the noise-region identification flags S1F, S11F, and S16F, it is assumed that it is difficult to accurately measure the noise level with the video content of the field or frame. The noise level detected in such a field or frame is considered to have a low confidence.

Thus, regarding the input video signal S1, in the measurement-prohibition checker 39 of the noise-level converter 36, the number n of the activities S1A, S11A, and S16A used to calculate the representative activity ACT is checked, and fields or frames that are not suitable for noise-level measurement are detected. Furthermore, in the noise-level temporal smoother 40, the switching circuit 41 is switched so that the representative activities ACT of the fields or frames not suitable for noise-level measurement are not smoothed, and the switching circuits 45 and 46 are switched so that the noise-level measurement result S7 is output by holding the previous value. Thus, according to this embodiment, the noise-level measurement result S7 is output without rapid changes in its value. This is favorable for noise removal by the noise filter 1.

Furthermore, when the noise level is large so that the error is large or when the noise level considerably varies between successive fields or frames, the filter-characteristics controller 44 enhances smoothing by the filtering unit 42. This also serves to prevent degradation of the accuracy of measurement.

(3) Advantages of the Embodiment

According to what has been described above, activities that serve as infra-field, or intra-frame features are checked against a threshold for noise-free regions, and regions with extremely small noise levels are excluded from noise-level measurement. Thus, noise level can be measured with an improved accuracy. More specifically, noise level is not measured in regions of graphical user interfaces of a television receiver, an optical disc recorder, or the like, or regions of caption information or the like added, during editing. Thus, the level of noise mixed in the video content can be measured accurately.

Furthermore, reference signals are processed similarly to determine regions to be used for noise-level measurement, and noise level is measured using the reference signals as well as video signals. This further improves the accuracy of noise-level measurement.

Furthermore, inter-frame or inter-field difference signals are also processed similarly to determine regions to be used for noise-level measurement, and noise level is measured using the difference signals as well as video signals. This further improves the accuracy of noise-level measurement.

Furthermore, the average values of pixel values are checked against a threshold for average values, and regions that are not suitable for noise-level measurement are excluded. Thus, regions where clipping has presumably occurred due to the effect of dynamic range can be excluded from noise-level measurement. This serves to further improve the accuracy of noise-level measurement.

Furthermore, an upper threshold is set on the basis of a minimum value of features detected by aggregating features, and the features are checked against the upper threshold. Thus, regions where motion compensation is not executed correctly can be excluded from noise-level measurement. This also serves to further improve the accuracy of noise-level measurement.

Furthermore, the number of regions excluded from noise-level measurement is counted on a field-by-field or frame-by-frame basis, and the noise-level measurement result is output by holding the previous value when the number of regions is greater than a predetermined value. Thus, by using the noise-level measurement result for processing by a noise filter, incorrect suppression of noise level can be avoided, and rapid change in image quality can be prevented.

Second Embodiment

Figure 14:
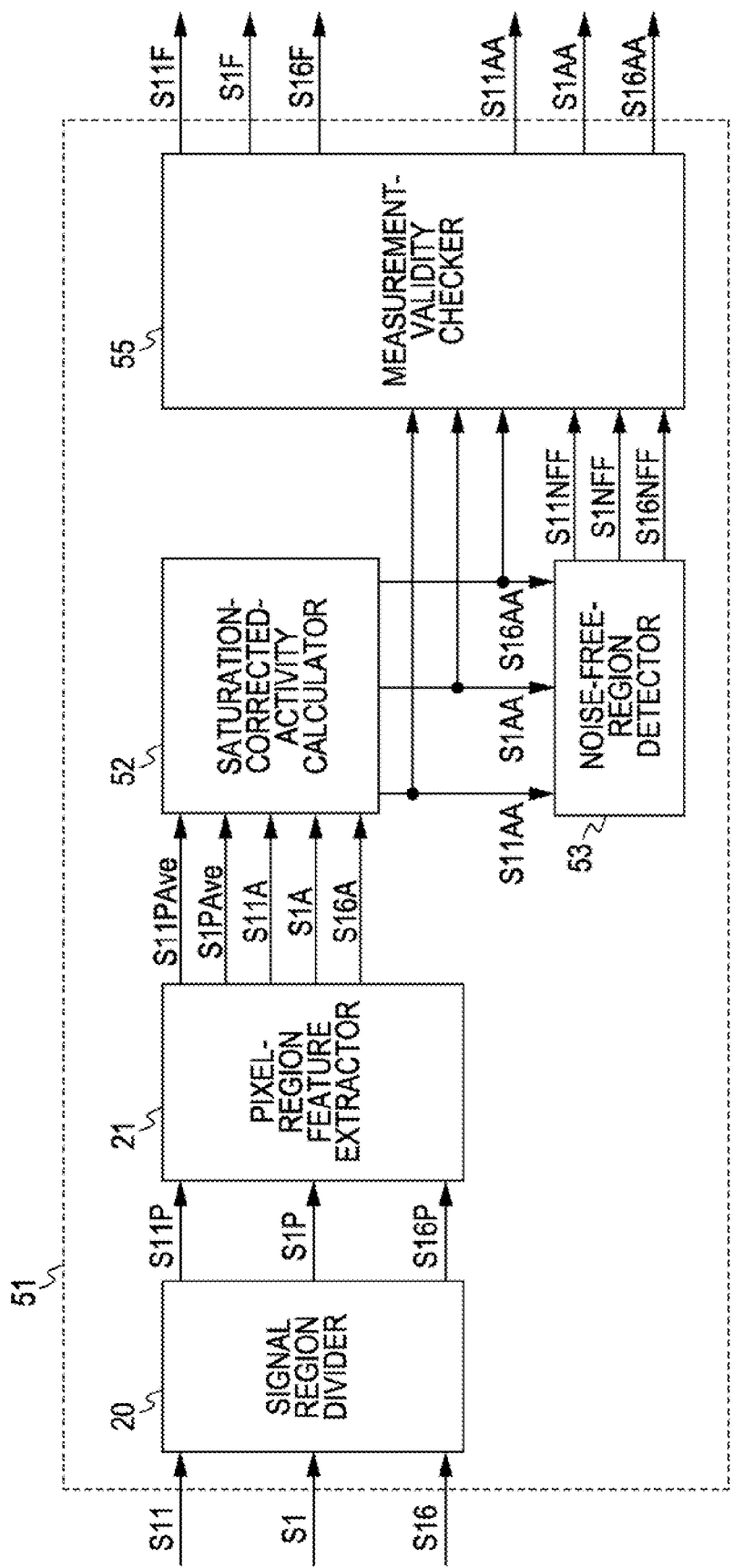
FIG. 14 is a block diagram showing the configuration of the noise-region detector in the noise filter according to the first embodiment.

FIG. 14 is a block diagram showing the configuration of a noise-region detector in a noise filter according to a second embodiment of the present invention. The noise filter according to the second embodiment is configured the same as the noise filter according to the first, embodiment except in that a noise-region detector 51 is used instead of the noise-region detector 18. In the following description, parts corresponding to those in the first embodiment are designated by the same numerals, and repeated description thereof will be refrained.

In the noise-region detector 51, instead of setting the flags S1PAveF and S11PAveF so that white-level-side regions and black-level-side regions where noise could have been suppressed are excluded from noise-level measurement, the activities S1A, S11A, and S16A are corrected to indicate noise levels before noise suppression so that these regions can also be used for noise-level measurement. Similarly to the noise-region detector 18 in the first, embodiment described above, in the noise-region detector 51, the signal region divider 20 and the pixel-region feature extractor 21 sequentially processes the input video signal S1, the reference video signal S11, and the difference signal S16 to obtain the activities S1A, S11A, and S16A and the average values S1PAve and S11PAve of pixel values in the input video signal S1 and the reference video signal S11.

Figure 15:
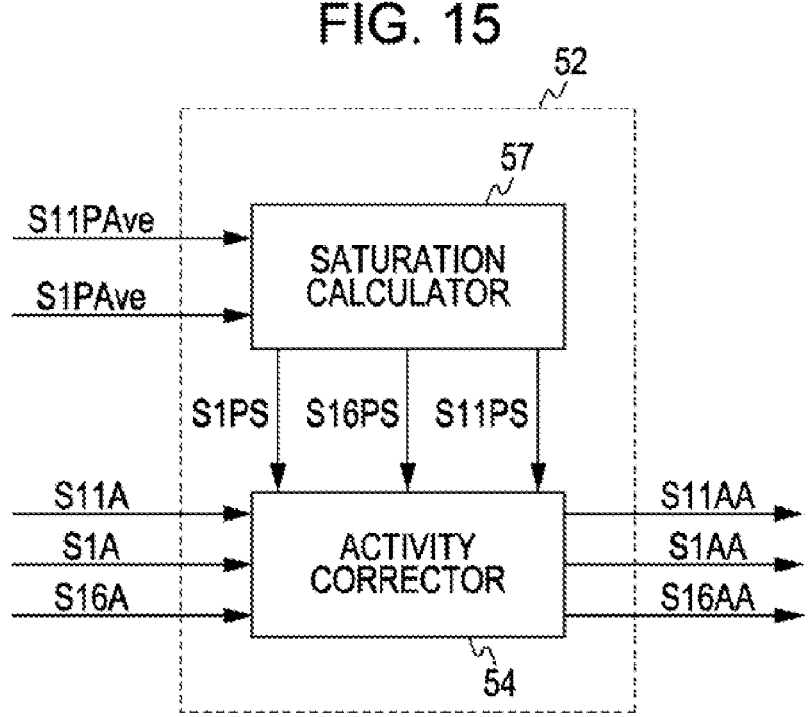
FIG. 15 is a block diagram showing the configuration of a saturation-corrected-activity calculator in the noise-region detector shown in FIG. 14.

In the noise-region detector 51, regarding white-level-side regions and black-level-side regions where noise could have been suppressed, a saturation-corrected-activity calculator 52 corrects the activities S1A, S11A, and S16A so that the activities S1A, S11A, and S16A indicate noise levels before noise suppression. More specifically, referring to FIG. 15, in the saturation-corrected-activity calculator 52, a saturation calculator 57 receives input of the average values S1PAve and S11PAve of pixel values of the input video signal S1 and the reference video signal S11 and calculates saturation degrees S1PS and S11PS of each region. The saturation degree is calculated by dividing the average value of pixel values by a maximum value that the pixel values can take on. Furthermore, regarding the activity S16A of the difference signal S16, the saturation calculator 57 takes the average of the average values S1PAve and S11PAve of the input video signal S1 and the reference video signal S11, and calculates a saturation degree S16PS on the basis of the average.

Figure 16:
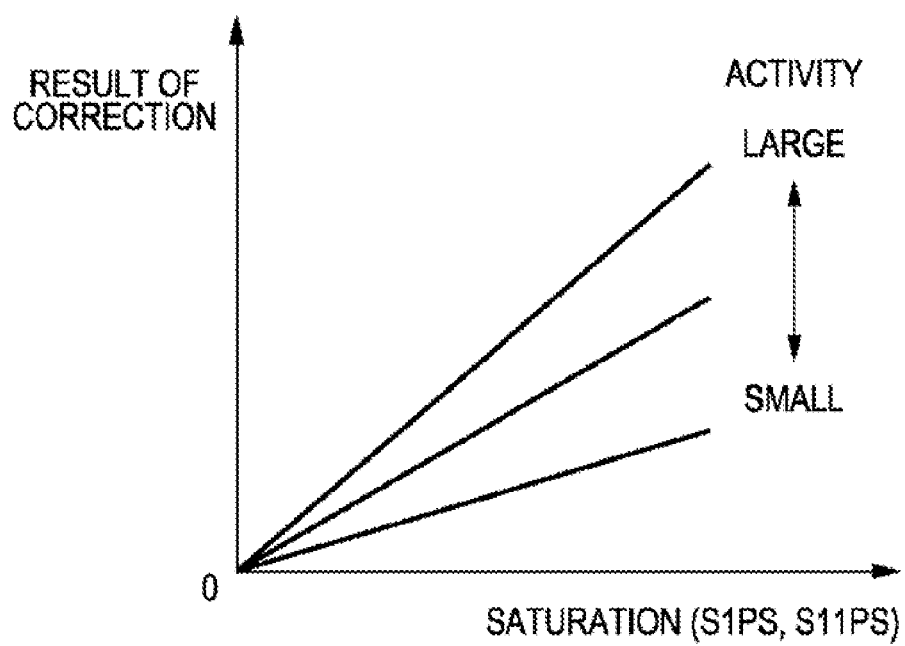
FIG. 16 is a graph showing a characteristic curve for explaining an operation of the saturation-corrected-activity calculator shown in FIG. 15.
Figure 17:
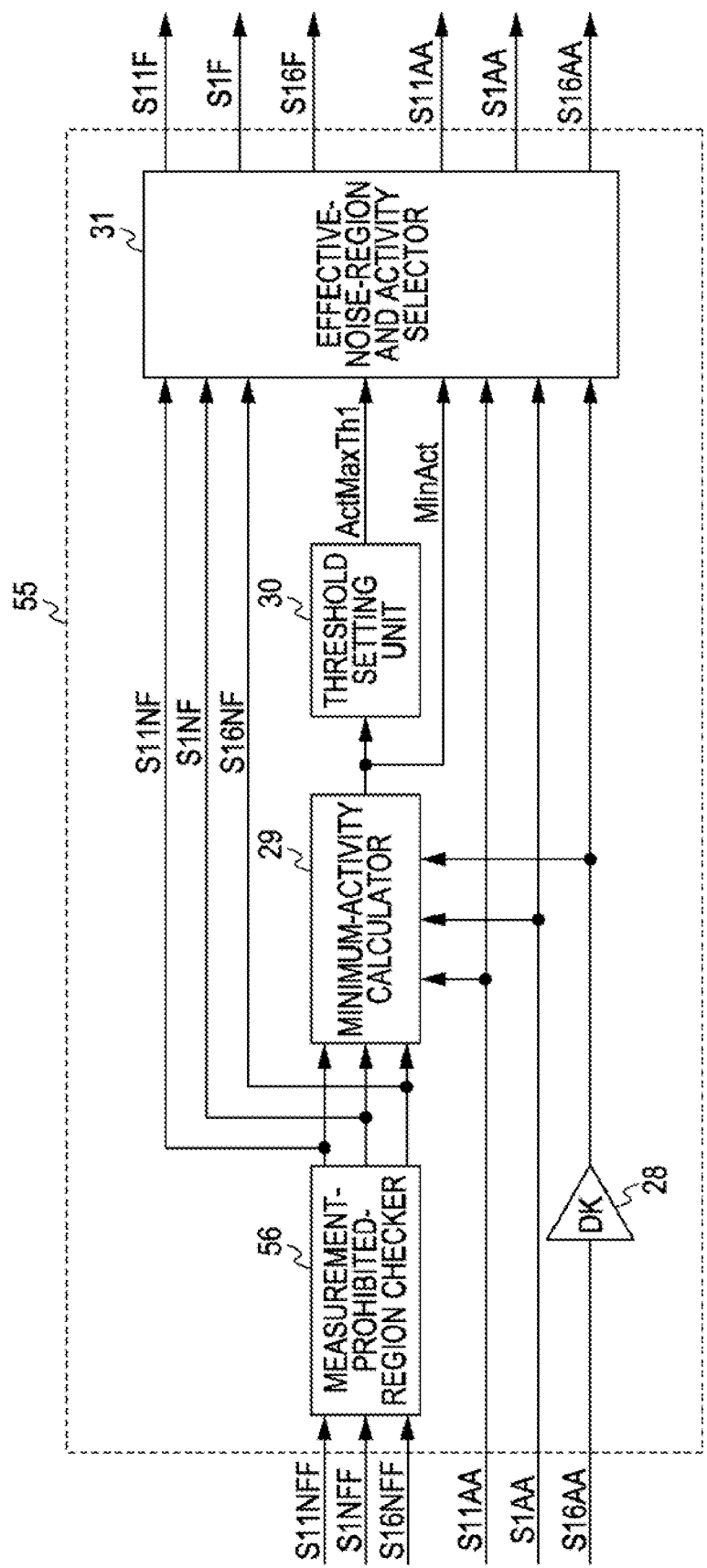
FIG. 17 is a block diagram snowing the configuration of a measurement-validity checker in the noise-region detector shown in FIG. 14.

An activity corrector 54 multiplies the activities S1A, S11A, and S16A of the input video signal S1, the reference video signal S11, and the difference signal S16 by the associated saturation degrees S1PS, S11PS, and S16PS, respectively, thereby correcting the activities S1A, S11A, and S16A, and outputs resulting activities S1AA, S11AA, and S16AA. FIG. 16 shows an example where only activities on the white-level side are corrected. In this case, the amount of correction is increased as the saturation degree becomes closer to the white level. In this embodiment, the activities S1A, S11A, and S16A are corrected for both black-level-side regions and white-level-side regions. Thus, as the degree of saturation changes from the black level to the white level, the amount of correction by the activity corrector 54 gradually decreases, then becomes substantially constant, and then gradually increases.

A noise-free-region detector 53 is configured the same as the noise-free-region detector 23 in the first embodiment except in that the threshold INFTh is defined in accordance with the correction of the activities S1A, S11A, and S16A by the saturation-corrected-activity calculator 52. The noise-free-region detector S3 checks the activities S1AA, S11AA, and S16AA against the thresholds INFTh and PBFTh to output the noise-free-region detection flags S1NFF, S11NFF, and S16NFF.

Figure 55:
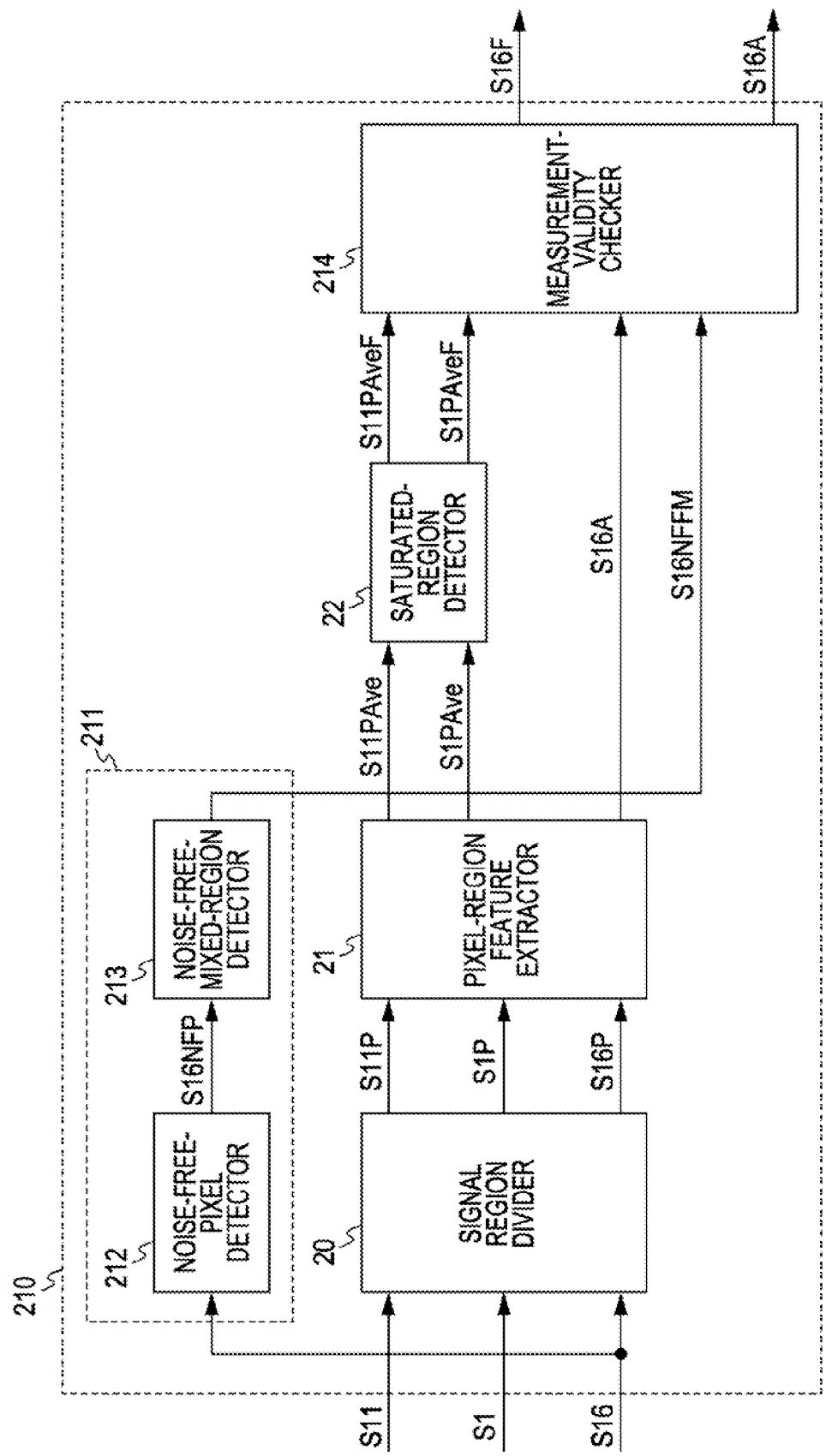
FIG. 55 is a block diagram showing the configuration of a noise-region detector in a noise filter according to a fourteenth embodiment, of the present invention.

Referring to FIG. 55, a measurement-validity checker 55 is configured the same as the measurement-validity checker 24 in the first embodiment except in that a measurement-prohibited-region checker 56 is configured in accordance with the configurations of the saturation-corrected-activity calculator 52 and the noise-free-region detector 53. On the basis of the results of processing by the saturation-corrected-activity calculator 52, and the noise-free-region detector 53, the measurement-validity checker 55 outputs the noise-region identification flags S1F, S11F, and S16F. Thus, the measurement-prohibited-region checker 56 outputs the noise-region identification flags S1F, S11F, and S16F simply by inverting the logic values of the noise-free-region detection flags S1NFF, S11NFF, and S16NFF.

Accordingly, the effective-noise-region and activity selector 31 outputs the flags S1P, S11F, and S16F by processing the corrected activities S1AA, S11AA, and S16AA instead of the activities S1A, S11A, and S16A before correction. Furthermore, the noise-level measurement unit 35 at the subsequent stage outputs the noise-level measurement result by processing the corrected activities S1AA, S11AA, and S16AA instead of the activities S1A, S11A, and S16A before correction.

According to this embodiment, instead of excluding white-level-side regions and black-level-side regions where noise could have been suppressed from noise-level measurement, the activities S1A, S11A, and S16A are corrected to indicate noise levels before noise suppression. According to this embodiment, advantages can be achieved similarly to the first embodiment. Furthermore, according to this embodiment, compared with the first embodiment, the number of regions used for noise-level measurement increases. Thus, noise level can be measured stably and accurately, for example, even in a case where a dark scene continues.

Third Embodiment

With the configuration according to the first embodiment, depending on the nature of the input video signal S1, the noise-free-region detection flags S1NFF, S11NFF, and S16NFF are turned on in most regions, so that the number of regions used for noise-level measurement becomes extremely small. This could degrade the confidence of measurement results.

Thus, in a third embodiment of the present invention, when the number of regions for which the noise-free-region detection flags S1NFF, S11NFF, and S16NFF are turned on increases, the number of regions excluded from noise-level measurement on the basis of the minimum activity MinAct is reduced. In the following description, parts corresponding to those in the first and second embodiments are designated by the same numerals, and repeated description thereof will be omitted.

Figure 18:
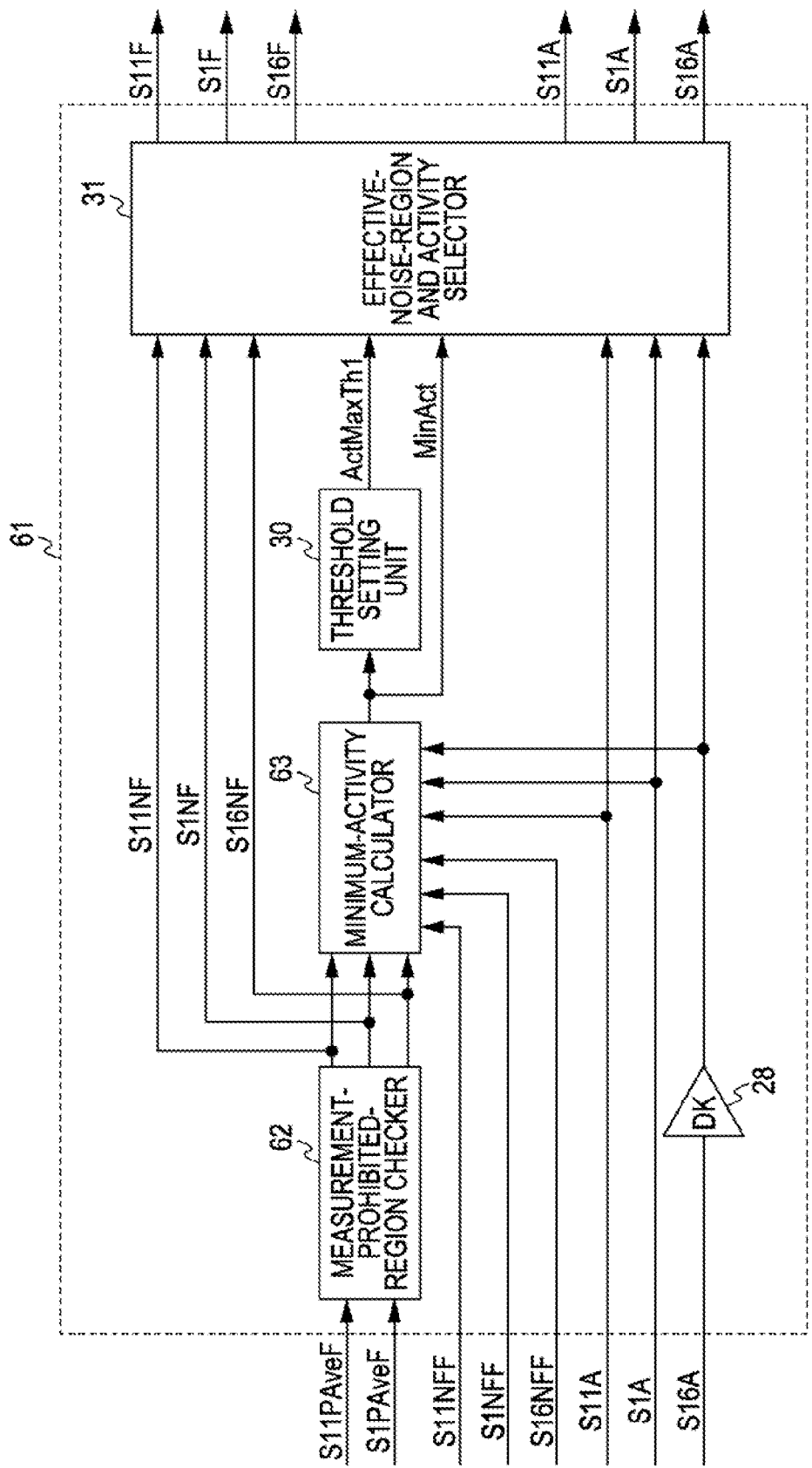
FIG. 18 is a block diagram showing the configuration of a measurement-validity checker in a noise filter according to a third embodiment of the present invention.

FIG. 18 is a block diagram showing the configuration of a measurement-validity checker in a noise filter according to the third embodiment of the present invention. The noise filter according to the third embodiment is configured the same as the noise filter according to the first embodiment except in that a measurement-validity checker 61 is provided instead of the measurement-validity checker 24.

In the measurement-validity checker 61, a measurement-prohibited-region checker 62 outputs the saturation flags S1PAveF and S11PAveF directly as the measurement-prohibited-region checking flags S1NF and S11NF. Furthermore, when any of the saturation flags S1PAveF and S11PAveF is turned on, the measurement-prohibited-region checker 62 turns on the measurement-prohibited-region checking flag S16NF.

A minimum-activity calculator 63 changes the value of the minimum activity MinAct in accordance with the number of regions for which the noise-free-region detection flag S1NFF, S11NFF, or S16NFF is turned on.

Figure 19:
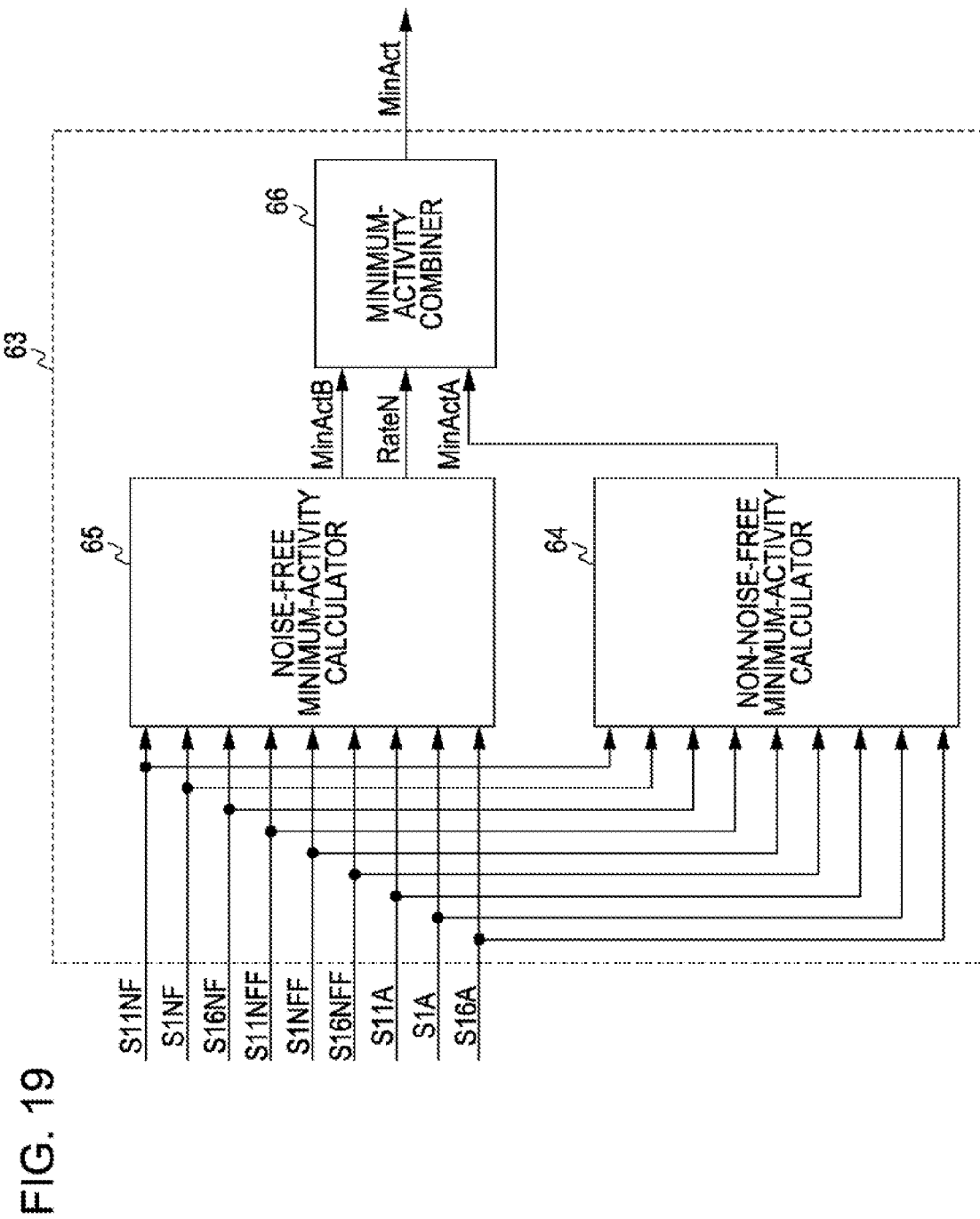
FIG. 19 is a block diagram showing the configuration of a minimum-activity calculator in the measurement-validity checker shown in FIG. 18.

FIG. 19 is a block diagram of the minimum-activity calculator 63. In the minimum-activity calculator 63, a non-noise-free minimum-activity calculator 64 processes the activities S1A, S11A, and S16A to output a minimum activity MinActA, similarly to the minimum-activity calculator 29 (FIG. 9). However, in this embodiment, as opposed, to the first embodiment, the measurement-prohibited-region checker 62 generates the measurement-prohibited-region checking flags S1NF, S11NF, and S16NF on the basis of only the saturation flags S1PAveF and S11PAveF. The non-noise-free minimum-activity calculator 64 separately processes the measurement-prohibited-region checking flags S1NF, S11NF, and S16NF output from the measurement-prohibited-region checker 62 and the noise-free-region detection flags S1NFF, S11NFF, and S16NFF, and selectively processes the activities S1A, S11A, and S16A of the regions used by the minimum-activity calculator 29 in the first embodiment, and thereby outputs a minimum activity MinActA. Thus, also in this embodiment, noise-free regions are not used for noise-level measurement.

Similarly to the non-noise-free minimum-activity calculator 64, a noise-free minimum-activity calculator 65 selectively processes the activities S1A, S11A, and S16A of regions that are usable for measurement according to the measurement-prohibited-region checking flags S1NF, S11NF, and S16NF and that are difficult to use for measurement according to the noise-free-region detection flags S1NFF, S11NFF, and S16NFF, and thereby outputs a minimum activity MinActB. Furthermore, the noise-free minimum-activity calculator 65 calculates and outputs an occupancy rate RateN by dividing the number N of the regions by the total number of regions.

Figure 20:
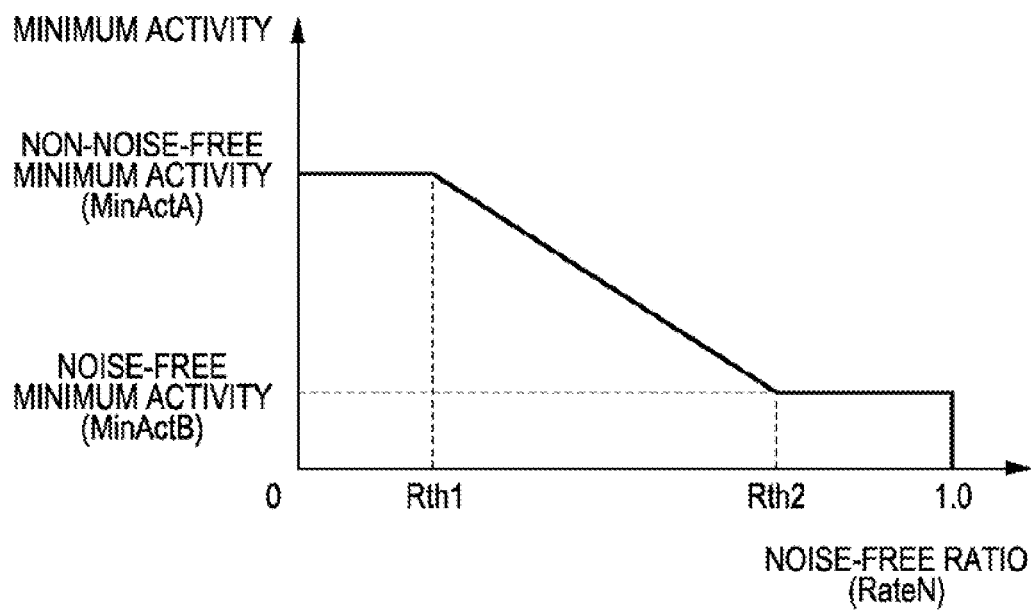
FIG. 20 is a graph showing a characteristics curve for explaining an operation of the minimum-activity calculator shown in FIG. 19.

A minimum-activity combiner 66 checks the occupancy rate RateN against a predetermined threshold RTH1. As shown in FIG. 20, when the occupancy rate RateN is less than or equal to the threshold RTH1, that is, when the number of regions that are difficult to use for measurement according to the noise-free-region detection flags S1NFF, S11NFF, and S16NFF is less than or equal to a predetermined number, the minimum-activity combiner 66 outputs the value of the minimum activity MinActA calculated, by the non-noise-free minimum-activity calculator 64 as the minimum activity MinAct.

Figure 21:
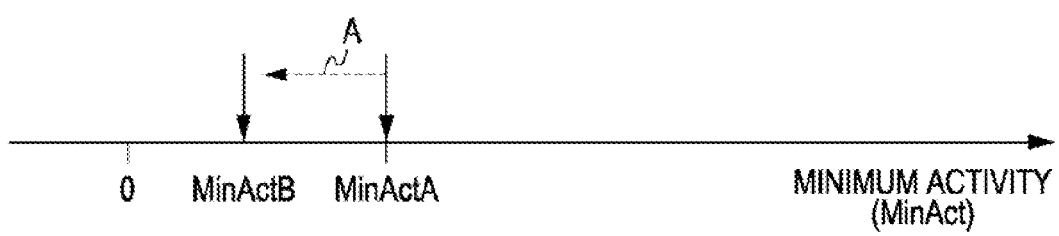
FIG. 21 is a graph showing a characteristics carve representing change in minimum activity calculated by the minimum-activity calculator shown in FIG. 19.

Furthermore, the minimum-activity combiner 66 checks the occupancy rate RateN against a predetermined threshold RTH2, which is greater than the threshold RTH1. When the occupancy rate RateN is greater than or equal to the threshold RTH1, that is, when the number of regions that are difficult to use for measurement according to the noise-free-region detection flags S1NFF, S11NFF, and S16NFF is greater than or equal to a predetermined number, the minimum-activity combiner 66 outputs the value of the minimum activity MinActB calculated by the noise-free minimum-activity calculator 65 as the minimum activity MinAct. When the occupancy rate RateN fails between the two thresholds RTH1 and RTH2, the minimum-activity combiner 66 outputs a minimum activity MinAct obtained by linear interpolation using the minimum activities MinActA and MinActB. Thus, as indicated by an arrow A in FIG. 21, as the number of regions that are difficult to use for measurement according to the noise-free-region detection flags S1NFF, S11NFF, and S16NFF increases, the minimum-activity combiner 66 decreases the value of the minimum activity MinAct to increase the number of regions used for noise-level measurement.

According to this embodiment, the occupancy rate of regions for which the noise-free-region detection flag S1NFF, S11NFF, or S16NFF is turned on is detected, and the number of regions that, are excluded from noise-level measurement on the basis of the minimum activity MinAct is decreased as the number of regions increases. Thus, degradation of the measurement accuracy due to the number of regions used for noise-level measurement becoming extremely small can be prevented. Accordingly, the accuracy of noise-level measurement can be improved further compared with the first embodiment.

Fourth Embodiment

Figure 22:
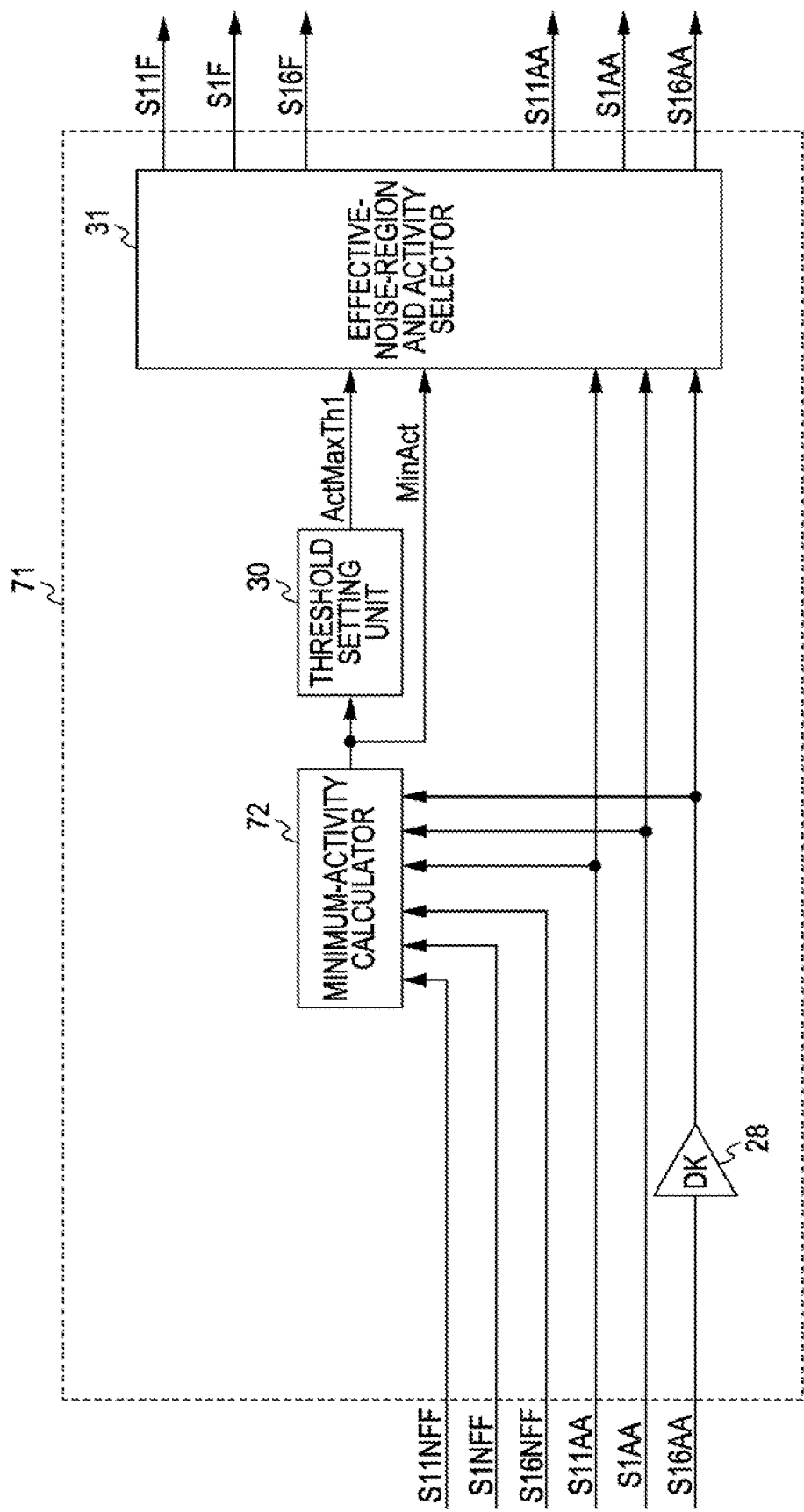
FIG. 22 is a block diagram showing the configuration of a measurement-validity checker in a noise filter according to a fourth embodiment of the present invention.

FIG. 22 is a block diagram, showing the configuration of a measurement-validity checker in a noise filter according to a fourth embodiment of the present invention. The noise filter according to the fourth embodiment is configured the same as the noise filter according to the second embodiment except in that a measurement-validity checker 71 is provided instead of the measurement-validity checker 55. Thus, also in this embodiment, instead of excluding white-level-side regions and black-level-side regions where noise could have been suppressed from noise-level measurement, the activities S1A, S11A, and S16A are corrected to indicate noise levels before noise suppression, and noise level is measured using the corrected activities S1AA, S11AA, and S16AA. In the following description, parts corresponding to those in the first to third embodiments are designated by the same numerals, and repeated description thereof will be refrained.

The measurement-validity checker 71 determines regions to be used for noise-level measurement according to setting of the minimum activity MinAct in the end. For this purpose, in the measurement-validity checker 71, a minimum-activity calculator 72 receives input of the corrected activities S1AA, S11AA, and S16AA indicating noise levels before noise suppression.

Figure 23:
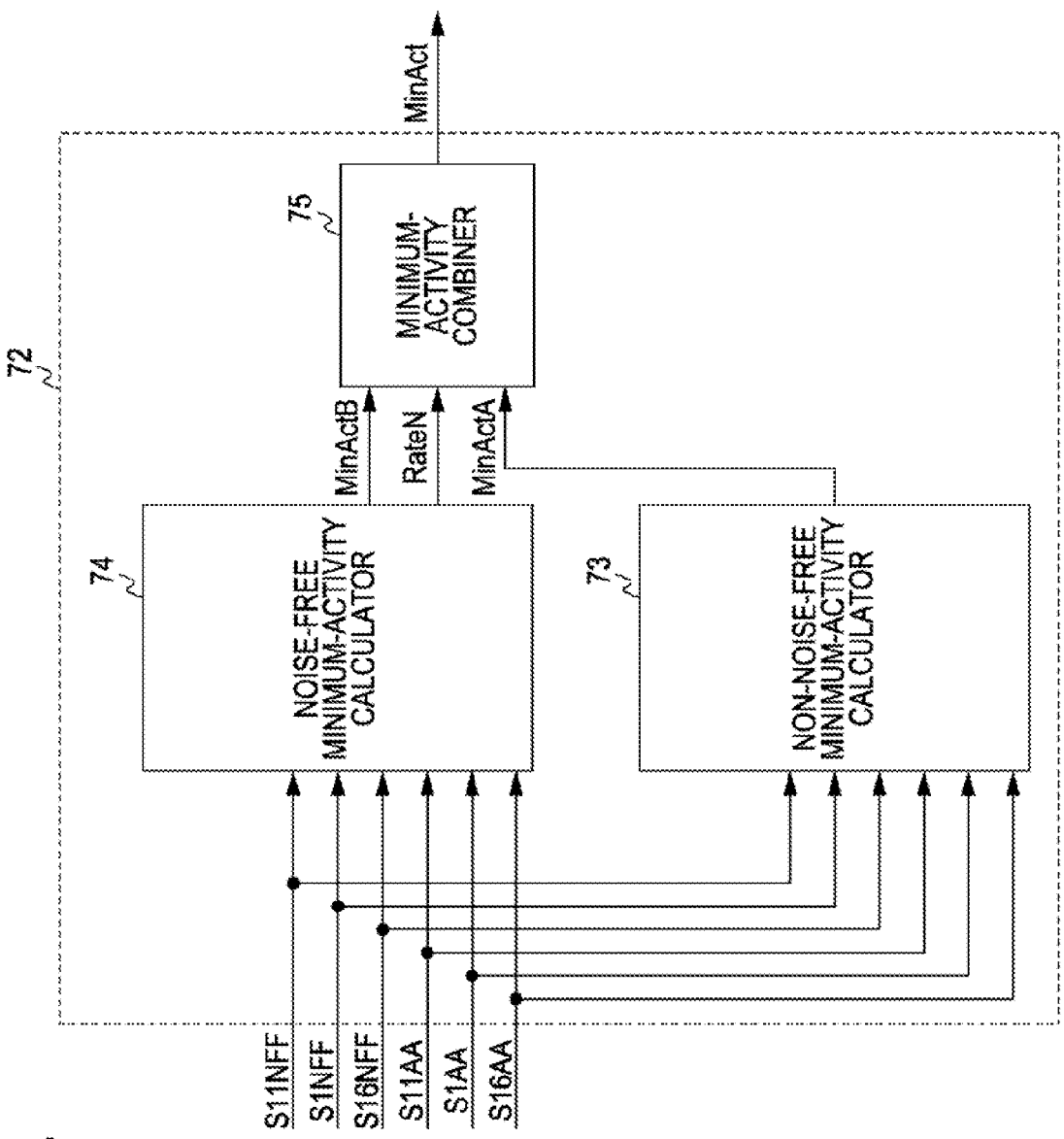
FIG. 23 is a block diagram showing the configuration of a minimum-activity calculator in the measurement-validity checker shown in FIG. 22.

As shown in FIG. 23 in comparison with FIG. 19, in the minimum-activity calculator 72, a non-noise-free minimum-activity calculator 73 selectively processes the activities S1AA, S11AA, and S16AA of the regions that are usable for noise-level measurement according to the noise-free-region detection flags S1NFF, S11NFF, and S16NFF, and thereby outputs a minimum activity MinActA. The selective processing of the activities S1AA, S11AA, and S16AA are executed similarly to the selective processing by the minimum-activity calculator 29 in the first embodiment.

On the other hand, a noise-free minimum-activity calculator 74 selectively processes the activities S1AA, S11AA, and S16AA of the regions that are difficult to use for noise-level measurement according to the noise-free-region detection flags S1NFF, S11NFF, and S16NFF, and thereby outputs a minimum activity MinActB. The selective processing of the activities S1AA, S11AA, and S16AA is executed similarly to the selective processing by the minimum-activity calculator 29 in the first embodiment. Furthermore, the noise-free minimum-activity calculator 74 calculates and outputs an occupancy rate RateN of the regions used to calculate the minimum activity MinActB.

A minimum-activity combiner combines the minimum activities MinActA and MinActB to output a minimum activity MinAct, similarly to the minimum-activity combiner 66.

The effective-noise-region and activity selector 31 sets the noise-region identification flags S1F, S11F, and S16F on the basis of the upper threshold ActMaxTh1 and the minimum activity MinAct. More specifically, the effective-noise-region and activity selector 31 turns off the noise-region identification flags S1F, S11F, and S16F when the value of the associated activity S1AA, S11AA, or S16AA is less than the minimum activity MinAct or greater than the upper threshold ActMaxTh1, since it is assumed that noise-level measurement based on these activities is not reliable.

According to this embodiment, on the basis of the setting of the minimum activity MinAct, regions of caption information or the like are excluded from noise-level measurement in the end, and the minimum activity MinAct is changed according to the occupancy rate of the regions excluded from noise-level measurement. Thus, in addition to the advantages of the first embodiment, noise level can be measured stably and accurately even when, for example, a dark scene with little noise continues.

Fifth Embodiment

Figure 24:
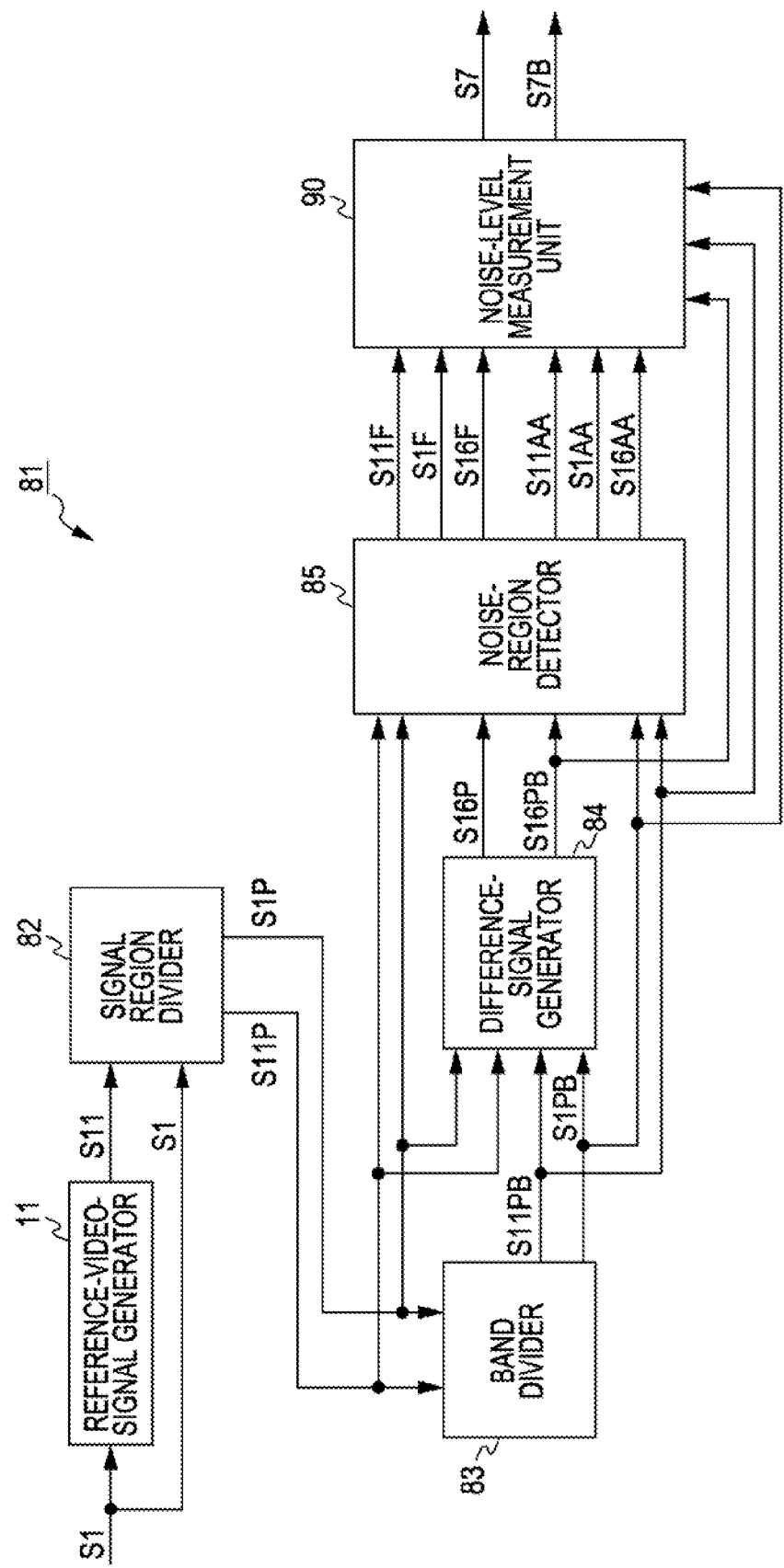
FIG. 24 is a block diagram showing the configuration of a measurement unit is a noise filter according to a fifth embodiment of the present invention.

FIG. 24 is a block diagram showing the configuration of a measurement unit in a noise filter according to a fifth embodiment of the present invention. In the following description, parts corresponding to those in the embodiments described above are designated by the same numerals, and repeated description thereof will be refrained.

In a measurement unit S1, a signal region divider 82 receives input of the input video signal S1 and the reference video signal S11 output from the reference-video-signal generator 11, and generates a partial input video signal S1P and a partial reference video signal S11P. The signal region divider 82 generates the partial input video signal S1P and the partial reference video signal S11P similarly to the signal region divider 20 in the first embodiment.

A band divider S3 receives input of the partial input video signal S1P and the partial reference video signal S11P, and converts each of these signals into signals of a plurality of bands in the frequency domain. The conversion into the frequency domain can be executed, for example, by orthogonal transform such as Hadamard transform, Haar transform, or discrete cosine transform, wavelet transform using at filter bank, or subband division. The band divider 83 outputs the signals of the plurality of bands as partial input video band signals S1PB and partial reference video band signals S11PS.

A difference-signal generator 84 subtracts the partial reference video signal S11P from the partial input video signal S1P to output a partial difference signal S168. Furthermore, for each band, the difference-signal generator 84 subtracts the partial reference video band signal S11PB from the partial input video band signal S1PB to output a partial difference band signal S16PB.

A noise-region detector 85 processes the partial input video signal S1P, the partial reference video signal S11P, and the partial difference signal S16P, which are signals in a pixel region, similarly to the noise-region detector 51 in the second embodiment, and thereby outputs the flags S1P, S11F, and S16F and the activities S1AA, S11AA, and S16AA. Furthermore, the noise-region detector 85 detects and outputs features in the partial input video band signal S1PB, the partial reference video band signal S11PB, and the partial difference band signal S16PB for each band, which are signals in the frequency domain.

Figure 25:
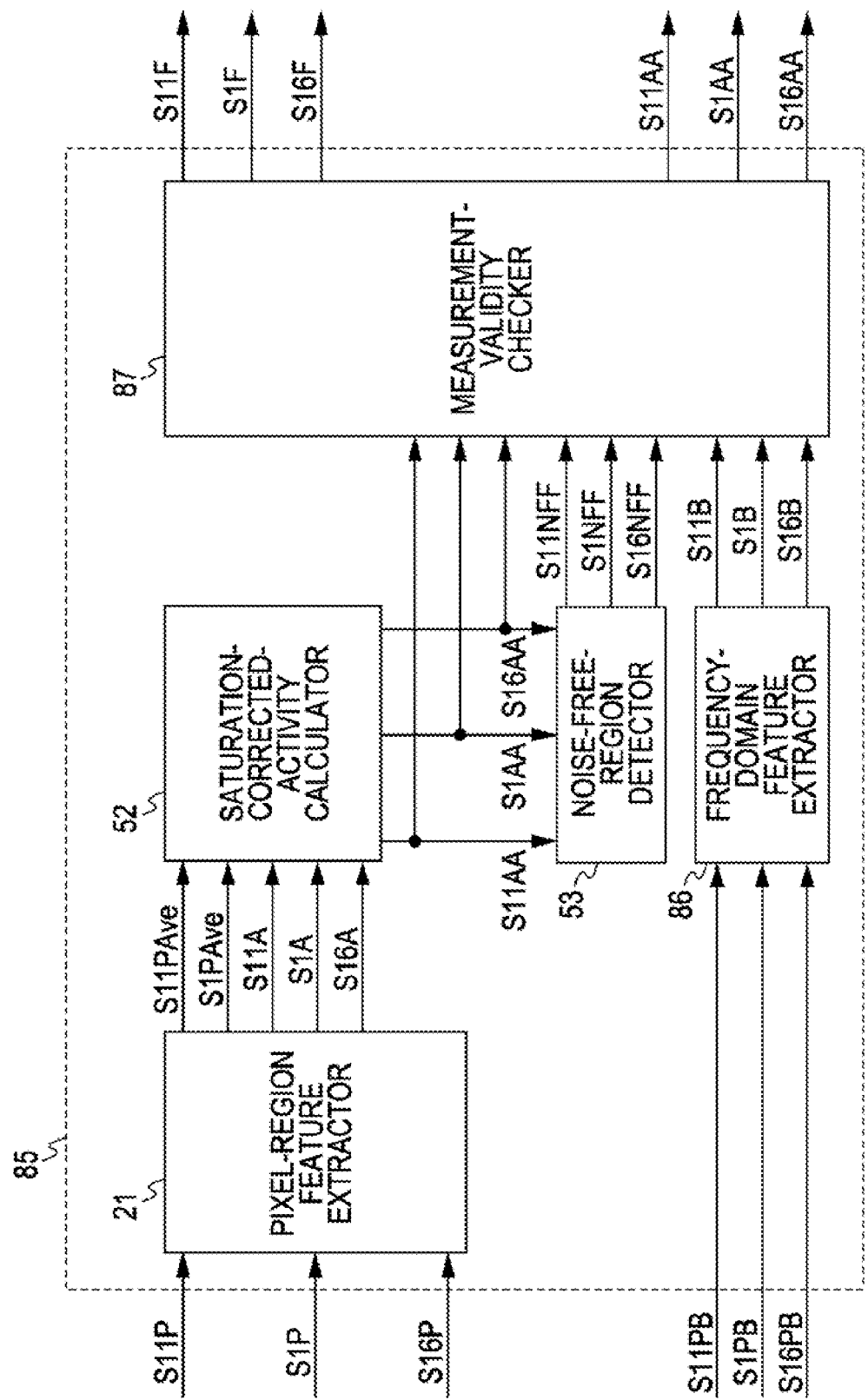
FIG. 25 is a block diagram showing the configuration of a noise-region detector in the measurement unit shown in FIG. 24.

Thus, as shown in FIG. 25, in the noise-region detector 85, the system for processing signals in a pixel region is configured the same as that in the noise-region detector 51 in the second embodiment.

Figure 26:
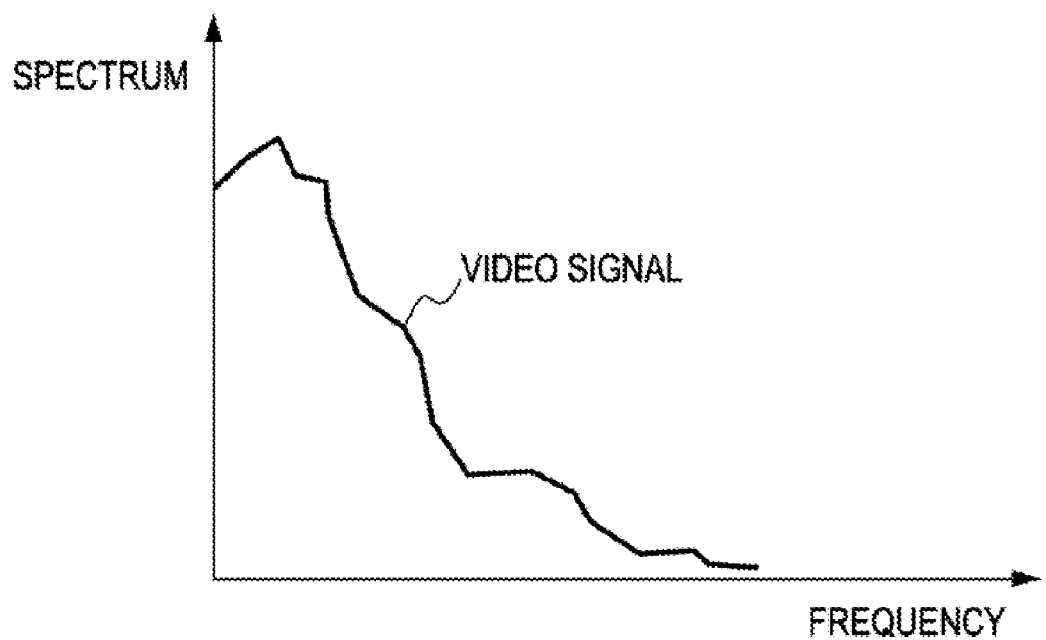
FIG. 26 is a graph showing a characteristics curve representing ordinary frequency characteristics of video signals.
Figure 27:
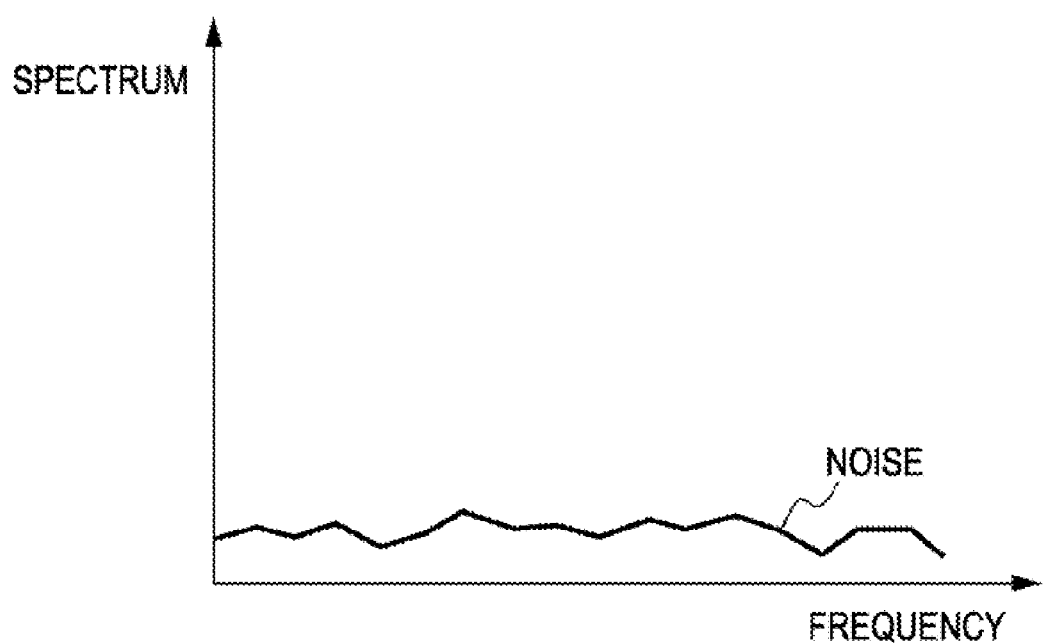
FIG. 27 is a graph showing a characteristics curve representing ordinary frequency characteristics of noise.

A frequency-domain feature extractor 86 detects flatness degrees S1B, S11B, and S16B for each region, indicating noise likelihood, from the frequency-domain signals S1PB, S11PB, and S16PB. As shown in FIG. 26, generally the spectral distribution of video signals is concentrated at specific frequencies. On the other hand, as shown in FIG. 27, the spectrum of noise is distributed over a wide frequency range. Thus, as the spectral distribution becomes more flat, it can be estimated that the signal includes more noise components. As the flatness degrees S1B, S11B, and S16B, a variance of the spectrum of each band, a ratio of a maximum value and a minimum value of the spectrum, or the like can be used.

Figure 28:
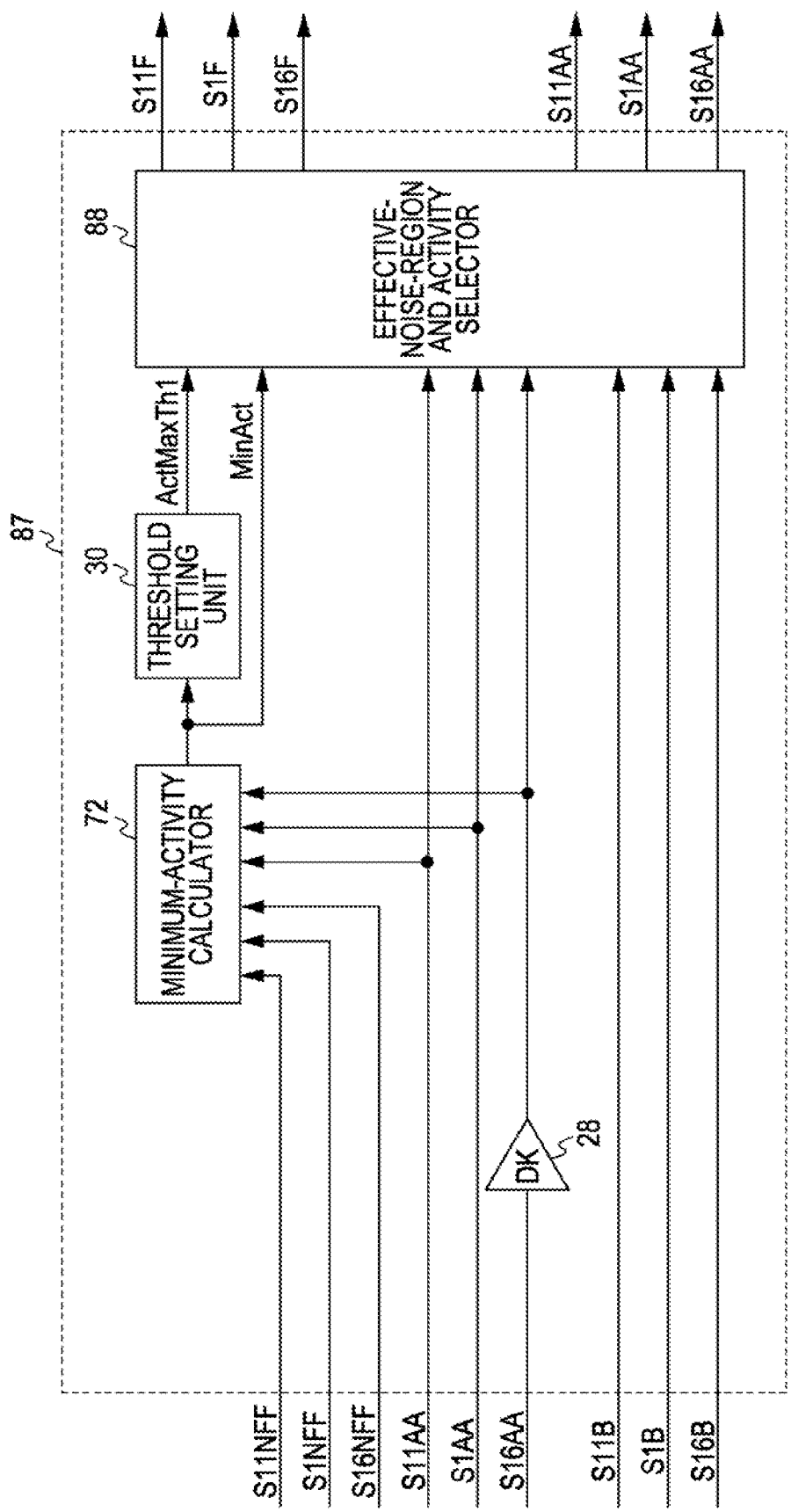
FIG. 28 is a block diagram showing the configuration of a measurement-validity checker in the noise-region detector shown in FIG. 25.

A measurement-validity checker 87 sets the flags S1F, S11F, and S16F in consideration of the associated, flatness degrees S1B, S11B, and S16B in addition to the conditions of setting of the flags S1F, S11F, and S16F used by the measurement-validity checkers in the embodiments described earlier. Thus, as shown in FIG. 28, the measurement-validity checker 87 is configured the same as the measurement-validity checker 71 in the fourth embodiment except an effective-noise-region and activity selector 88 that sets the flags S1F, S11F, and S16F.

The effective-noise-region and activity selector 88 turns on the flags S1F, S11F, and S16F of regions that satisfy the conditions of setting of the flag S1F, S11F, or S16F in the effective-noise-region and activity selector 31 and in which noise components are dominant according to the spectral distribution determined, by checking the associated flatness degree S1B, S11B, or S16B against a predetermined threshold. Thus, in this embodiment, regions to be used for noise-level measurement are determined with reference to the spectrum distribution, which is a feature of video signals in the frequency domain.

Figure 29:
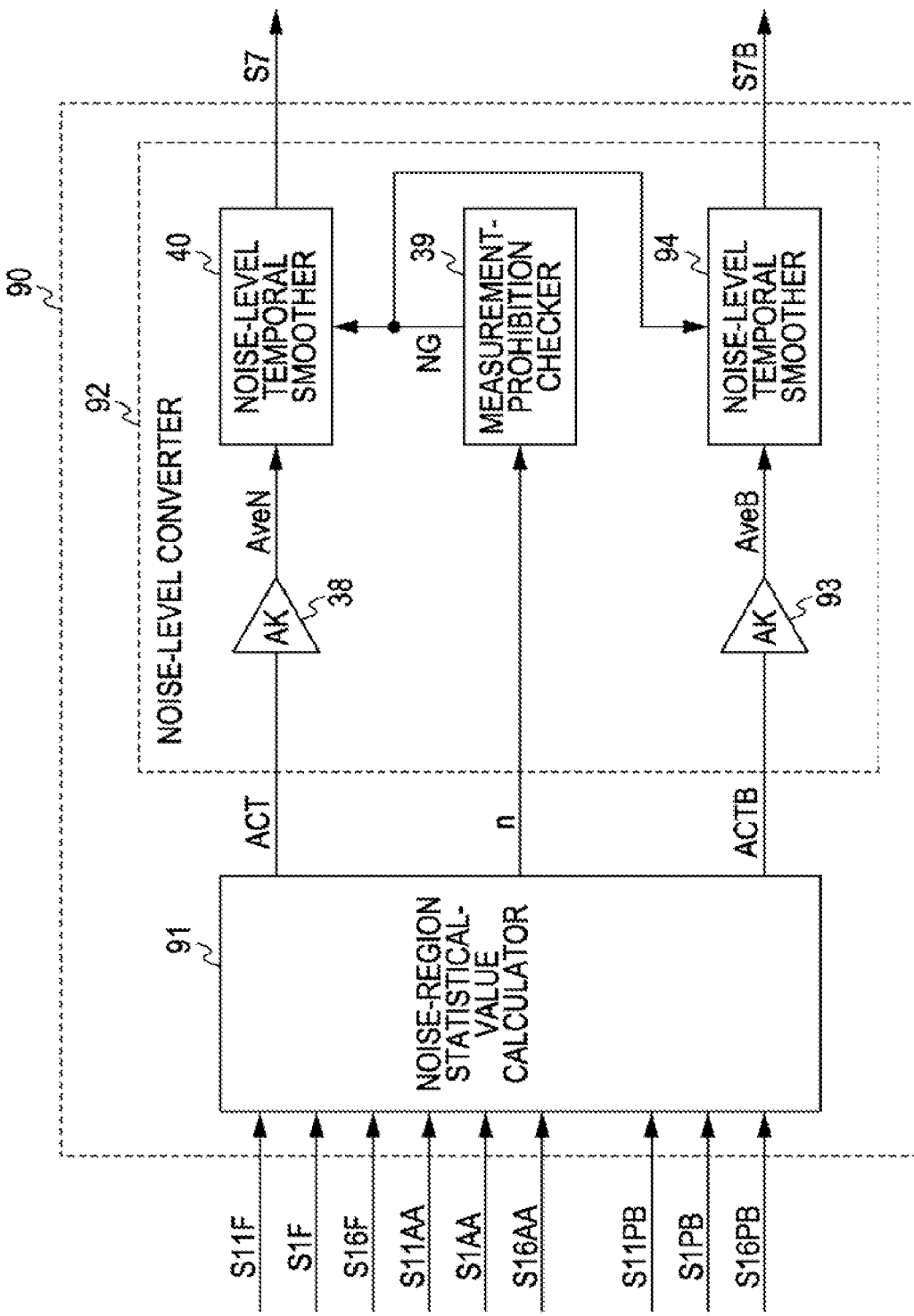
FIG. 29 is a block diagram showing the configuration of a noise-level measurement unit in the measurement unit shown in FIG. 24.

FIG. 29 is a block diagram showing the configuration of a noise-level measurement unit 90. In the noise-level measurement unit 90, similarly to the noise-region statistical-value calculator 37, a noise-region statistical-value calculator 91 statistically processes the activities S1A, S11AA, and S16AA of regions for which the noise-region identification flag S1F, S11F, or S16F is turned on, and thereby outputs a representative activity ACT representing the activities S1AA, S11AA, and S16AA.

Furthermore, for each of the regions for which the noise-region identification flag S1F, S11F, or S16F is turned on, the noise-region statistical-value calculator 91 selectively processes the partial input video band, signal S1PB, the partial reference video band signal S11PB, and the partial difference band, signal S16PB, and thereby outputs a representative activity ACTB of the noise regions corresponding to the representative activity ACT. In this case, the noise-region statistical-value calculator 91 calculates a squared average, an absolute average, a standard deviation, or the like of spectral values in a plurality of regions for each band, and thereby outputs a representative activity ACTB for each band.

A noise-level converter 92 processes the representative activity ACT as in the embodiments described earlier to output a noise-level measurement result S7. On the other hand, the representative activity ACTB of the noise regions is multiplied by a gain AK in an amplifying circuit 93 on a band-by-band basis to correct the valise thereof, and the result is input to a noise-level temporal smoother 94.

The noise-level temporal smoother 94 temporally smoothes the signal output from the amplifying circuit 93 for each band, and outputs a noise-level measurement result S7B for each band.

According to this embodiment, the flags S1F, S11F, and S16F are set on the basis of flatness degrees in the frequency domain so that regions to be used for noise-level measurement can be changed on the basis of the spectral flatness detected for each band. Thus, even when it is difficult to determine regions to foe used for noise-level measurement on the basis of activities based on pixel values, regions to be used for noise-level measurement can be determined appropriately. More specifically, even with a frame or field including a texture portion with low contrast or a region with small pixel values, regions that are suitable for noise-level measurement can be determined reliably on the basis of the flatness in the frequency domain. Accordingly, the accuracy of noise-level measurement can be improved further compared with the embodiments described earlier.

Furthermore, since a noise-level measurement result is output for each band by effectively using the flatness in the frequency domain, flexible processing is allowed when video signals are divided into bands before processing. More specifically, in the case of a noise filter, when video signals are divided into bands and noise is suppressed, the level of a correction signal for each band can be set appropriately. Furthermore, application to techniques for improving image quality, such as image enhancement, is possible.

Sixth Embodiment

Figure 30:
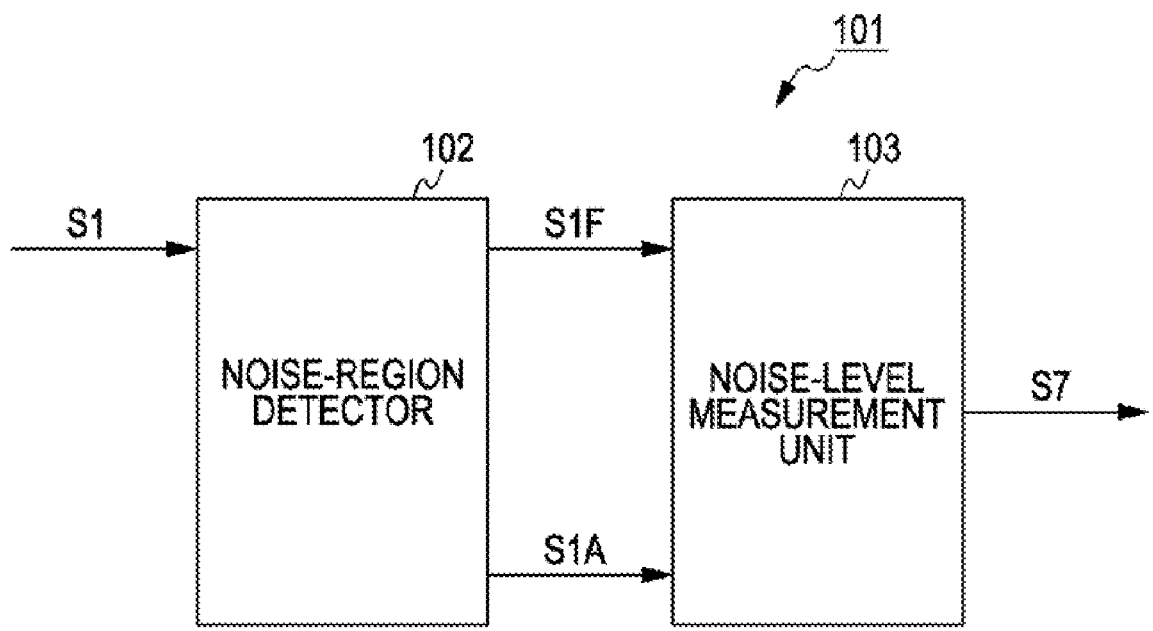
FIG. 30 is a block diagram showing the configuration of a measurement unit in a noise filter according to a sixth embodiment of the present invention.

FIG. 30 is a block diagram, showing the configuration of a measurement unit in a noise filter according to a sixth embodiment of the present invention. In this embodiment, a measurement unit 101 measures noise level using only the input video signal S1.

For this purpose, in the measurement unit 101, the input video signal S1 is directly input to a noise-region detector 102, and an output of the noise-region detector 102 is processed by a noise-level measurement unit 103, whereby a noise-level measurement result S7 is output.

Figure 31:
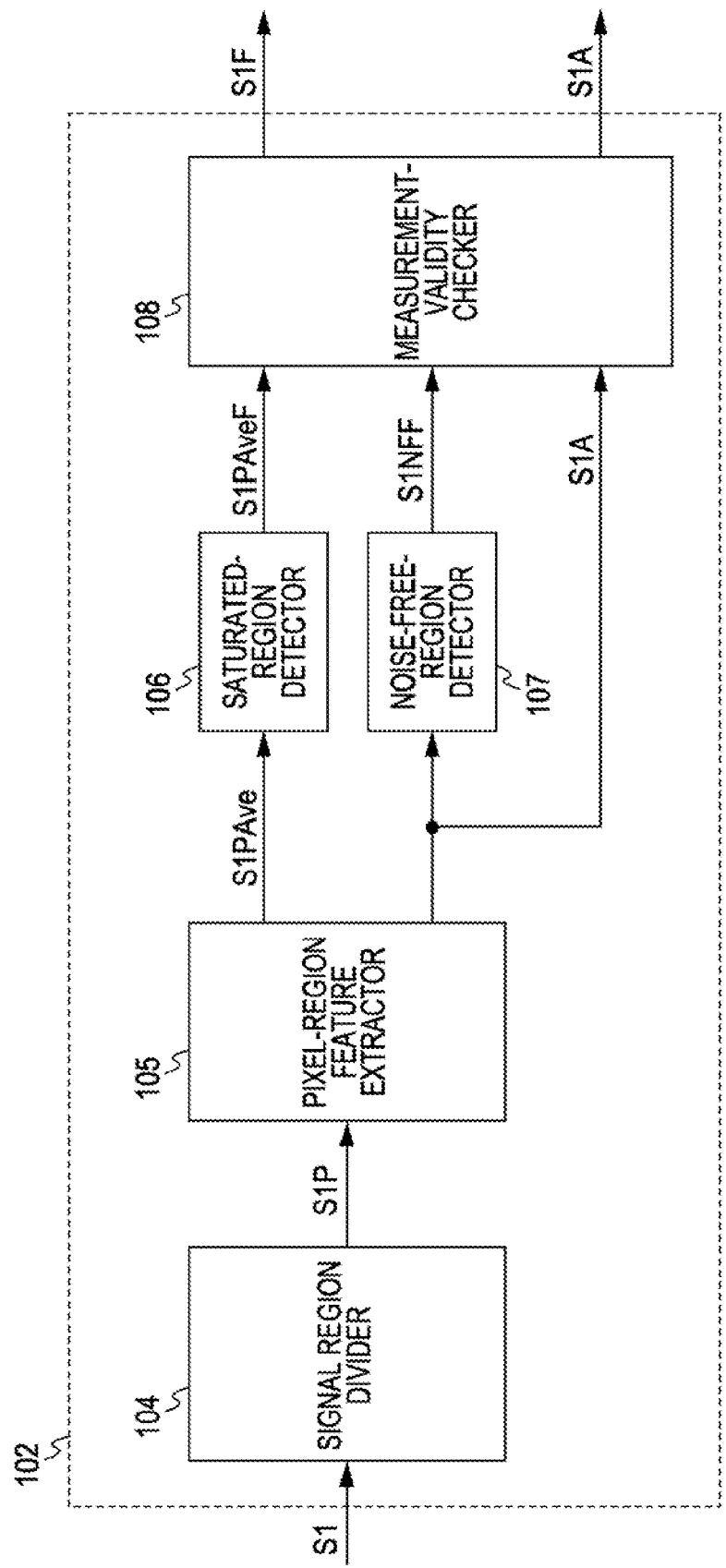
FIG. 31 is a block diagram showing the configuration of a noise-level measurement unit in the measurement unit shown in FIG. 30.

As shown in FIG. 31, the noise-region detector 102 includes components 104 to 108, with which the parts regarding the reference video signal S11 and the difference-signal generator 16 in the noise-region detectors in the embodiments described above are omitted, so that the noise-region detector 102 outputs the activity S1A and the noise-region identification flag S1F of the input video signal S1.

Similarly, regarding the noise-level measurement unit 103, the parts regarding the reference video signal S11 and the difference signal S16 in the noise-level measurement units in the embodiments described above are omitted.

Also with this embodiment, in which noise level is measured using only the input video signal S1, the accuracy of noise level-measurement can be improved.

Seventh Embodiment

Figure 32:
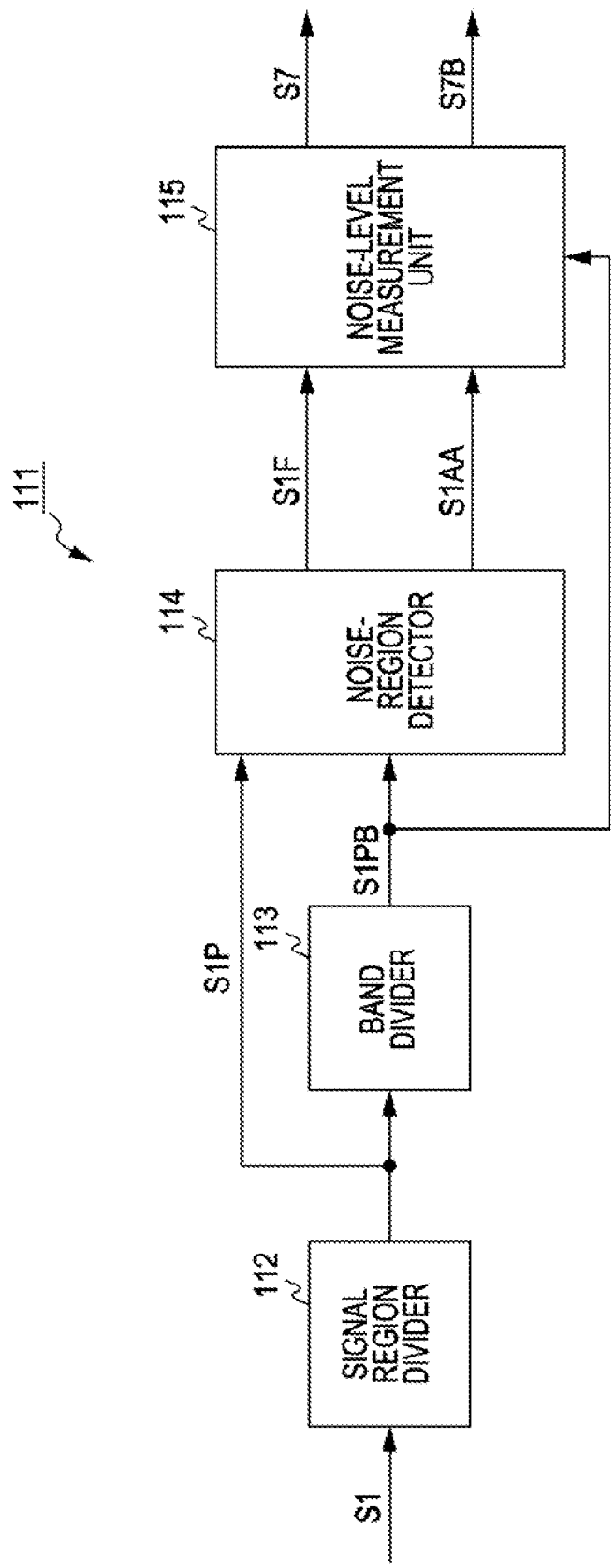
FIG. 32 is a block diagram showing the configuration of a measurement unit, in a noise filter according to a seventh embodiment of the present invention.

FIG. 32 is a block diagram showing the configuration of a measurement unit in a noise filter according to a seventh embodiment of the present invention. In this embodiment, a measurement unit 111 measures noise level using only the input video signal S1, with the input video signal S1 divided into bands similarly to FIG. 5 described with reference to FIG. 24.

For this purpose, in the measurement unit 111, the input video signal S1 is directly input to a signal region divider 112, and the partial input video signal S1P output from the signal region divider 112 is input to a band divider 113. Furthermore, the outputs of the signal region divider 112 and the band divider 113 are sequentially processed by a noise-region detector 114 and a noise-level measurement unit 115 to output noise-level measurement results S7 and S7B.

Regarding the signal region divider 112, the band divider 113, the noise-region detector 114, and the noise-level measurement unit 115, the parts relating to the reference video signal S11 and the difference signal S16 are omitted from the corresponding components in the fifth embodiment described earlier.

Also with this embodiment, in which noise level is measured using only the input video signal S1 divided into bands, the accuracy of noise-level measurement can be improved.

Eighth Embodiment

Figure 33:
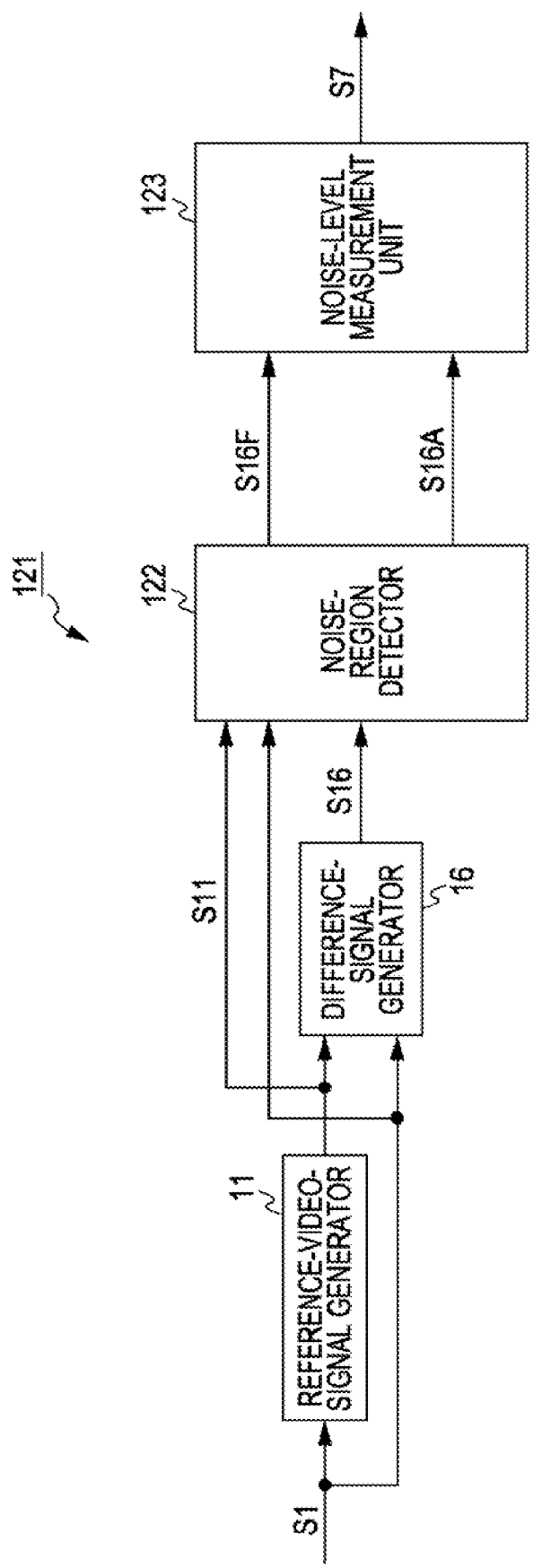
FIG. 33 is a block diagram showing the configuration of a measurement unit in a noise filter according to an eighth embodiment of the present invention.

FIG. 33 is a block diagram snowing the configuration of a measurement unit in a noise filter according to an eighth embodiment of the present invention in comparison with FIG. 3, Regarding a measurement unit 121 in this embodiment, parts corresponding to those in the first embodiment described earlier are designated, by the same numerals, and repeated description thereof will be refrained. In the measurement unit 121, a noise-region detector 122 generates only the activity S16A and the noise-region identification flag S16F for the difference signal S16, and a noise-level measurement unit 123 outputs a noise-level measurement result S7 using the activity S16A and the noise-region identification flag S16F.

Figure 34:
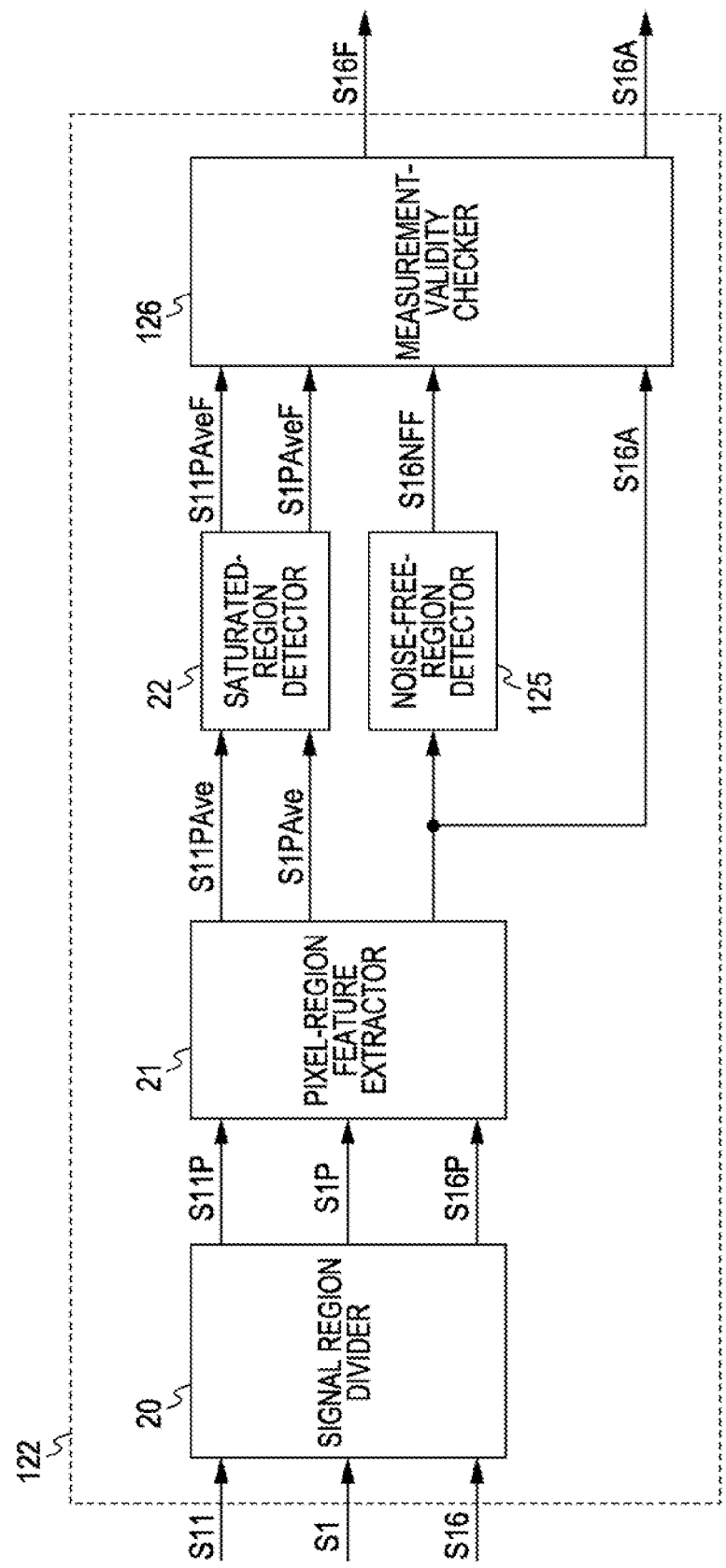
FIG. 34 is a block diagram snowing the configuration of a noise-region detector in the measurement unit shown in FIG. 33.

FIG. 34 is a block diagram showing the configuration of the noise-region detector 122. The noise-region detector 122 processes the input video signal S1, the reference video signal S11, and the difference signal S16 by the signal region divider 20, the pixel-region feature extractor 21, and the saturated-region detector 22 to output the saturation flags S1PAveF and S11PAveF.

A noise-free-region detector 125 is configured similarly to the noise-free-region detector 23 in the first embodiment with the parts relating to the input video signal S1 and the reference video signal S11 omitted therefrom, so that the noise-free-region detector 125 outputs only the noise-free-region detection flag S16NFF for the difference signal S16. A measurement-validity checker 126 is configured similarly to the corresponding component in the first embodiment with the parts relating to the input video signal S1 and the reference video signal S11 omitted therefrom, so that the measurement-validity checker 126 outputs only the noise-region identification flag S16F and the activity S16A for the difference signal S16.

Figure 35:
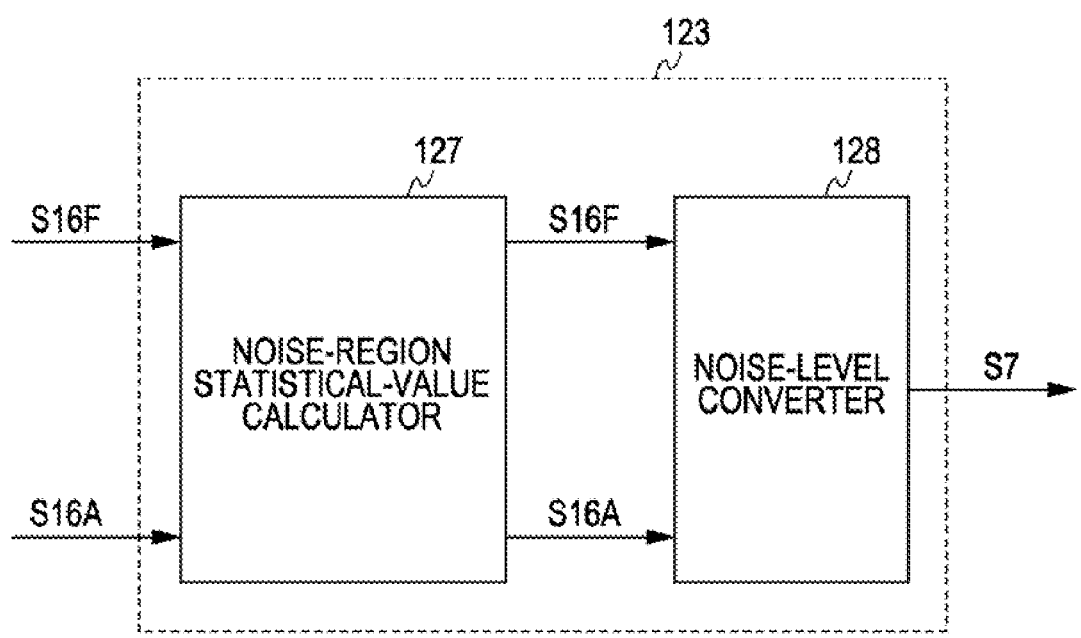
FIG. 35 is a block diagram showing the configuration of a noise-level measurement unit in the measurement unit, shown in FIG. 33.

In the noise-level measurement unit 123, as shown in FIG. 35, a noise-region statistical-value calculator 123 and a noise-level converter 128 sequentially processes the noise-region identification flag S16F and the activity S16A to output a noise-level measurement result S7. The noise-region statistical-value calculator 127 and the noise-level converter 128 are configured similarly to the corresponding components in the first embodiment with the parts relating to the input video signal S1 and the input video signal S1 omitted therefrom.

Also with this embodiment, in which noise level is measured using only the difference signal S16, the accuracy of noise-level measurement can be improved. When noise level is measured using only the difference signal as in this embodiment, since only time-varying noise components are measured in principle, it is possible to reduce noise effectively with an IIR filter or the like that reduces time-varying noise. Thus, it is possible to prevent occurrence of a type of blurring called trailing at boundaries of moving objects with low contrast. Accordingly, noise can be suppressed reliably.

Ninth Embodiment

Figure 36:
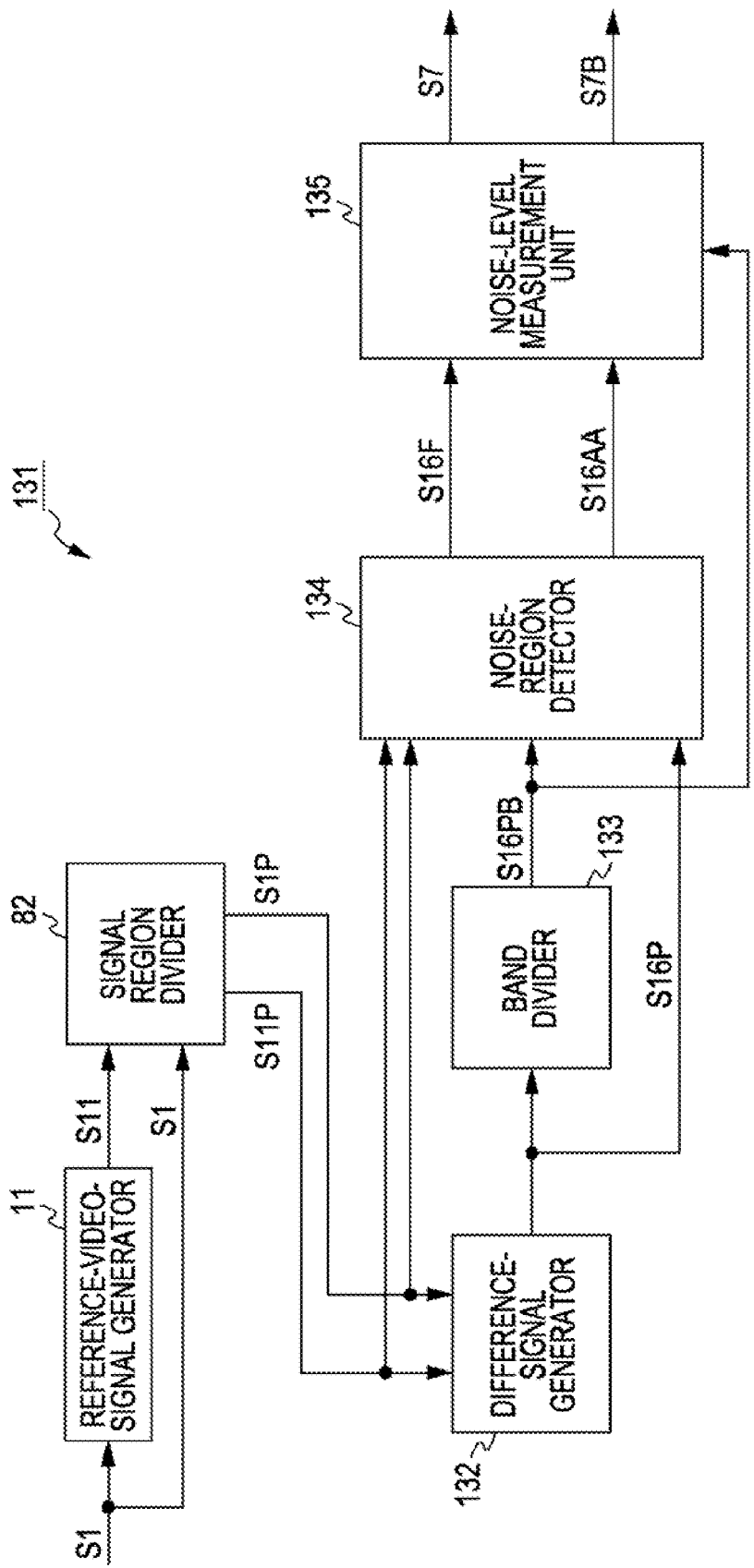
FIG. 36 is a block diagram showing the configuration of a measurement unit in a noise filter according to a ninth embodiment of the present invention.

FIG. 36 is a block diagram showing the configuration of a measurement unit in a noise filter according to a ninth embodiment of the present invention in comparison with FIG. 24. Regarding a measurement unit 131 in this embodiment, parts corresponding to those in the embodiments described above are designated by the same numerals, and description thereof will be omitted. The measurement unit 131 measures noise level using only the difference signal S16, with the difference signal S16 divided into bands similarly to the fifth embodiment described earlier with reference to FIG. 24. In the measurement unit 131, a difference-signal generator 132 generates a partial difference signal S16F, and then a band divider 133 generates a partial difference band signal S16PB.

In the measurement unit 131, a noise-region detector 134 and a noise-level measurement unit 135 sequentially processes the partial difference band signal S16PB, the input video signal S1, the reference video signal S11, and the difference signal S16 to output noise-level measurement results S7 and S7B.

Also with this embodiment, in which noise level is measured using only the difference signal S16 divided into bands, the accuracy of noise-level measurement can be improved.

Tenth Embodiment

FIG. 3 is a block diagram of a noise filter according to as tenth embodiment of the present invention. Regarding the noise filter, parts corresponding to those in the embodiments described above are designated by the same numerals, and repeated description thereof will be refrained. In this embodiment, in a noise filter 141, a measurement unit 142 measures the noise level of the input video signal S1 to output a noise-level measurement result S7, and the degree of noise reduction is changed according to the noise-level measurement result S7.

In the measurement unit 142, a reference-video-signal generator 143 receives input of an input video signal S1 and generates a reference video signal S11, and the signal region divider 20 processes the input video signal S1 and the reference video signal S11 to generate a partial input video signal S1P and a partial reference video signal S11P. Furthermore, the difference-signal generator 16 generates a partial difference signal S16P from the partial input video signed S1P and the partial reference video signal S11P. The reference-video-signal generator 143 generates the reference video signal S11 by motion-compensating an output video signal S18 obtained as a result of processing by the noise filter 141 instead of the input video signal S1 of an immediately preceding frame.

A noise-region detector 144 processes the partial input video signal S1P, the partial reference video signal S11P, and the partial difference signal S16F to output the activities S1A and S11A and the noise-region identification flags S1F and S11F for the input video signal S1 and the reference video signal S11.

The non-linear-characteristics processor 160 corrects the difference signal S16 according to the input/output characteristics set by the non-linear-characteristics setting unit 159, and thereby outputs a noise component S16N. On the other hand, regarding the input video signal S1, the non-linear-characteristics processor 160 extracts high-frequency components by a predetermined high-pass filter, corrects the high-frequency components according to the input/output characteristics set by the non-linear-characteristics setting unit 159, and thereby outputs a noise component S1N.

Furthermore, similarly to the saturated-region detector 22, a saturated-region detector 147 processes the average values S1PAve and S11PAve of the input video signal S1 and the reference video signal S11 to output the saturation flags S1PAveF and S11PAveF.

Furthermore, similarly to the noise-free-region detector 23, a noise-free-region detector 146 outputs the noise-free-region detection flags S1NFF and S16NFF for the input video signal S1 and the difference signal S16.

Furthermore, similarly to the measurement-validity checker 24, a measurement-validity checker 148 processes the activities S1A and S16A of the input video signal S1 and the difference signal S16, the saturation flags S1PAveF and S11PAveF for the input video signal S1 and the reference video signal S11, and the noise-free-region detection flags S1NFF and S16NFF for the input video signal S1 and the difference signal S16, and thereby outputs the noise-region identification flags S1F and S16F for the input video signal S1 and the difference signal S16 and the activities S1A and S16A for the input video signal S1 and the difference signal S16. Furthermore, the measurement-validity checker 148 outputs noise confidences S1C and S16C for the input video signal S1 and the difference signal S16. The noise confidences S1C and S16C indicate confidences of the noise levels indicated by the activities S1A and S16A of the input video signal S1 and the difference signal S16.

Figure 39:
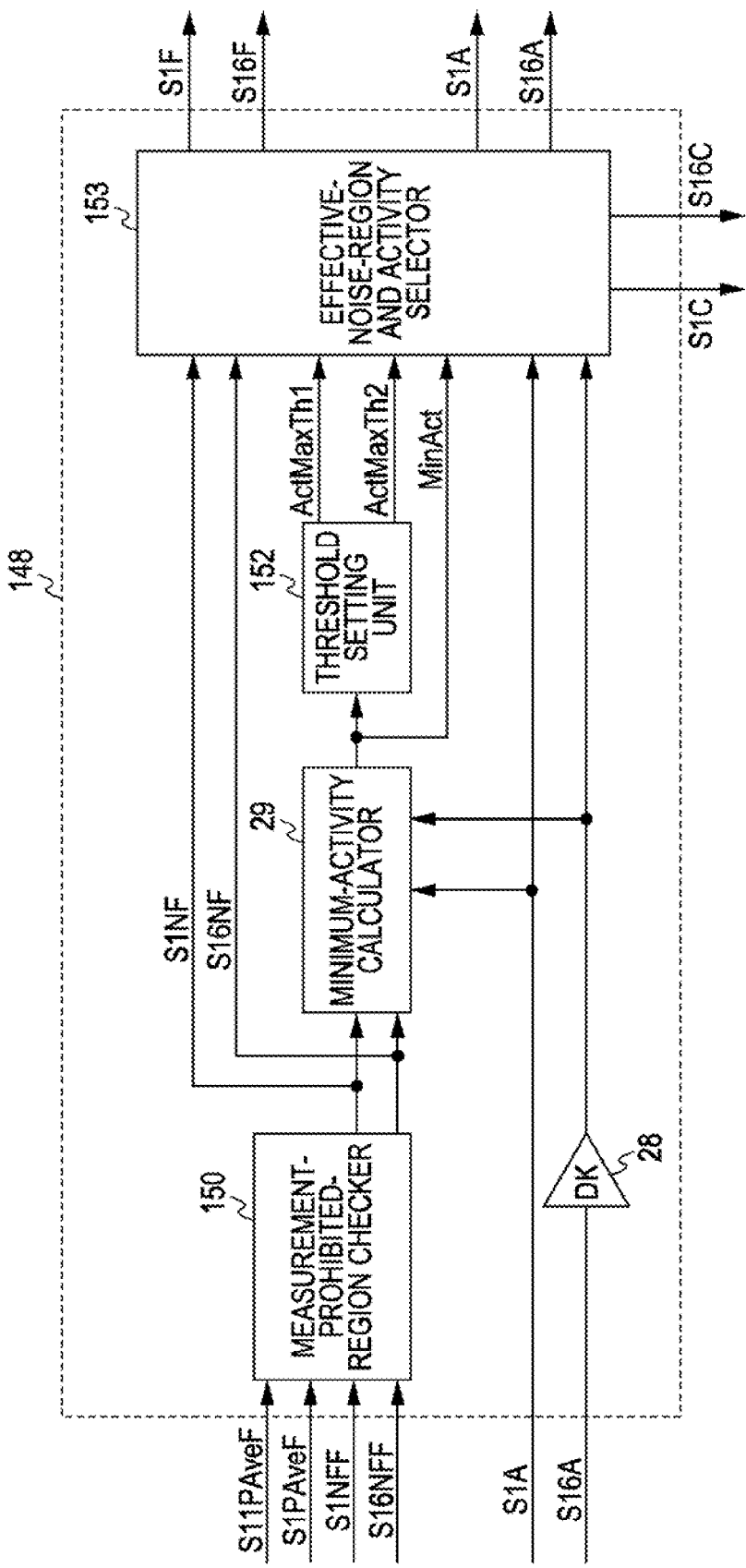
FIG. 39 is a block diagram showing the configuration of a measurement-validity checker in the noise-region detector shown in FIG. 38.

FIG. 39 is a block diagram showing the measurement-validity checker 148 in detail. In the measurement-validity checker 148, similarly to the measurement-prohibited-region checker 27, a measurement-prohibited-region checker 150 outputs the measurement-prohibited-region checking flags S1NF and S16NF for the input video signal S1 and the difference signal S16 on the basis of the saturation flags S1PAveF and S11PAveF and the noise-free-region detection flags S1NFF and S16NFF. More specifically, when any of the saturation flag S1PAveF and the noise-free-region identification flag S1NFF for the input video signal S1 is turned on, the measurement-prohibited-region checker 150 turns on the measurement-prohibited-region checking flag S1NF for the input video signal S1 in the relevant region. Furthermore, when any of the saturation flags S1PAveF and S11PAveF is turned on or when the noise-free-region identification flag S16NFF for the difference signal S16 is turned on, the measurement-prohibited-region checker 150 turns on the measurement-prohibited-region checking flag S16NF for the difference signal S16 in the relevant region.

The minimum-activity calculator 23 detects and outputs a minimum activity MinAct on the basis of the activities S1A and S16A of the input video signal S1 and the difference signal S16.

Furthermore, similarly to the threshold setting unit 30, a threshold setting unit 132 calculates and outputs an upper threshold ActMaxTh1 on the basis of the minimum activity MinAct. Furthermore, the threshold setting unit 152 calculates and outputs a threshold ActMaxTh1 for calculating the noise confidences S1C and S16C. More specifically, the threshold setting unit 152 calculates the threshold ActMaxTh1 by multiplying the first intermediate value EstSD used to calculate the upper threshold ActMaxTh1 by a constant ActThFactor2 for calculating the threshold ActMaxTh2 and adding the product to the second intermediate value EstMean used to calculate the upper threshold ActMaxTh1 (i.e., ActMaxTh2=EstMean+EstSD×ActThFactor2). The constant ActThFactor2 is a value greater than the constant ActThFactor1.

Figure 40:
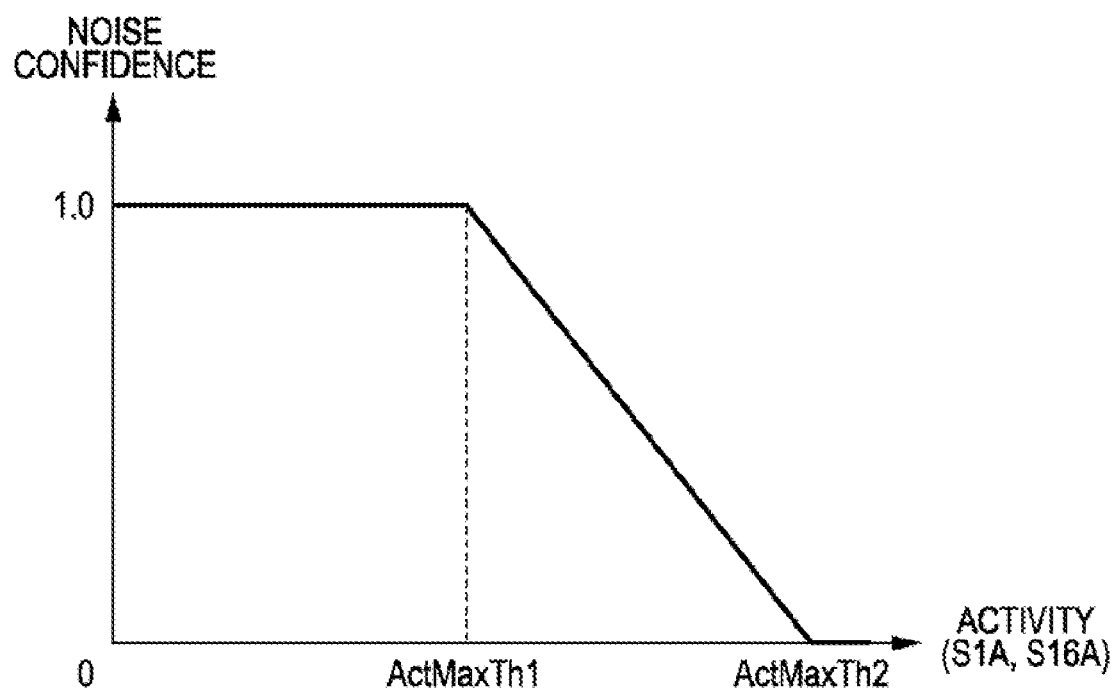
FIG. 40 is a graph showing a characteristic curve for explaining an operation of the measurement-validity checker shown in FIG. 39.

Furthermore, similarly to the effective-noise-region and activity selector 31, an effective-noise-region and activity selector 153 outputs the noise-region identification flags S1F and S16F for the input video signal S1 and the difference signal S16. Furthermore, the effective-noise-region and activity selector 153 checks the activities S1A and S16A of the input video signal S1 and the difference signal S16 against the upper threshold ActMaxTh1 and the threshold ActMaxTh2, and outputs the noise confidences S1C and S16C of the input video signal S3, and the difference signal S16 on the basis of the results of the checking according to the characteristics shown in FIG. 40.

More specifically, when the value of the activity S1A or S16A is less than the upper threshold ActMaxTh1, the effective-noise-region and activity selector 153 outputs the noise confidence S1C or S16C with a value of 1. When the value of the activity S1A or S16A is greater than the threshold ActMaxTh2, the effective-noise-region and activity selector 153 outputs the noise confidence S1C or S16C with a value of 0, When the value of the activity S1A or S16A is between the upper threshold ActMaxTh1 and the threshold ActMaxTh2, the effective-noise-region and activity selector 153 outputs the noise confidence S1C or S16C with a value obtained by linear interpolation using the value of the activity S1A or S16A as a parameter. Thus, the effective-noise-region and activity selector 153 sets the noise confidence S1C or S16C so that the value thereof decreases as the value of the activity S1A or S16A increases beyond a certain value.

Referring back to FIG. 37, similarly to the noise-level measurement unit 35, a noise-level measurement unit 155 processes the activities S1A and S16A of the input video signal S1 and the difference signal S16 on the basis of the noise-region identification flags S1F and S16F for the input video signal S1 and the difference-signal generator 16, and thereby outputs a noise-level measurement result S7.

Furthermore, a noise extractor 157 generates and outputs a noise signal S19 from the partial input video signal S1P and the partial difference signal S16P. The noise filter 141 reduces noise in the input video signal S1 by subtracting the noise signal S19 from the input video signal S1 (the partial input video signal S1P). Thus, the noise filter 141 is a hybrid filter formed of a 3D IIR noise filter and a 2D noise filter that reduces noise on the basis of only information within a field or frame.

Figure 41:
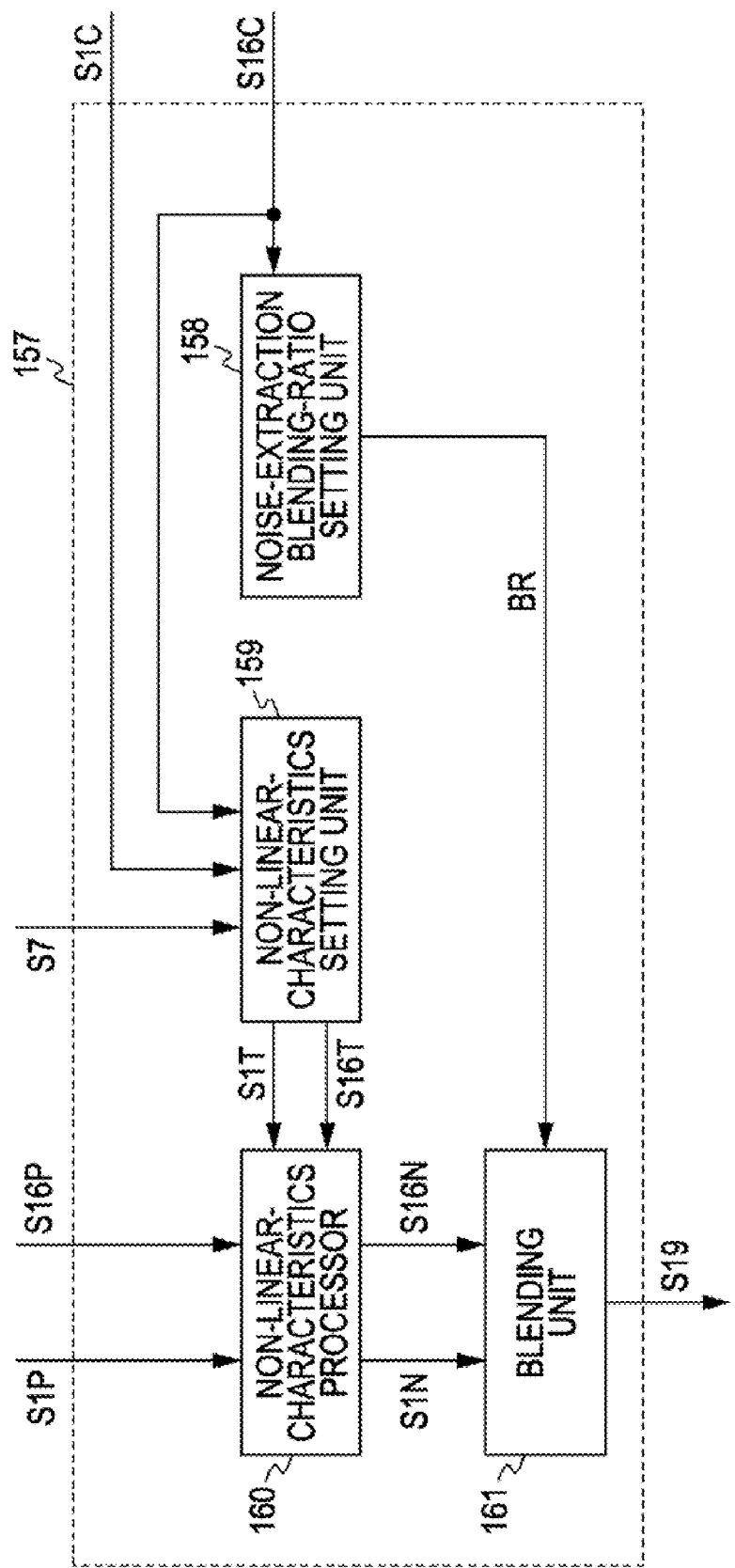
FIG. 41 is a block diagram showing the configuration of a noise extractor in the noise filter shown in FIG. 37.
Figure 43A:
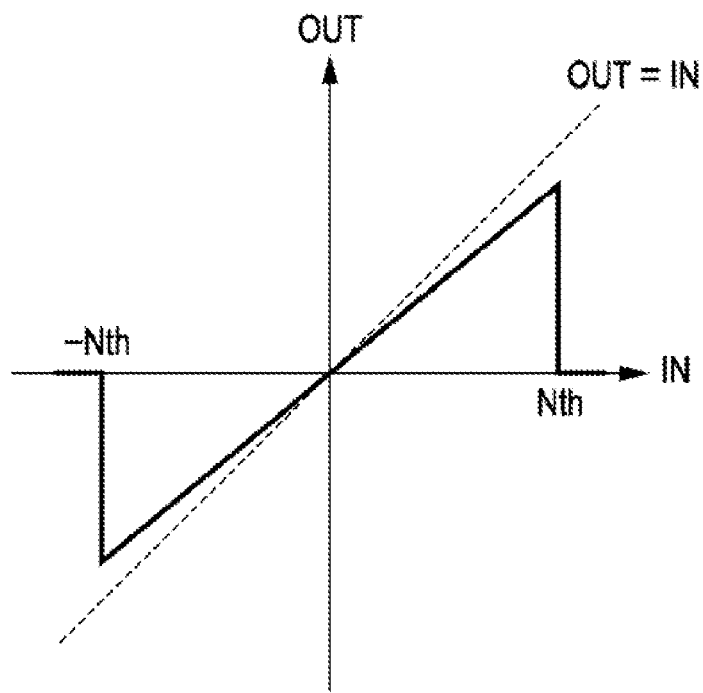
FIGS. 43A and 43B are graphs showing characteristic curves for explaining operations of a non-linear-characteristics setting unit in the noise extractor shown in FIG. 41.
Figure 43B:
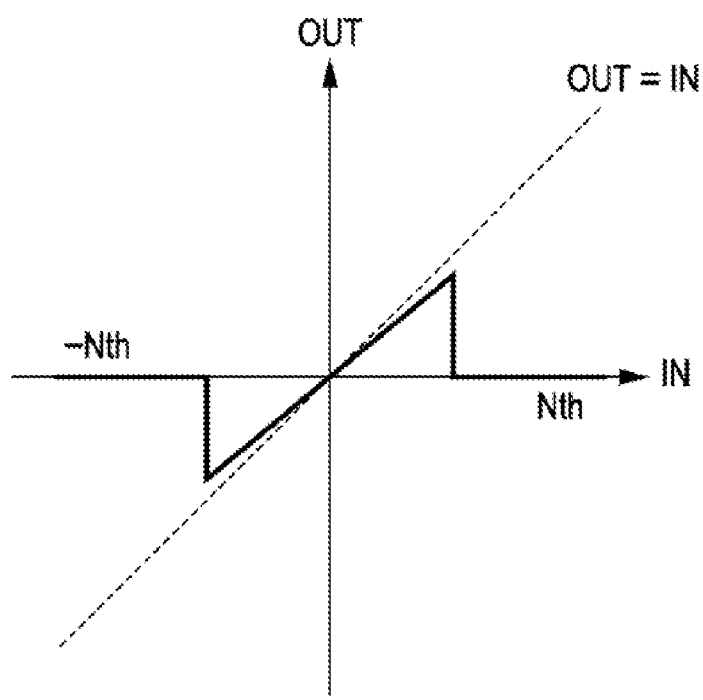
Figure 44A:
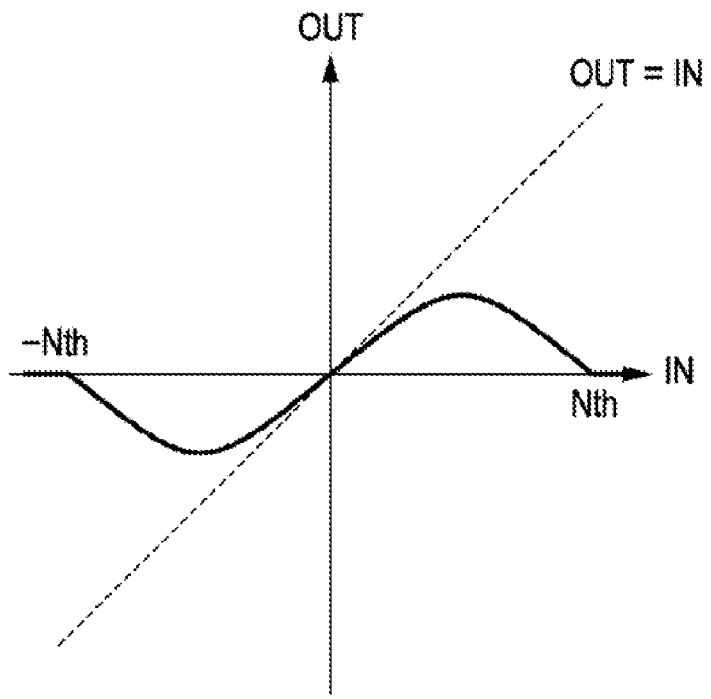
FIGS. 44A and 44B are graphs showing another example of characteristic curves for explaining operations of a non-linear-characteristics setting unit in the noise extractor shown in FIG. 41.
Figure 44B:
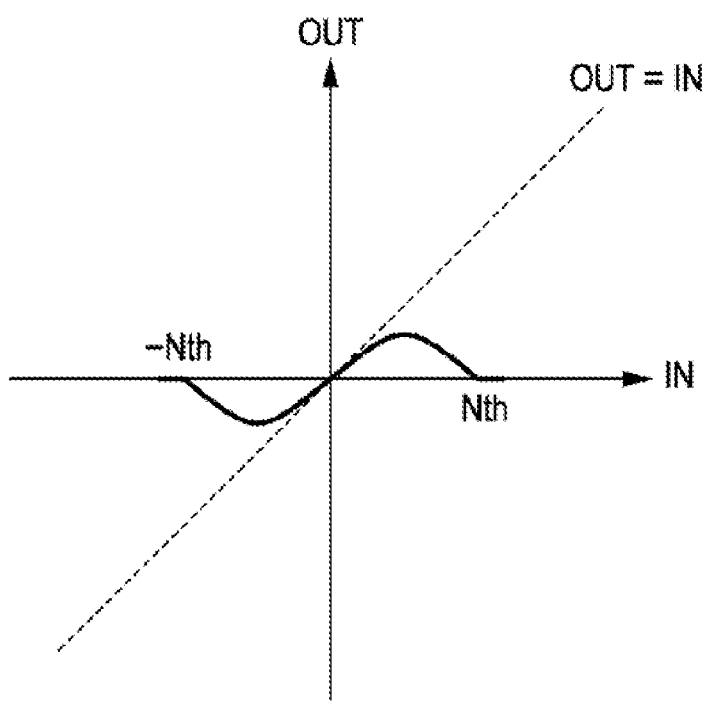

FIG. 41 is a block diagram showing the noise extractor 157 in detail. In the noise extractor 157, a noise-extraction blending-ratio setting unit 158 calculates and outputs a blending ratio BR of noise components of the partial input video signal S1P and the partial difference signal S16P. More specifically, as shown in FIG. 42, the noise-extraction blending-ratio setting unit 158 checks the noise confidence S1C or the noise confidence S16C against first and second thresholds DRTh1 and DRTh2. When the value of the noise confidence S1C or S16C checked against the first and second thresholds DRTh1 and DRTh2 is less than or equal to the first threshold DRTh1 or greater than or equal to the second threshold DRTh2, the noise-extraction blending-ratio setting unit 158 sets 0 or 1 as the blending ratio BR so that only noise components of the input video signal S1 or the difference signal S16 are selected. On the other hand, when the value of the noise confidence S1C or S16C is between the first and second thresholds DRTh1 and DRTh2 the noise-extraction blending-ratio setting unit 158 sets the value of the blending ratio BR by linear interpolation using the value of the noise confidence S1C or S16C. In this embodiment, the blending ratio is set using the noise confidence S16C of the difference signal S16 according to the characteristics shown in FIG. 42. However, without limitation, the blending ratio BR may be set using both the noise confidences S1C and S16C.

Furthermore, a non-linear-characteristics setting unit 159 determines characteristics of processing of the noise components of the input video signal S1 and the difference signal S16. Since the noise extractor 157 in this embodiment extracts noise components by clipping components with large amplitudes, the non-linear-characteristics setting unit 159 determines characteristics of the clipping. More specifically, the noise extractor 157 non-linearly processes the noise components according to input/output characteristics shown in FIGS. 43A and 43B and FIGS. 44A and 44B, and the non-linear-characteristics setting unit 159 determines non-linear characteristics on the basis of the noise-level measurement result S7 and the associated noise confidence so that signal levels Nth and −Nth at which clipping is started are shifted away from the zero level as noise level increases. Furthermore, the non-linear-characteristics setting unit 159 sets the non-linear characteristics so that clipping characteristics changes from sharp to modest as the noise confidence decreases. The non-linear-characteristics setting unit 159 outputs characteristics setting signals S1T and S16T for the input video signal S1 and the difference signal S16 to a non-linear-characteristics processor 160 to define characteristics of non-linear processing executed by the non-linear-characteristics processor 160.

The non-linear-characteristics processor 160 corrects the difference signal S16 according to the input/output characteristics set by the non-linear-characteristics setting unit 159, and thereby outputs a noise component S16N. Furthermore, the non-linear-characteristics processor 160 extracts high-frequency components from the input video signal S1 by a predetermined high-pass filter, corrects the high-frequency components according to the input/output characteristics set by the non-linear-characteristics setting unit 159, and thereby outputs a noise component S1N.

Furthermore, a blending unit 161 adds together the noise components S1N and S16N output from the non-linear-characteristics processor 160, using weights based, on the blending ratio BR, and thereby outputs a noise signal S19. When adjacent regions partially overlap as described earlier with reference to FIG. 8, the blending unit 161 generates the noise signal S19 by averaging noise components of respective regions overlapping each other. Alternatively, the averaging may be executed by a signal region integrator 166, which will be described later.

Figure 45:
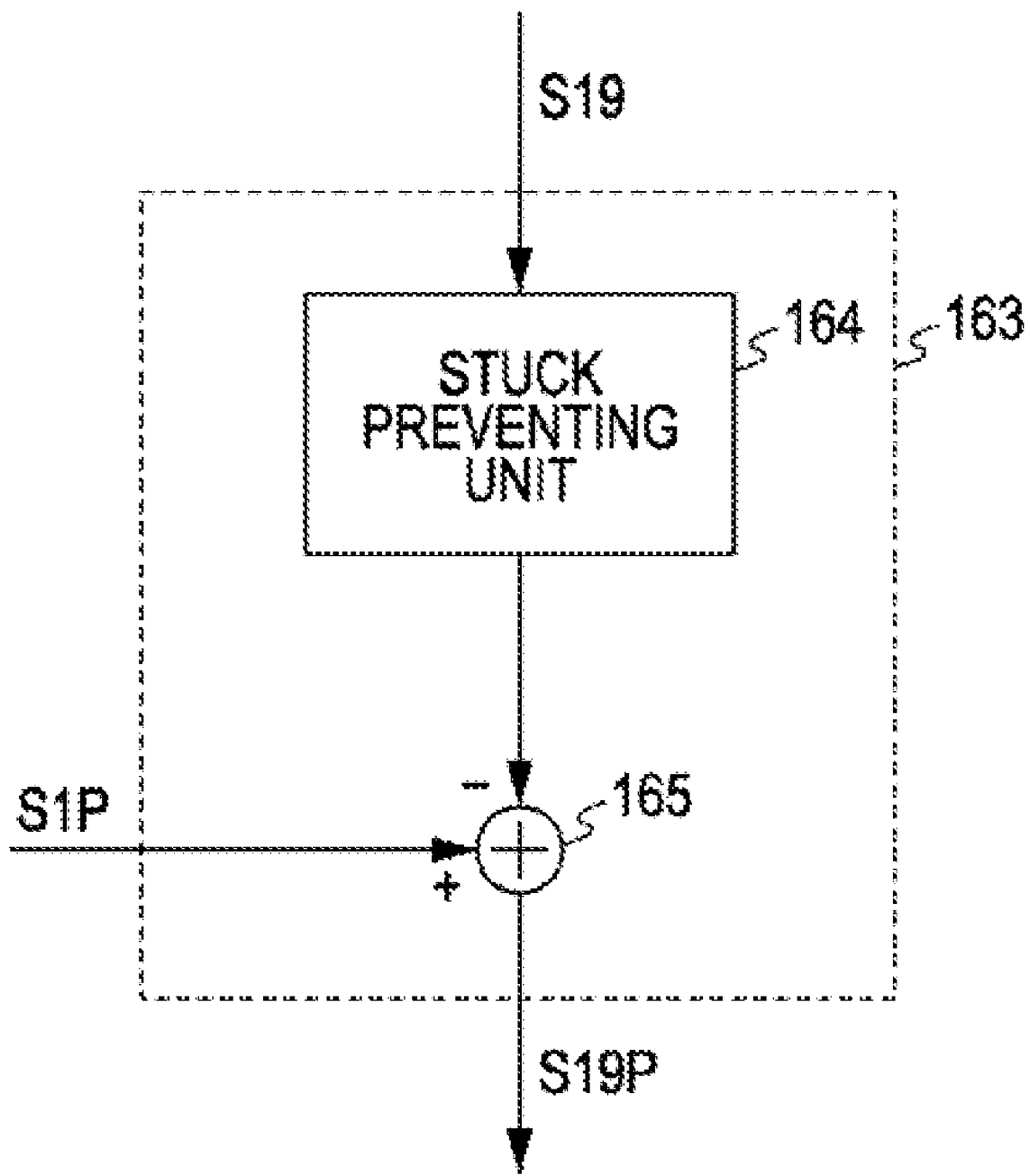
FIG. 45 is a block diagram showing the configuration of a noise subtractor in the noise filter shown in FIG. 37.
Figure 46:
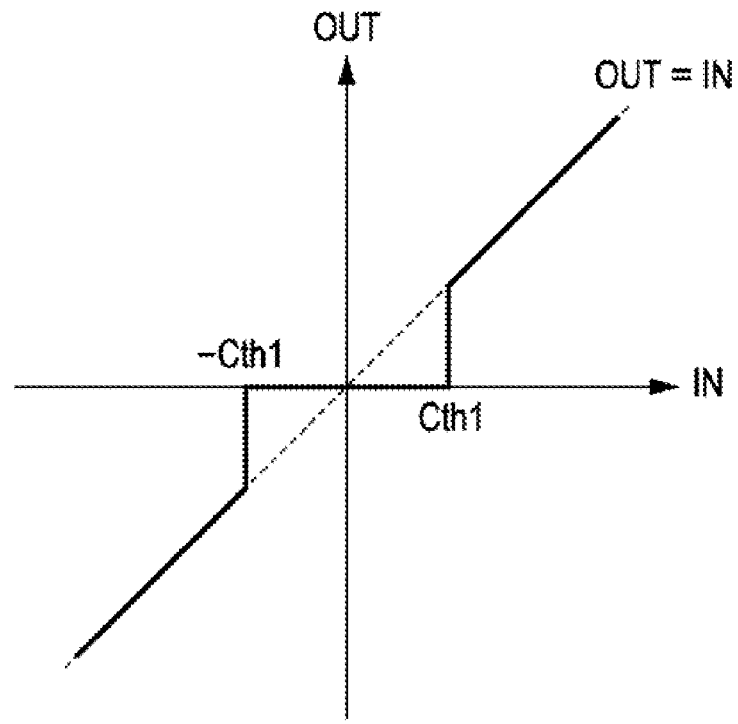
FIG. 46 is a graph showing a characteristics curve for explaining an operation of the noise subtractor shown in FIG. 45.
Figure 47:
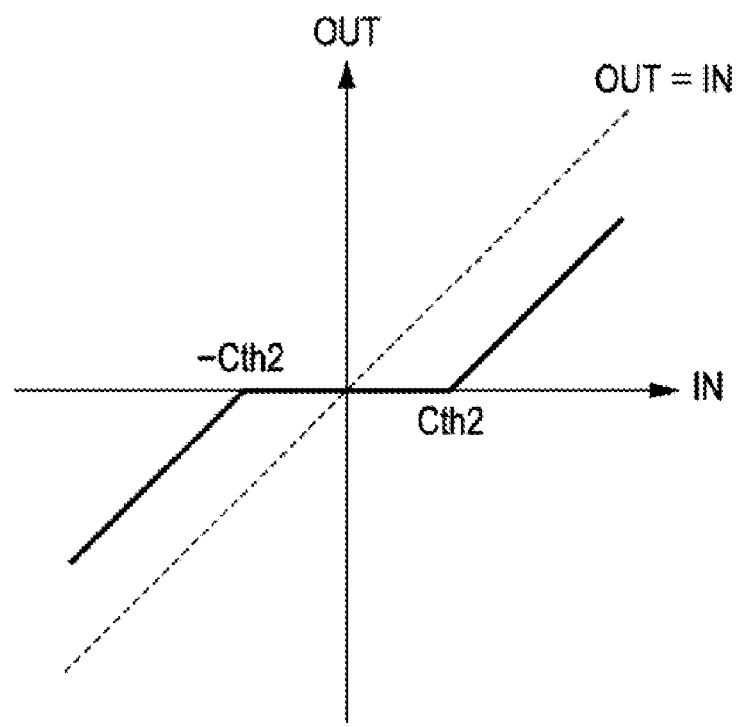
FIG. 47 is a graph showing another example of characteristics curve for explaining an operation of the noise subtractor shown in FIG. 45.

In order to prevent what is called stucking, a noise subtractor 163 corrects the signal level of the noise signal S19 to reduce the noise level of the input video signal S1. The stucking occurs when an IIR filter has a feedback rate in the vicinity of 1, and the quality of image perceived is significantly degraded at portions with motion. Thus, as shown in FIG. 45, in the noise subtractor 163, the noise signal S19 is input to a stuck preventing unit 164. The stuck preventing unit 164 corrects the input noise signal S19 according to input/output characteristics shown in FIG. 46 to suppress components with small amplitudes. The correction may be performed according to various characteristics, for example as shown in FIG. 47 in comparison with FIG. 46. Furthermore, in the noise subtractor 163, a subtracting circuit 165 subtracts the signal output from the stuck preventing unit 164 from the partial input video signal S1P to suppress noise components.

Referring back to FIG. 37, contrary to the signal region divider 20, a signal region integrator 166 converts the partial input video signals S1P for individual regions, output from the noise subtractor 163, into a video signal containing pixel values in the order of raster scanning, and outputs the video signal as an output video signal S1B.

According to this embodiment, with an effective configuration of a noise measurement unit, a hybrid noise filter is formed of a 3D IIR noise filter and a 2D noise filter. This serves to improve the accuracy of noise-level measurement. Furthermore, noise can be reduced by effectively using measurement results.

More specifically, in measuring a noise level, noise confidences indicating confidences of activities of an input video signal and a difference signal are detected, so that it is possible to switch adaptively between an operation by a 3D IIR filter and an operation by a 2D noise filter according to setting of a blending ratio based on the noise confidences. Thus, noise can be reduced suitably from various types of input video signals.

That is, in the case of an image of a moving object or the like, for which noises is not reduced sufficiently with a 3D IIR filter, noise level can be reduced by a 2D noise filter. Thus, noise can be reduced more reliably.

On the other hand, in the case of a texture portion, for which noise is not reduced sufficiently with a 2D noise filter, noise level can be reduced by a 3D IIR noise filter. Thus, noise can be reduced more reliably.

Furthermore, noise level is reduced by non-linear processing of noise components, with the characteristics of the non-linear processing changed according to noise-level measurement results and noise confidences. Thus, it is possible to enhance the effect of noise reduction in regions with high noise likelihood while minimising blurring in texture portions or at boundaries of moving objects that, could occur with the enhanced effect of noise reduction.

Furthermore, the characteristics of non-linear processing of noise components are set so that components with large amplitudes are suppressed according to noise confidences, the characteristics of non-linear processing can be changed adaptively. This serves to reduce noise level even further.

Eleventh Embodiment

Figure 37:
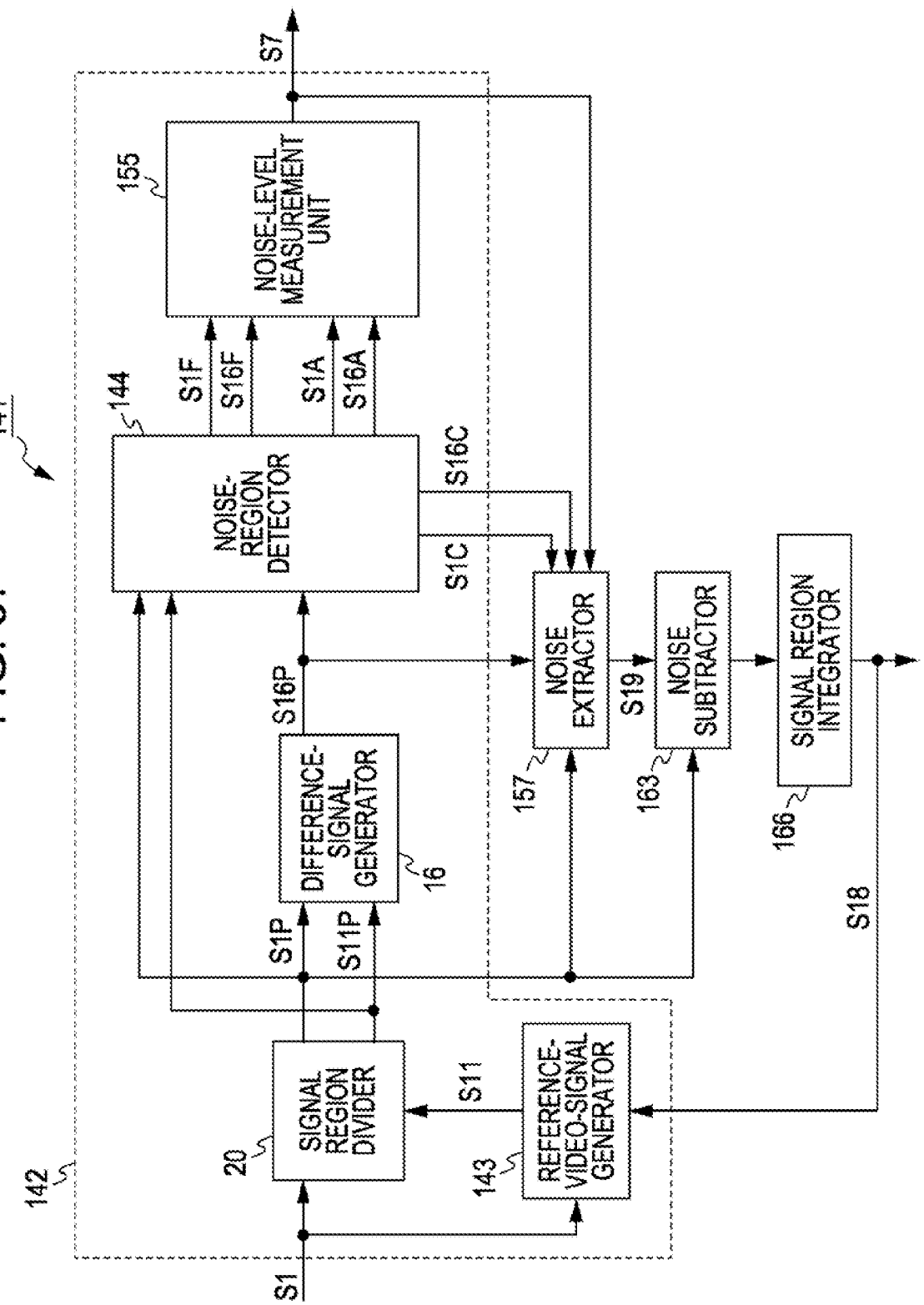
FIG. 37 is a block diagram showing the configuration of a noise filter according to a tenth embodiment of the present invention.
Figure 38:
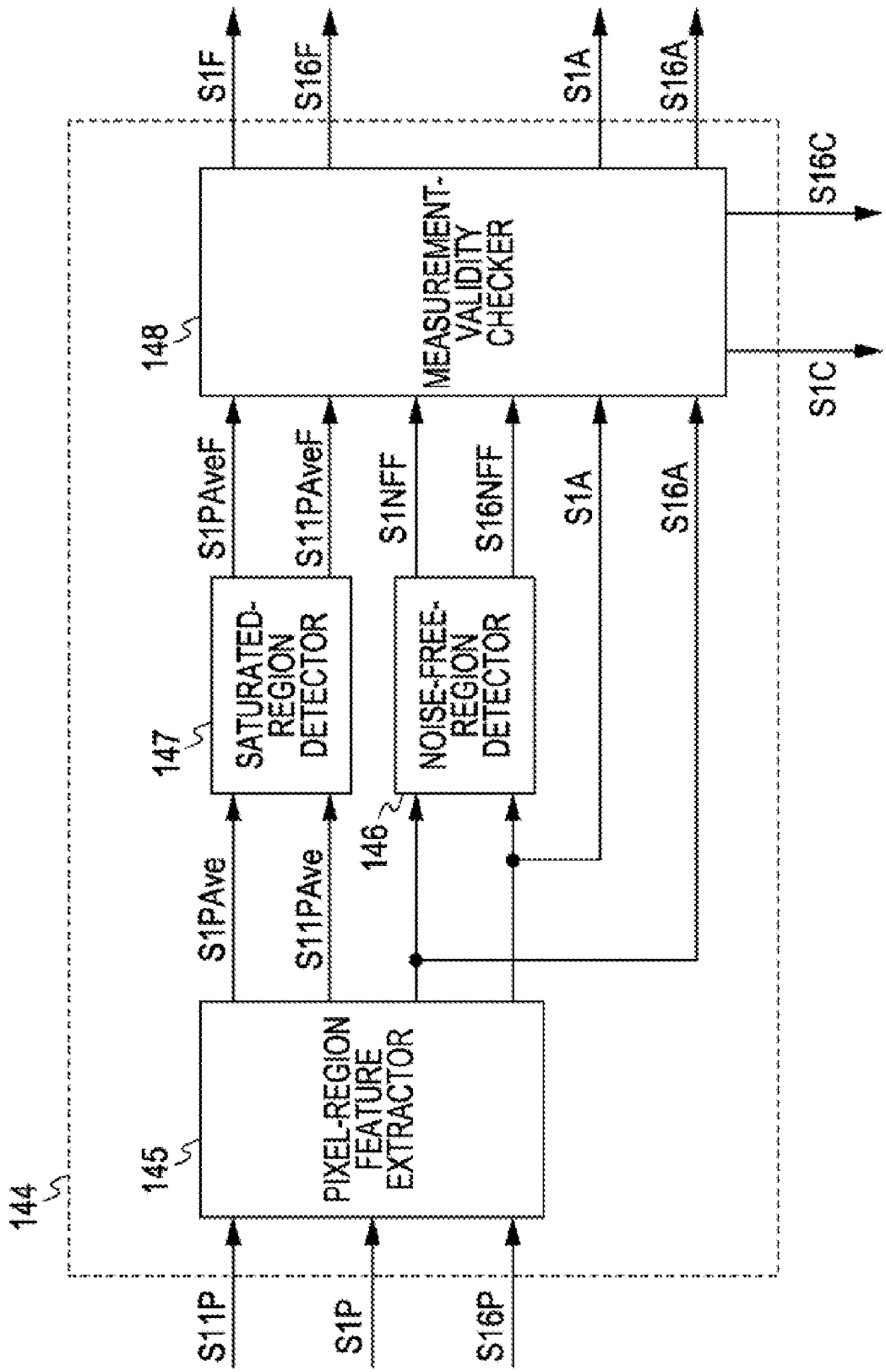
FIG. 38 is a block diagram showing the configuration of a noise-region detector in the noise filter shown in FIG. 37.
Figure 48:
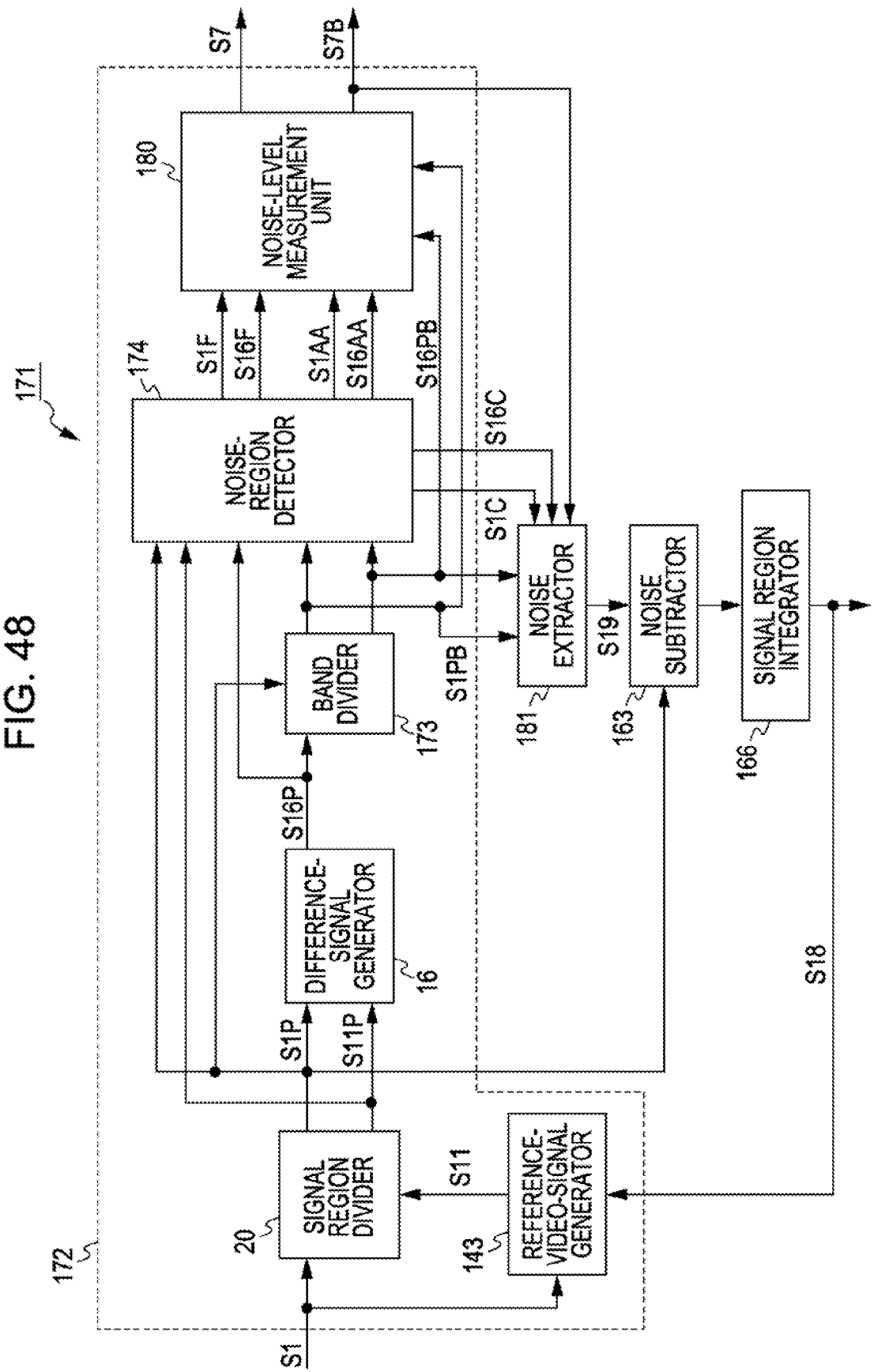
FIG. 48 is a block diagram showing the configuration of a noise filter according to an eleventh embodiment of the present invention.

FIG. 48 is a block diagram showing a noise filter according to an eleventh embodiment of the present, invention in comparison with FIG. 37. Regarding this embodiment, parts corresponding to those in the embodiments described above are designated by the same numerals, and repeated description thereof will be refrained.

In this embodiment, in a measurement unit 172, similarly to the measurement unit 81 in the fifth embodiment described earlier, the input video signal S1 and the difference signal S16 are divided into bands by a band divider 173, and noise level is measured on the basis of flatness in the frequency domain. The measurement unit 172 shown in FIG. 48 differs from the measurement unit 81 in the fifth embodiment in that division into bands takes place after generating the difference signal S16.

Figure 49:
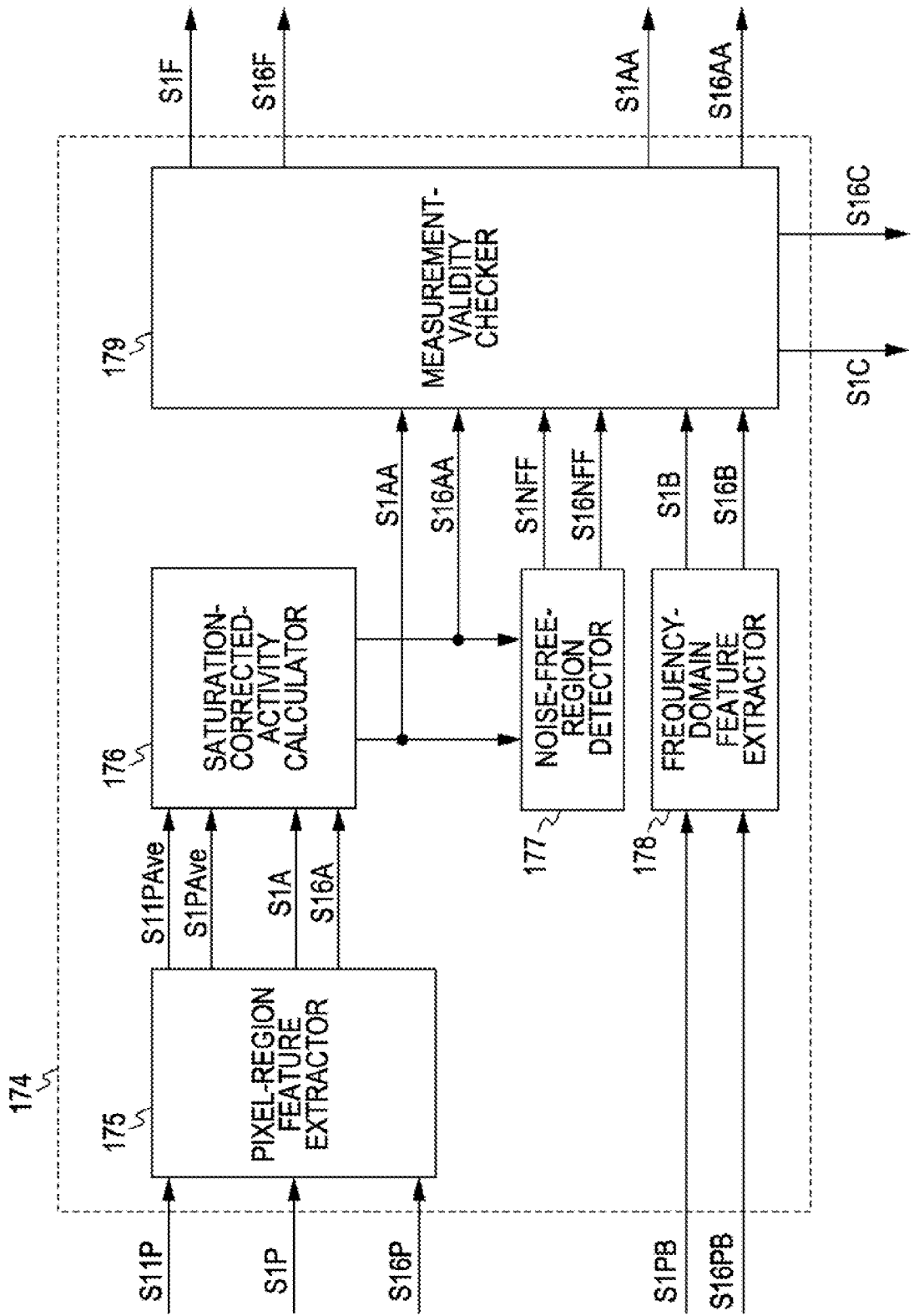
FIG. 49 is a block diagram showing the configuration of a noise-region detector in the noise filter shown in FIG. 48.
Figure 50:
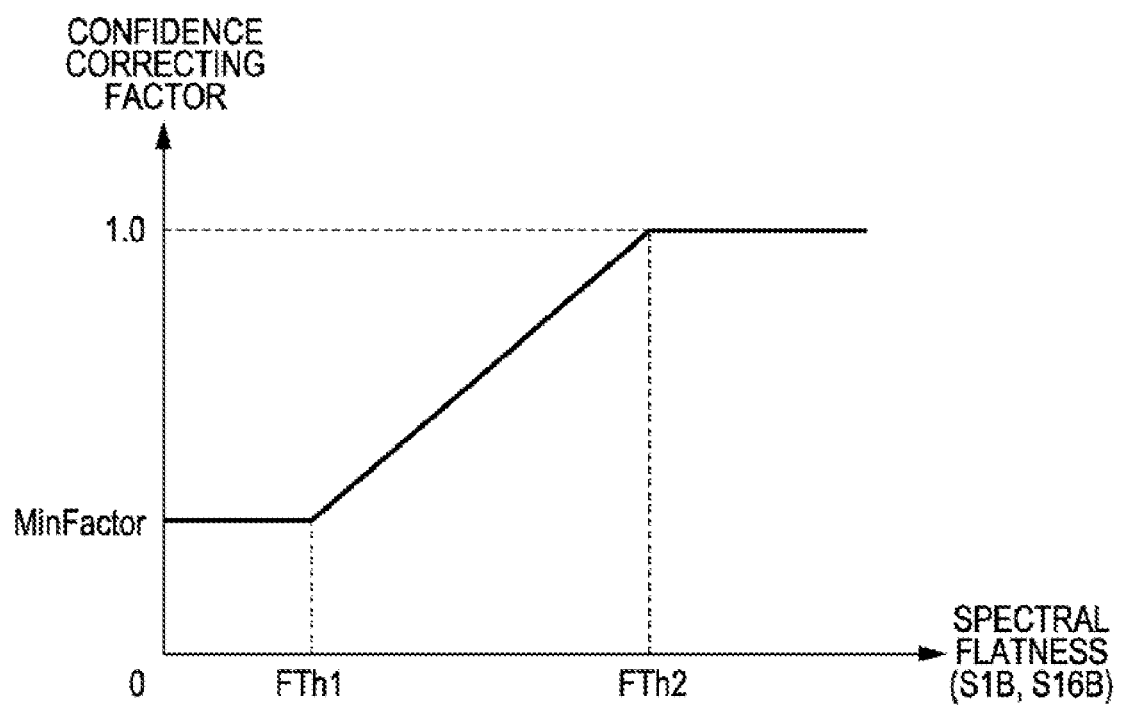
FIG. 50 is a graph showing a characteristics curve for explaining an operation of the noise-region detector shown in FIG. 49.

The measurement unit 172 is configured so as not to use regions of the reference video signal S11 for noise-level measurement. Thus, as shown in FIG. 49 in comparison with FIG. 25, components 175 to 179 of a noise-region detector 174 are configured the same as the corresponding components except the configurations relating to the reference video signal S11. The noise-region detector 174 corrects the noise confidences S1C and S16C by confidence correcting factors shown in FIG. 50. The confidence correcting factors are based on the associated flatness degrees S1B and S16B.

Furthermore, similarly to the noise-level measurement unit 155, a noise-level measurement unit 150 outputs noise-level measurement results S7 and S7B on the basis of the outputs of the noise-region detector 174.

Furthermore, a noise extractor 181 processes the partial input video signals S1PB and the partial difference signals S16PB, divided into bands by the band divider 173, on the basis of the outputs of the measurement unit 172 to output a noise signal S19.

Figure 51:
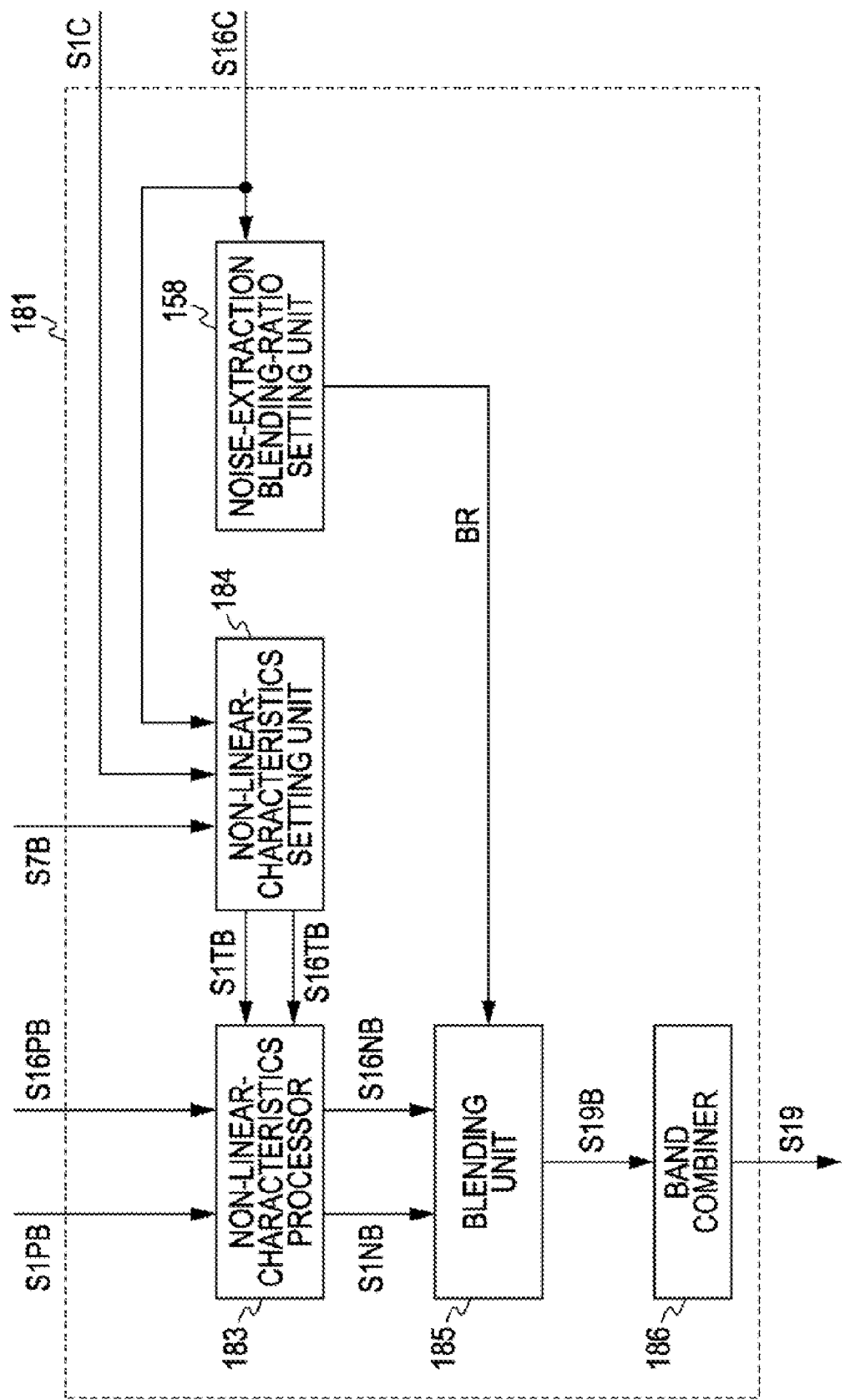
FIG. 51 is a block diagram showing the configuration of a noise extractor in the noise filter shown in FIG. 48.

FIG. 51 is a block diagram showing the configuration of the noise extractor 181 in detail. Similarly to the noise extractor 157 in the tenth embodiment described earlier, the noise extractor 181 sets a blending ratio BR for each band.

In the noise extractor 181, a non-linear-characteristics processor 183 executes non-linear processing on the partial input, video signal S1PB and the partial difference signal S16PB of each band to output noise components S1NB and S16NB. Furthermore, in accordance with the configuration of the non-linear-characteristics processor 183, a non-linear-characteristics setting unit 184 sets the characteristics of the non-linear-characteristics processor 183 for each band on the basis of the noise-level measurement result S7B for each band. The characteristics for each band are set similarly to the tenth embodiment described earlier.

Furthermore, similarly to the blending unit 161, a blending unit 185 combines signals output from the noise extractor 181 on a band-by-band basis. Furthermore, contrary to the band divider 173, a band combiner 186 combines signals output from the blending unit 185 for a plurality of bands to output a noise signal S19.

According to this embodiment, with an effective configuration of a measurement unit for noise-level measurement on a band-by-band basis, noise level is reduced for each band. Thus, noise level can be reduced more reliably. That is, noise can be reduced effectively while suppressing motion blurring, blurring in texture portions, or the like. Furthermore, noise having large components at specific frequency bands can be reduced more effectively. Examples of such noise having large components at specific frequency bands include clamp noise, RF noise, MPEG compression noise, and the like.

Furthermore, by correcting noise confidences according to flatness degrees detected for individual bands, noise level can be reduced even further.

Twelfth Embodiment

Figure 52:
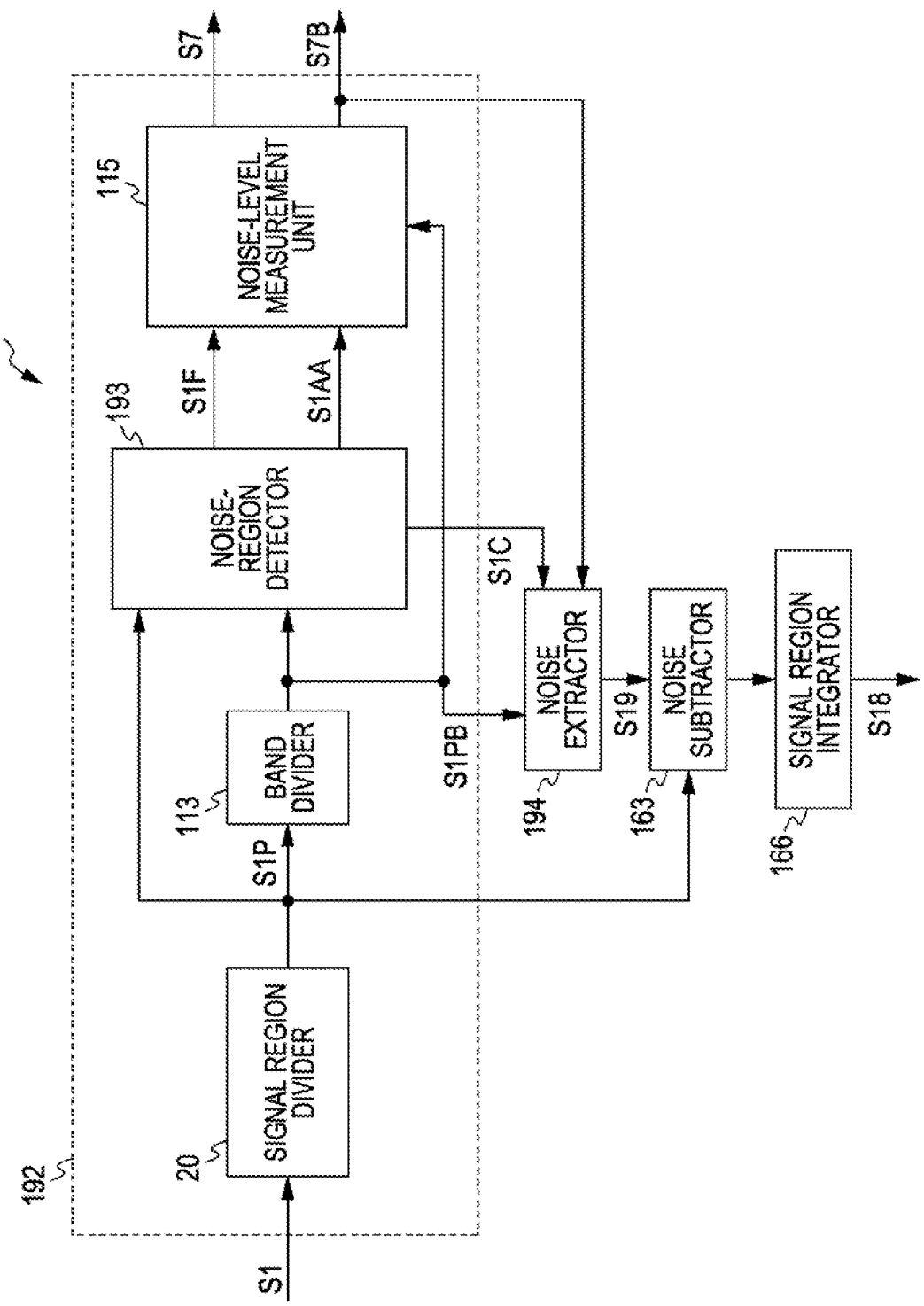
FIG. 52 is a block diagram showing the configuration of a noise filter according to a twelfth embodiment, of the present invention.

FIG. 52 is a block diagram showing a noise filter according to a twelfth embodiment of the present invention in comparison with FIG. 48. Regarding this embodiment, parts corresponding to those in the embodiments described above are designated by the same numerals, and repeated description thereof will be refrained. In this embodiment, a noise filter 191 is a 2D noise filter that reduces noise level on the basis of only components within a field or frame of the input video signal S1. Thus, a measurement unit 182 is configured the same as the measurement unit 111 in the seventh embodiment except in that a noise-region defector 193 generates a noise confidence S1C.

Figure 53:
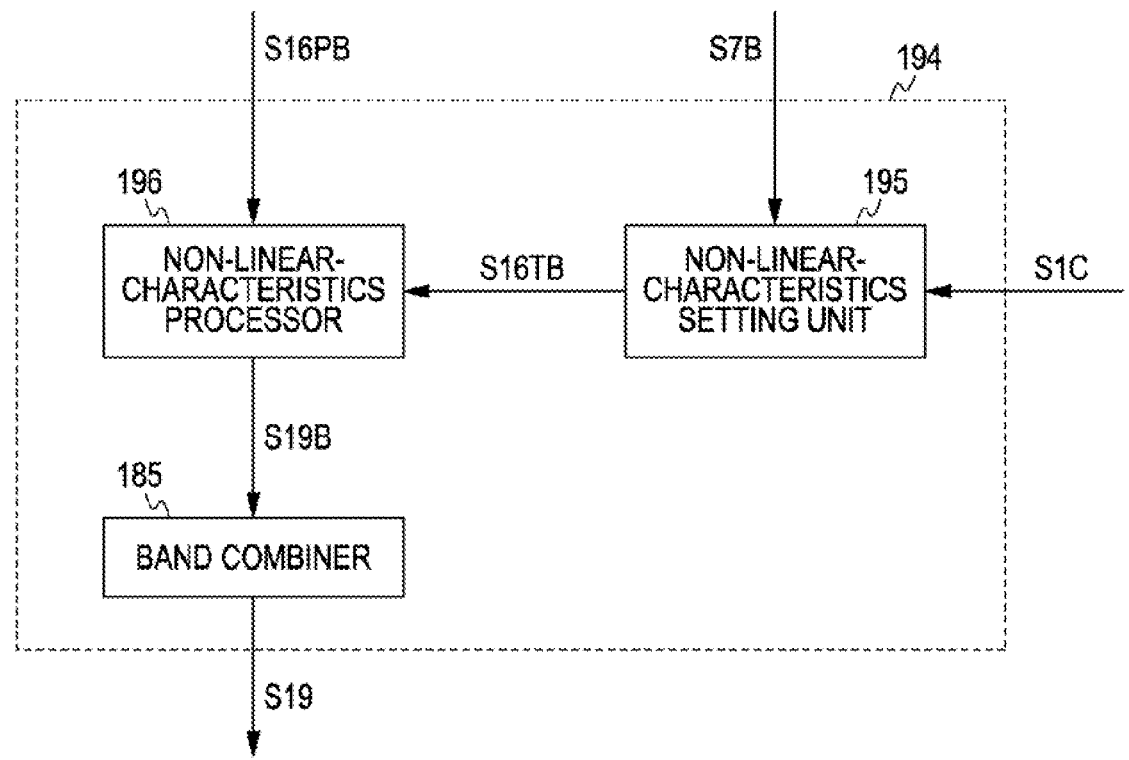
FIG. 53 is a block diagram showing the configuration of a noise extractor in the noise filter shown in FIG. 52.

A noise extractor 194 generates a noise signal S19 by processing the partial input video signals S1PB divided into bands. More specifically, as shown in FIG. 53, in the noise extractor 194, a non-linear-characteristics setting unit 195 determines non-linear characteristics for each band only for the input video signal S1 on the has is of the noise confidence S1C and the noise-level measurement result S7B. Furthermore, in the noise extractor 194, a non-linear-characteristics processor 198 corrects the partial input video signals S1PB according to the non-linear characteristics determined by the non-linear-characteristics setting unit 195 to output a noise signal S19B.

According to this embodiment, since noise level is reduced in individual divided bands, it is possible to reduce noise level reliably by a 2D noise filter.

Thirteenth Embodiment

Figure 54:
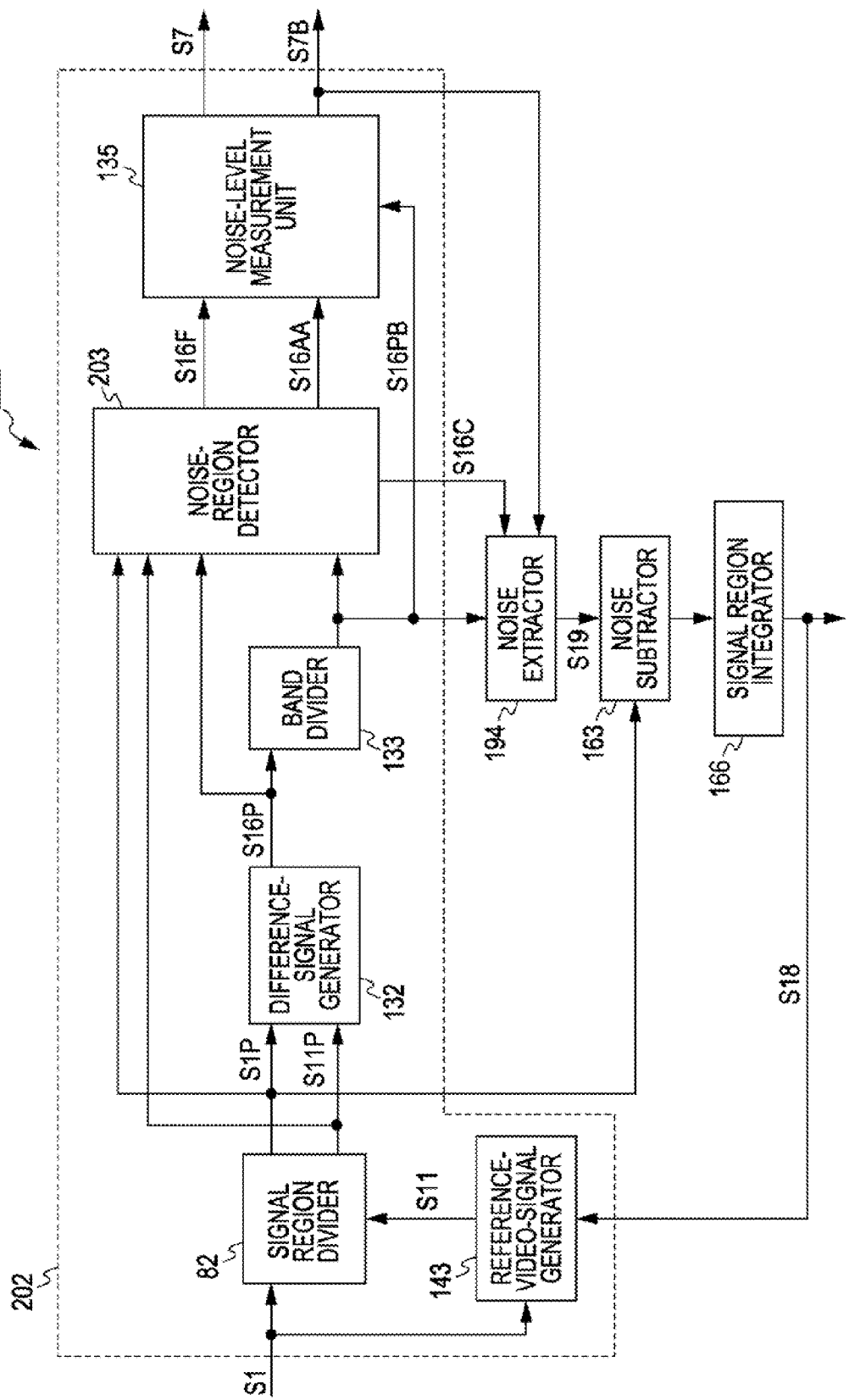
FIG. 54 is a block diagram showing the configuration of a noise filter according to a thirteenth embodiment of the present invention.

FIG. 54 is a block diagram showing a noise filter according to a thirteenth embodiment of the present invention in comparison with FIG. 48. In this embodiment, parts corresponding to those in the embodiments described above are designated by the same numerals, and repeated description thereof will be refrained. In this embodiment, a noise filter 201 is an IIR noise filter that reduces noise level on the basis of inter-field or inter-frame difference components of the input video signal S1. Thus, a measurement unit 202 is configured the same as the measurement unit 131 in the ninth embodiment except in that the configuration of the reference-video-signal generator 143 differs and in that a noise-region detector 203 generates the noise confidence S16C.

According to this embodiment, noise level is reduced in individual divided bands. Thus, it is possible to reduce noise level reliably by a 3D IIR noise filter.

Fourteenth Embodiment

FIG. 55 is a block diagram showing the configuration of a noise-region detector in a noise filter according to a fourteenth embodiment of the present invention in comparison with FIG. 34. In this embodiment, a measurement unit is configured the same as the measurement unit 121 in the eighth embodiment except in that the configuration of a noise-region detector 210 differs. The noise-region detector 210 is configured the same as the noise-region detector 122 shown in FIG. 34 except in that a noise-free-region detector 211 having a different configuration is provided instead of the noise-free-region detector 125.

Figure 56:
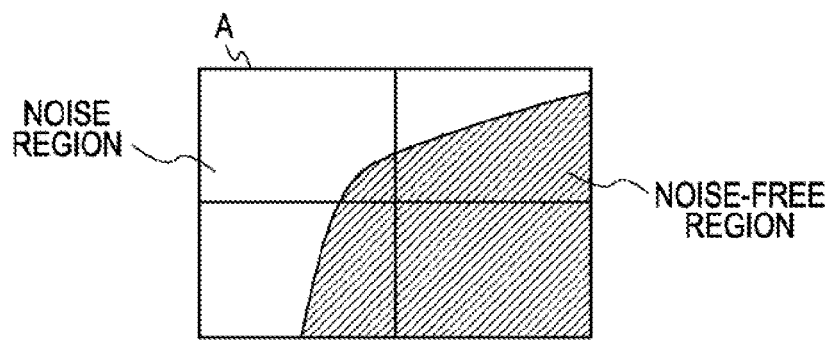
FIG. 56 is a plan view for explaining an operation of a noise-free-pixel detector in the noise-region detector shown in FIG. 55.

When the input video signal S1 and other signals are divided into a plurality of regions (hereinafter referred to as partial regions, regions including subtitles, GUI components, or the like only partially, such as a region A in FIG. 56, occur. In this case, the region A is not detected as a noise-free region when noise-free regions are detected by simply checking activities against thresholds as in the embodiments described above. That is, according to the embodiments described above, the region A is determined as a noise region that is to be used, for noise-level measurement. This causes errors in noise-level measurement results.

Thus, in this embodiment, it is checked whether each pixel is suitable for noise-level measurement, and noise-free regions are determined on the basis of the results of the checking. For this purpose, the noise-free-region detector 211 checks whether each pixel is a pixel not suitable for noise-level measurement (hereinafter referred to as a noise-free pixel) using correlation with neighboring pixels. Thus, in the noise-region detector 210, the difference signal S16 is input to a noise-free-pixel detector 212 of the noise-free-region detector 211.

Figure 57:
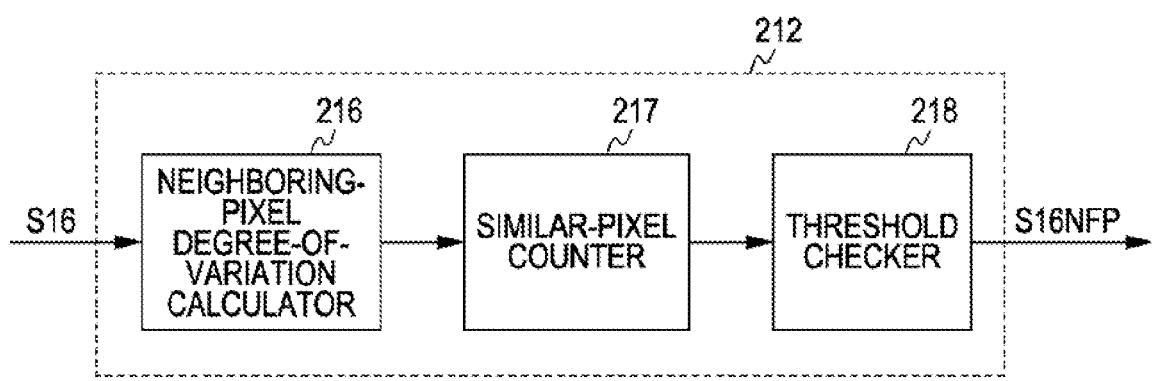
FIG. 57 is a block diagram showing the configuration of a noise-free-pixel detector in the noise-region detector shown in FIG. 55.
Figure 58:
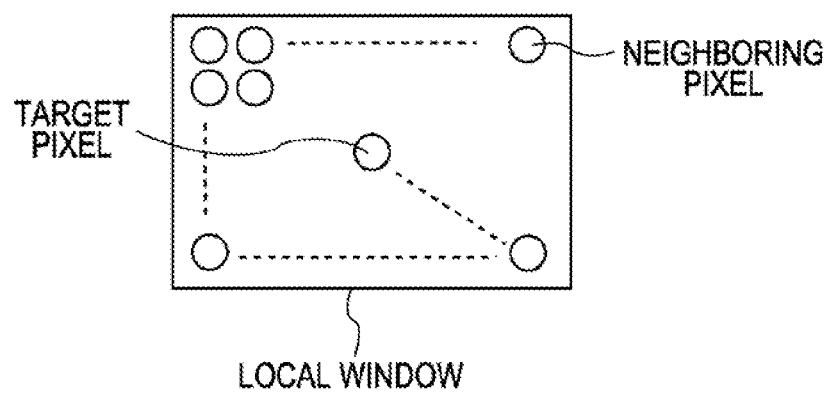
FIG. 58 is a plan view for explaining an operation of the noise-free-pixel detector shown in FIG. 57.

As shown in FIG. 57, in the noise-free-pixel detector 212, the difference signal S16 is input to a neighboring-pixel degree-of-variation calculator 216. As shown in FIG. 58, the neighboring-pixel degree-of-variation calculator 216 sequentially sets each pixel of the difference signal S16 as a target pixel, and sets a local window covering a predetermined range around the target pixel. The local window is set so as to cover a region smaller than a partial region described earlier with reference to FIG. 7.

Furthermore, the neighboring-pixel degree-of-variation calculator 216 detects a degree of variation between pixel values of the target pixel and each neighboring pixel in the local window. As the degree of variation, various values indicating correlation with the neighboring pixel, such as an absolute difference or a squared difference, can be used.

Furthermore, a similar-pixel counter 217 checks the degree of variation detected by the neighboring-pixel degree-of-variation calculator 216, counts for each target pixel the number of neighboring pixels with the degree of variation less than or equal to a threshold, and outputs the count value. Thus, for each target pixel, the similar-pixel counter 217 detects the number of neighboring pixels having high correlation with the target pixel.

A threshold checker 218 checks the count value obtained by the similar-pixel counter 217 against a predetermined threshold, and detects, as noise-free pixels, target pixels for which the number of neighboring pixels with high correlation with the target pixel is greater than the threshold. The threshold checker 218 outputs the result of detection of noise-free pixels in the form of noise-free-pixel identification flags S16NFP.

Figure 59:
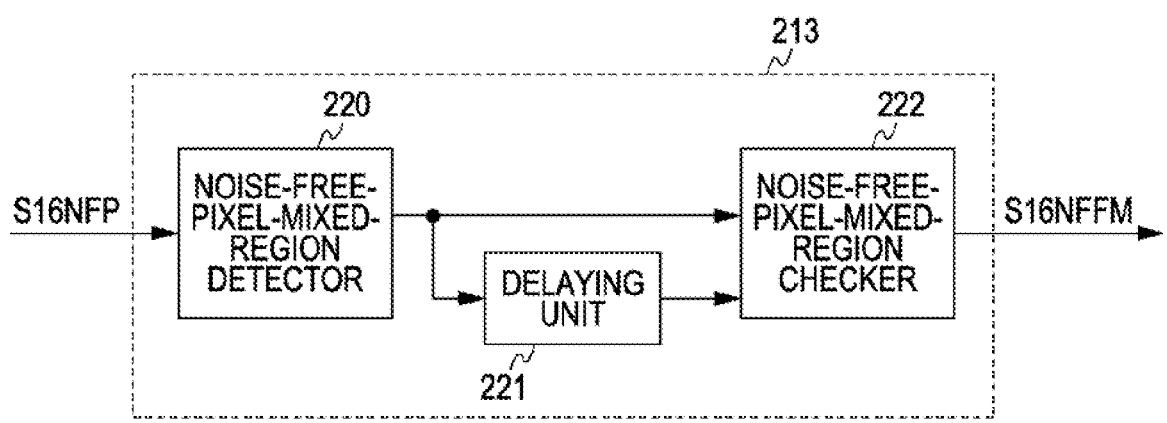
FIG. 59 is a block diagram showing the configuration of a noise-free-mixed-region detector in the noise-region detector shown in FIG. 55.

Referring back to FIG. 55, on the basis of the noise-free-pixel identification flags S16NFP, a noise-free-mixed-region detector 213 detects regions including a large number of pixels having high correlation with neighboring pixels, and outputs noise-free-mixed-region identification flags S16NFFM. More specifically, as shown in FIG. 59, in the noise-free-mixed-region detector 213, a noise-free-pixel-mixed-region detector 220 receives input of the noise-free-pixel identification flags S16NFP, and counts the number of the noise-free-pixel identification flags S16NFF for each region. Furthermore, the noise-free-pixel-mixed-region detector 220 checks the count value against a predetermined threshold, and thereby detects regions including a large number of pixels having high correlation with neighboring pixels, indicated as a noise-free-pixel mixed region in FIG. 60A. The noise-free-pixel-mixed-region detector 220 outputs the result of detection in the form of a noise-free-pixel-mixed-region identification flag.

A delaying unit 221 outputs the noise-free-pixel-mixed-region identification flag with a delay corresponding to a period for processing by a noise-free-mixed-region checker 222 provided at a subsequent stage.

On the basis of the noise-free-pixel-mixed-region identification flag output from the noise-free-pixel-mixed-region detector 220 and the delaying unit 221, the noise-free-mixed-region checker 222 turns on the noise-free-mixed-region identification flag S16NFFM when the noise-free-pixel-mixed-region identification flag for a subject partial region is turned on, i.e., when the region includes a large number of pixels having high correlation with neighboring pixels. Furthermore, even when the noise-free-pixel-mixed-region identification flag of the subject partial region is not turned on, the noise-free-mixed-region checker 222 turns on the noise-free-mixed-region identification flag S16NFFM when the noise-free-pixel-mixed-region identification flag for a partial region adjacent to the subject partial region is turned on, i.e., when an adjacent partial region includes a large number of pixels having high correlation with neighboring pixels.

Figure 60A:
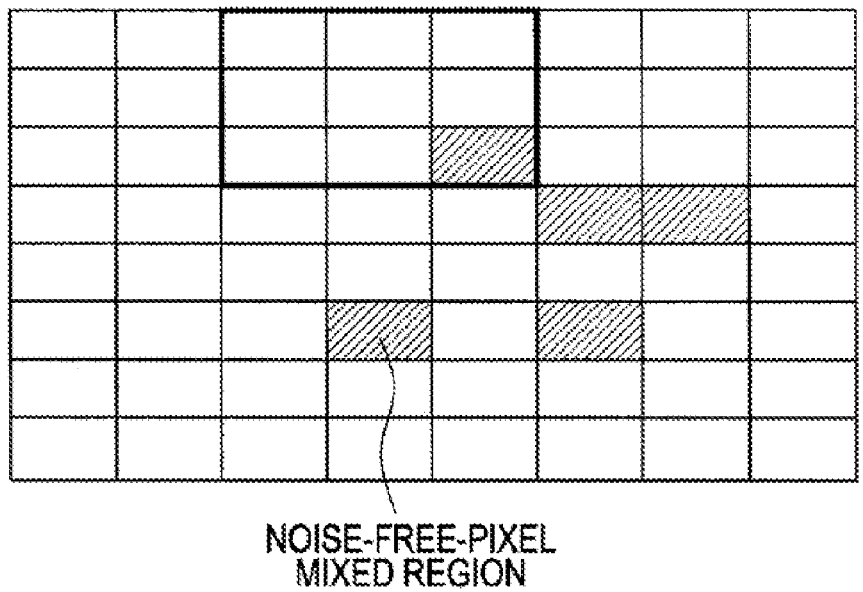
FIGS. 60A and 60B are plan views for explaining operations of the noise-free-mixed-region detector shown in FIG. 59.
Figure 60B:
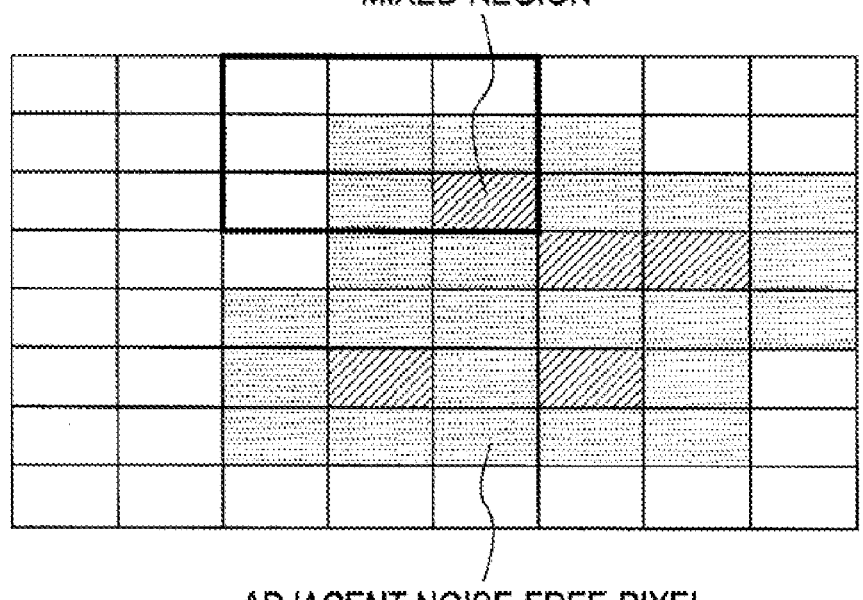

Thus, as indicated by an adjacent noise-free-pixel mixed region in FIG. 60B in comparison with FIG. 60A, the noise-free-mixed-region detector 213 determines the subject partial region as a noise-free mixed, region also when an adjacent partial region is a noise-free-pixel mixed region, and outputs the result in the form of the noise-free-mixed-region identification flag S16NFFM. In FIG. 60B, a rectangular frame indicated by a thick line represents a region that is used to determine the value of the noise-free-pixel-mixed region identification flag for the subject partial region.

A measurement-validity checker 214 is configured the same as the measurement-validity checker 126 shown in FIG. 34 except in that the activity S16A is output on the basis of the noise-free-mixed-region identification flag S16NFFM instead of the noise-free-region detection flag S16NFF.

According to this embodiment, pixels having high correlation with neighboring pixels are detected, and regions including a large number of pixels having high correlation with neighboring pixels are excluded from noise-level measurement on the basis of the result of detection. Thus, regions with any doubt are not used for noise-level measurement. Accordingly, noise level can be detected reliably by avoiding the effects of subtitles, GUI components, or the like more effectively.

More specifically, the degree of variation indicating the degree of non-correlation with neighboring pixels is detected for each pixel, the number of pixels having high correlation with neighboring pixels in each partial region is detected on the basis of the degree of variation, and regions including a large number of pixels having high correlation with neighboring pixels are detected. Thus, noise level can be detected reliably.

Furthermore, by detecting the degree of variation using a difference signal, the degree of variation can be detected by simple calculation in the form of an absolute difference, a squared difference, or the like.

Furthermore, even when an adjacent region, not the subject region, includes a large number of pixels having high correlation with neighboring pixels, the subject region is excluded from noise-level measurement. Thus, noise level can be detected accurately by avoiding the effects of subtitles, GUI components, or the like.

Fifteenth Embodiment

Figure 61:
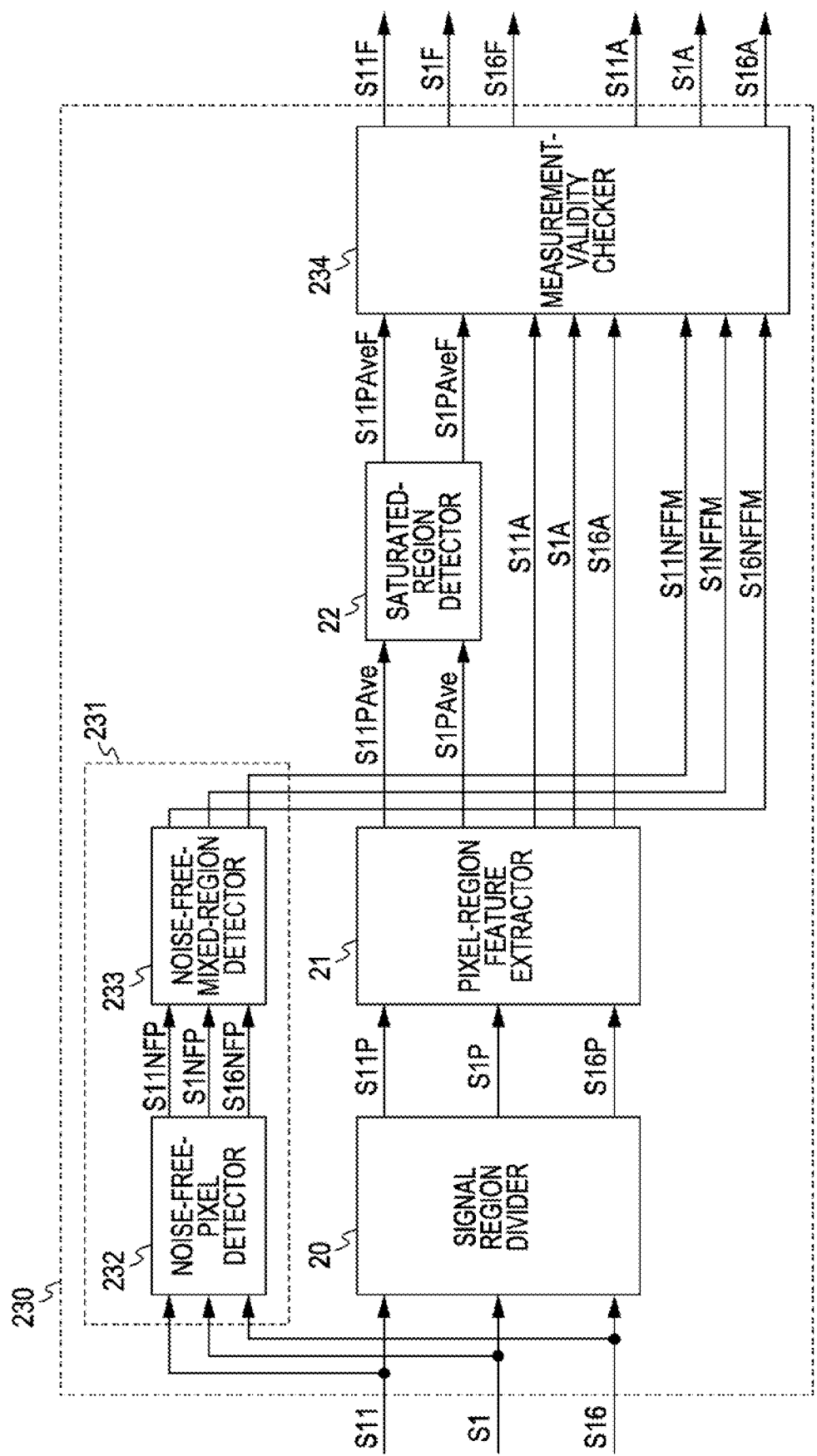
FIG. 61 is a block diagram showing the configuration of a noise-region detector in a noise filter according to a fifteenth embodiment, of the present invention.

FIG. 61 is a block diagram showing the configuration of a noise-region detector in a noise filter according to a fifteenth embodiment of the present invention in comparison with FIGS. 1 and 55. In this embodiment, a measurement unit is configured the same as the measurement unit in the first embodiment except the configuration of a noise-region detector 230 shown in FIG. 61. The noise-region detector 230 is configured the same as the noise-region detector 18 shown in FIG. 1 except in that a noise-free-region detector 231 is provided instead of the noise-free-region detector 23.

A noise-free-region detector 231 is configured the same as the noise-free-region detector 211 shown in FIG. 55 except in that a noise-free-pixel detector 232 and a noise-free-mixed-region detector 233 are provided instead of the noise-free-pixel detector 212 and the noise-free-mixed-region detector 213. The noise-free-region detector 231 is configured the same as the noise-free-region detector 211 except in that the noise-free-region detector 231 generates noise-free-pixel identification flags S1NFP and S11NFP and noise-free-mixed-region identification flags S1FFM and S11NFFM for the input video signal S1 and the reference video signal S11 similarly to the case of the difference signal S16. A measurement-validity checker is configured the same as the measurement-validity checker 24 shown in FIG. 1 except in that the measurement-validity checker 234 outputs the activities S1A, S11A, and S16A on the basis of the noise-free-mixed-region identification flags S1NFFM, S11NFFM, and S16NFFM instead of the noise-free-region defection flags S1NFF, S11NFF, and S16NFF.

According to this embodiment, it is checked whether each region is suitable for noise-level measurement in consideration of neighboring partial regions also regarding the input video signal and the reference video signal as well as the difference signal. Thus, noise level can be detected reliably by avoiding the effects of subtitles, GUI components, or the like even more effectively.

Sixteenth Embodiment

Figure 62:
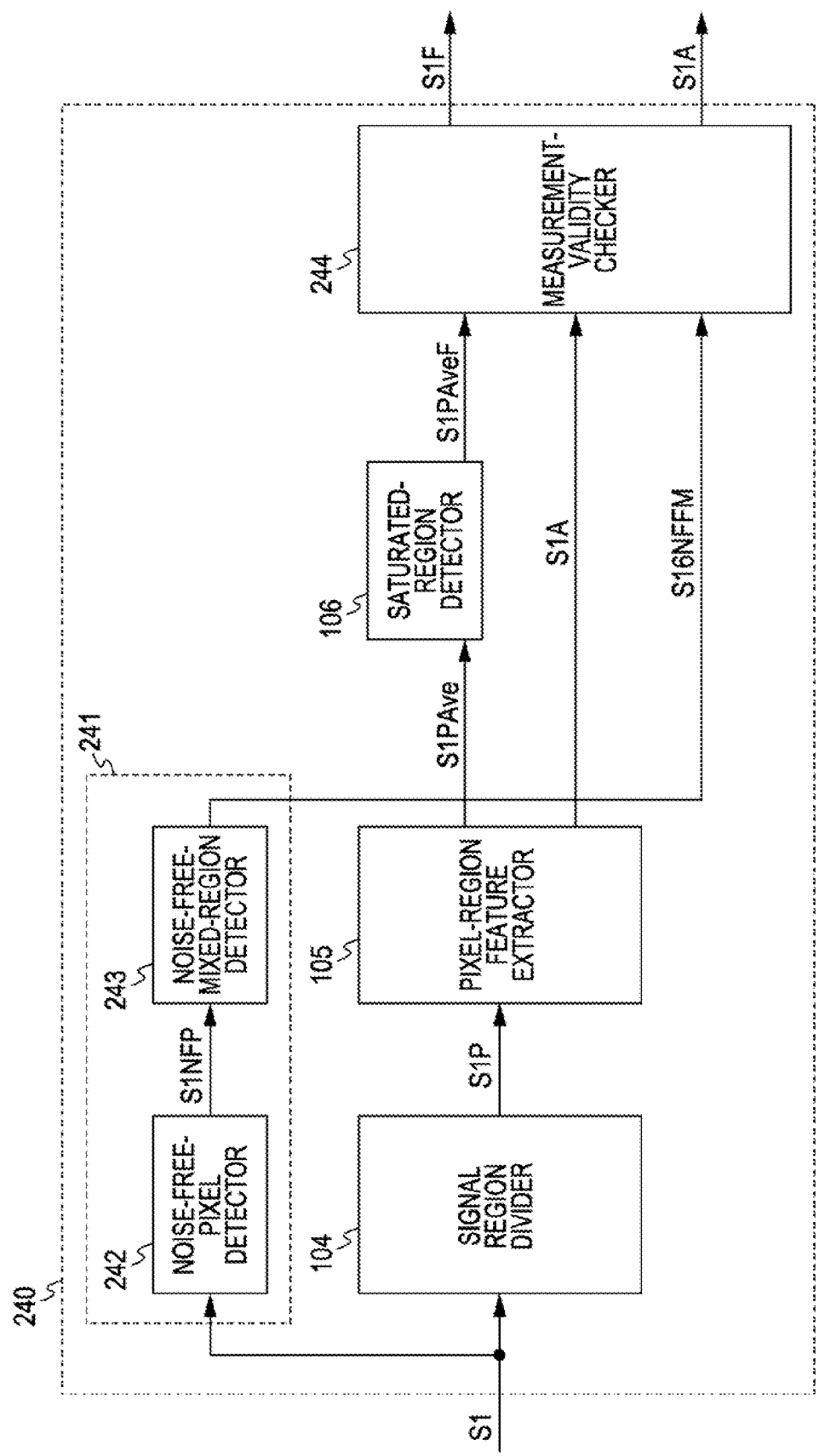
FIG. 62 is block diagram showing the configuration of a noise-region detector in a noise filter according to a sixteenth embodiment of the present invention.

FIG. 62 is a block diagram showing the configuration of a noise-region detector in a noise filter according to a sixteenth embodiment of the present invention in comparison with FIGS. 31 and 55. In this embodiment, a measurement unit is configured the same as the measurement unit in the sixth embodiment except the configuration of a noise-region detector 240 shown in FIG. 62. The noise-region detector 240 is configured the same as the noise-region detector 102 shown in FIG. 31 except in that a noise-free-region detector 241 is provided instead of the noise-free-region detector 107.

Furthermore, the noise-free-region detector 241 is configured the same as the noise-free-region detector 211 shown in FIG. 55 except in that a noise-free-pixel detector 242 and a noise-free-mixed-region detector 243 are provided instead of the noise-free-pixel detector 212 and the noise-free-mixed-region detector 213. The noise-free-pixel detector 242 and the noise-free-mixed-region detector 243 are configured the same as the noise-free-pixel detector 212 and the noise-free-mixed-region detector 213 except in that the noise-free-pixel detector 242 and the noise-free-mixed-region detector 243 processes the input video signal S1 instead of the difference signal S16 to generate a noise-free-pixel identification flag S1NFP and a noise-free-mixed-region identification flag S1NFFM. A measurement-validity checker 244 is configured the same as the measurement-validity checker 108 shown in FIG. 31 except in that the measurement-validity checker 244 outputs the activity S1A on the basis of the noise-free-mixed-region identification flag S1NFFM instead of the noise-free-region identification flag S1NFF.

According to this embodiment, regarding the input video signal, it is checked whether each region is suitable for noise-level measurement in consideration of neighboring partial regions. Also with this embodiment, advantages similar to those of the thirteenth embodiment can be achieved.

Seventeenth Embodiment

Although the embodiments described above relate to noise filters, without limitation to noise filters, the present invention can be applied to various types of processing of video signals.

Furthermore, although noise filters are implemented by hardware in the embodiments described above, without limitation to hardware, the present invention may be implemented by execution of a program by a processing unit. In this case, the program may be provided in a preinstalled form. Alternatively, the program may be provided as recorded on a recording medium, such as an optical disc, a magnetic disc, or a memory card. Furthermore, the program may be provided by downloading via a network, such as the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. A video-signal processing method for measuring a noise level of an input video signal, the video-signal processing method comprising the steps of:
   receiving an input video signal;
   generating a reference video signal that is delayed relative to the input video signal;
   defining a plurality of regions in one field or frame of the input video signal;
   detecting an intra-field or intra-frame feature for each region that is defined in the input video signal, the intra-field or intra-frame feature representing a noise level in the input video signal within a field or frame;
   detecting an intra-field or intra-frame feature for a plurality of regions defined in the reference video signal, each region of the reference video signal corresponding to one region of the input video signal;
   checking the intra-field or intra-frame feature for each region of the input video signal against a noise-free-region threshold, and excluding regions of the input video signal of which the intra-field or intra-frame feature is less than the noise-free-region threshold from subjects of noise-level measurement;
   outputting a result of noise-level measurement by statistically processing the intra-field or intra-frame features of regions of the input video signal not excluded;
   generating an inter-field or inter-frame difference signal of the input video signal;
   detecting an intra-field or intra-frame feature for a plurality of regions defined in the difference signal, each region of the difference signal corresponding to one region of the input video signal; and
   checking the intra-field or intra-frame feature for each region in the difference signal against the noise-free-region threshold, and excluding each region of the difference signal of which the intra-field or intra-frame feature is less than the noise-free-region threshold from subjects of noise-level measurement,
   wherein the step of measuring a noise level outputs the noise-level measurement result by statistically processing the intra-field or intra-frame features of regions of the difference signal not excluded as well as the regions of the input video signal not excluded.

2. The video-signal processing method according to claim 1, further comprising the steps of:
   checking the intra-field or intra-frame feature for each region in the reference video signal against the noise-free-region threshold, and excluding each region of the reference video signal of which the intra-field or intra-frame feature is less than the noise-free-region threshold from subjects of noise-level measurement;
   wherein the step of measuring a noise level outputs the noise-level measurement result by statistically processing the intra-field or intra-frame features of regions of the reference video signal not excluded as well as the regions of the input video signal not excluded.

3. The video-signal processing method according to claim 1,
   wherein the step of detecting an intra-field or intra-frame feature for each region that is defined in the input video signal includes the step of generating an inter-field or inter-frame difference signal of the input video signal, and
   wherein the intra-field or intra-frame feature for each region in the input video signal is detected by detecting the intra-field or intra-frame feature for a plurality of regions defined in the difference signal, each region of the difference signal corresponding to one region of the input video signal.

4. The video-signal processing method according to claim 1, further comprising the steps of:
   detecting an average value of pixel values in the input video signal for each region that is set in the input video signal; and
   checking the average value against an average-value threshold to detect regions having a possibility of suppression of noise mixed into the input video signal, and excluding the regions from subjects of the step of measuring a noise level.

5. The video-signal processing method according to claim 1, further comprising the steps of:
   detecting a minimum value in an effective region by collecting the intra-field or intra-frame features of individual regions of the input video signal;
   setting an upper threshold corresponding to the minimum value in the effective region; and
   checking the intra-field or intra-frame features for each region of the input video signal against the upper thresholds to detect regions of the input video signal with which the intra-field or intra-frame feature is greater than the upper threshold, and excluding the regions from subjects of the step of measuring a noise level.

6. The video-signal processing method according to claim 1,
   wherein the step of measuring a noise level determines the number of regions of the input video signal excluded from subjects of measurement for each field or frame of the input video signal, and outputs the noise-level measurement result by holding a previous value when the number of regions of the input video signal is greater than a predetermined value.

7. A non-transitory computer-readable medium comprising a program configured to execute a video-signal processing method for measuring a noise level of an input video signal, the program comprising the steps of:
   receiving an input video signal;
   generating a reference video signal that is delayed relative to the input video signal;
   defining a plurality of regions in one field or frame of the input video signal;
   detecting an intra-field or intra-frame feature for each region that is defined in the input video signal, the intra-field or intra-frame feature representing a noise level in the input video signal within a field or frame;

detecting an intra-field or intra-frame feature for a plurality of regions defined in the reference video signal, each region of the reference video signal corresponding to one region of the input video signal;

checking the intra-field or intra-frame feature for each region of the input video signal against a noise-free-region threshold, and excluding regions of the input video signal of which the intra-field or intra-frame feature is less than the noise-free-region threshold from subjects of noise-level measurement;

generating an inter-field or inter-frame difference signal of the input video signal;

detecting an intra-field or intra-frame feature for a plurality of regions defined in the difference signal, each region of the difference signal corresponding to one region of the input video signal; and checking the intra-field or intra-frame feature for each region in the difference signal against the noise-free-region threshold, and excluding each region of the difference signal of which the intra-field or intra-frame feature is less than the noise-free-region threshold from subjects of noise-level measurement, wherein the step of measuring a noise level outputs the noise-level measurement result by statistically processing the intra-field or intra-frame features of regions of the difference signal not excluded as well as the regions of the input video signal not excluded.

8. A non-transitory recording medium having recorded thereon a program of a video-signal processing method for measuring a noise level of an input video signal, the program comprising the steps of:

receiving an input video signal;

generating a reference video signal that is delayed relative to the input video signal;

defining a plurality of regions in one field or frame of the input video signal;

detecting an intra-field or intra-frame feature for each region that is defined in the input video signal, the intra-field or intra-frame feature representing a noise level in the input video signal within a field or frame;

detecting an intra-field or intra-frame feature for a plurality of regions defined in the reference video signal, each region of the reference video signal corresponding to one region of the input video signal;

checking the intra-field or intra-frame feature for each region of the input video signal against a noise-free-region threshold, and excluding regions of the input video signal of which the intra-field or intra-frame feature is less than the noise-free-region threshold from subjects of noise-level measurement;

generating an inter-field or inter-frame difference signal of the input video signal;

detecting an intra-field or intra-frame feature for a plurality of regions defined in the difference signal, each region of the difference signal corresponding to one region of the input video signal; and checking the intra-field or intra-frame feature for each region in the difference signal against the noise-free-region threshold, and excluding each region of the difference signal of which the intra-field or intra-frame feature is less than the noise-free-region threshold from subjects of noise-level measurement, wherein the step of measuring a noise level outputs the noise-level measurement result by statistically processing the intra-field or intra-frame features of regions of the difference signal not excluded as well as the regions of the input video signal not excluded.

9. A video-signal processing apparatus for measuring a noise level of an input video signal, the video-signal processing apparatus comprising:

a receiver configured to receive an input video signal;

a generator configured to generate a reference video signal that is delayed relative to the input video signal;

a region divider configured to define a plurality of regions in one field or frame of the input video signal;

an intra-field or intra-frame feature detector configured to detect an intra-field or intra-frame feature for each region that is defined in the input video signal, the intra-field or intra-frame feature representing a noise level in the input video signal within a field or frame, the intra-field or intra-frame feature detector being further configured to detect an intra-field or intra-frame feature for a plurality of regions defined in the reference video signal, each region of the reference video signal corresponding to one region of the input video signal;

a noise-free-region processor configured to check the intra-field or intra-frame feature detected by the intra-field or intra-frame feature detector for each region of the input video signal against a noise-free-region threshold, and to exclude regions of the input video signal of which the intra-field or intra-frame feature is less than the noise-free-region threshold from subjects of noise-level measurement;

a noise-level measurement unit configured to output a result of noise-level measurement by statistically processing the intra-field or intra-frame features of regions of the input video signal not excluded by the noise-free-region processor;

generating an inter-field or inter-frame difference signal of the input video signal;

detecting an intra-field or intra-frame feature for a plurality of regions defined in the difference signal, each region of the difference signal corresponding to one region of the input video signal; and checking the intra-field or intra-frame feature for each region in the difference signal against the noise-free-region threshold, and excluding each region of the difference signal of which the intra-field or intra-frame feature is less than the noise-free-region threshold from subjects of noise-level measurement, wherein the step of measuring a noise level outputs the noise-level measurement result by statistically processing the intra-field or intra-frame features of regions of the difference signal not excluded as well as the regions of the input video signal not excluded.

* * * * *